United States Patent
Eisele

(10) Patent No.: US 10,863,598 B2
(45) Date of Patent: Dec. 8, 2020

(54) SYSTEM AND METHOD FOR ADVANCED HORTICULTURAL LIGHTING

(71) Applicant: GrowFlux LLC, Philadelphia, PA (US)

(72) Inventor: Eric Jon Eisele, Aston, PA (US)

(73) Assignee: GROWFLUX LLC, Philadelphia, PA (US)

(*) Notice: Subject to any disclaimer, the term of this patent is extended or adjusted under 35 U.S.C. 154(b) by 0 days.

(21) Appl. No.: 16/179,586

(22) Filed: Nov. 2, 2018

(65) Prior Publication Data

US 2019/0082613 A1 Mar. 21, 2019

Related U.S. Application Data

(63) Continuation of application No. 16/098,739, filed as application No. PCT/US2017/030610 on May 2, 2017.

(Continued)

(51) Int. Cl.
*H05B 45/20* (2020.01)
*H05B 45/22* (2020.01)
(Continued)

(52) U.S. Cl.
CPC .......... *H05B 45/20* (2020.01); *A01G 7/045* (2013.01); *F21V 23/0442* (2013.01);
(Continued)

(58) Field of Classification Search
None
See application file for complete search history.

(56) References Cited

U.S. PATENT DOCUMENTS

2006/0028155 A1 2/2006 Young
2010/0289411 A1 11/2010 Smits et al.
(Continued)

FOREIGN PATENT DOCUMENTS

EP 0952757 A2 10/1999

OTHER PUBLICATIONS

International Search Report and Written Opinion dated Sep. 22, 2017 in corresponding International Patent Application No. PCT/US2017/030610.

(Continued)

*Primary Examiner* — Jany Richardson
(74) *Attorney, Agent, or Firm* — Troutman Pepper Hamilton Sanders LLP

(57) ABSTRACT

Embodiments can provide a system and method of light validation in a lighting device, comprising communicating a setpoint to a lighting device comprising a plurality of emitters; generating control signals for the plurality of emitters in response to the setpoint; calculating an estimate of the intensity and spectral power distribution of the composite radiant flux emitted by the lighting device through computing the control signals relative to lifetime performance data and a reference dataset. Embodiments can further provide a system and method for quality control and reporting, comprising transmitting, via a lighting device, validation signals comprising operating conditions, initial measurements, lifetime operating data, reference datasets, and spectrum and intensity estimates, and a device identifier to a central controller; receiving, via the central controller, one or more condition measurements comprising light measurements, temperature measurements, humidity measurements, moisture measurements, and nutrient chemistry measurements, and device identifiers from one or more light sensing devices and growth condition sensors; recording, via (Continued)

the central controller, the validation signals, condition measurements, and device identifiers in a database; generating, via the central controller, a master batch record; and alerting, via the central controller, one or more operators in the event the validation signals indicate one or more growth conditions fall outside of a predetermined range.

18 Claims, 50 Drawing Sheets

Related U.S. Application Data

(60) Provisional application No. 62/330,566, filed on May 2, 2016.

(51) Int. Cl.
| | |
|---|---|
| *H05B 47/11* | (2020.01) |
| *H05B 47/105* | (2020.01) |
| *F21V 23/04* | (2006.01) |
| *A01G 7/04* | (2006.01) |
| *G06T 7/00* | (2017.01) |
| *F21W 131/40* | (2006.01) |
| *F21Y 115/10* | (2016.01) |

(52) U.S. Cl.
CPC ............ *G06T 7/001* (2013.01); *H05B 45/22* (2020.01); *H05B 47/105* (2020.01); *H05B 47/11* (2020.01); *F21W 2131/40* (2013.01); *F21Y 2115/10* (2016.08); *G06T 2207/30188* (2013.01); *Y02B 20/46* (2013.01); *Y02P 60/149* (2015.11)

(56) References Cited

U.S. PATENT DOCUMENTS

| | | | |
|---|---|---|---|
| 2011/0057571 A1 | 3/2011 | Ackermann | |
| 2011/0215725 A1 | 9/2011 | Paolini | |
| 2013/0049603 A1 | 2/2013 | Bradford | |
| 2015/0089867 A1* | 4/2015 | Abbott | A01G 9/00 47/58.1 LS |
| 2015/0250106 A1 | 9/2015 | Wik et al. | |
| 2015/0342125 A1 | 12/2015 | Krijn et al. | |
| 2016/0219794 A1* | 8/2016 | Greenberg | A01G 7/045 |

OTHER PUBLICATIONS

Extended European Search Report dated Jun. 26, 2020 in corresponding European Patent Application No. 17793146.6.

* cited by examiner

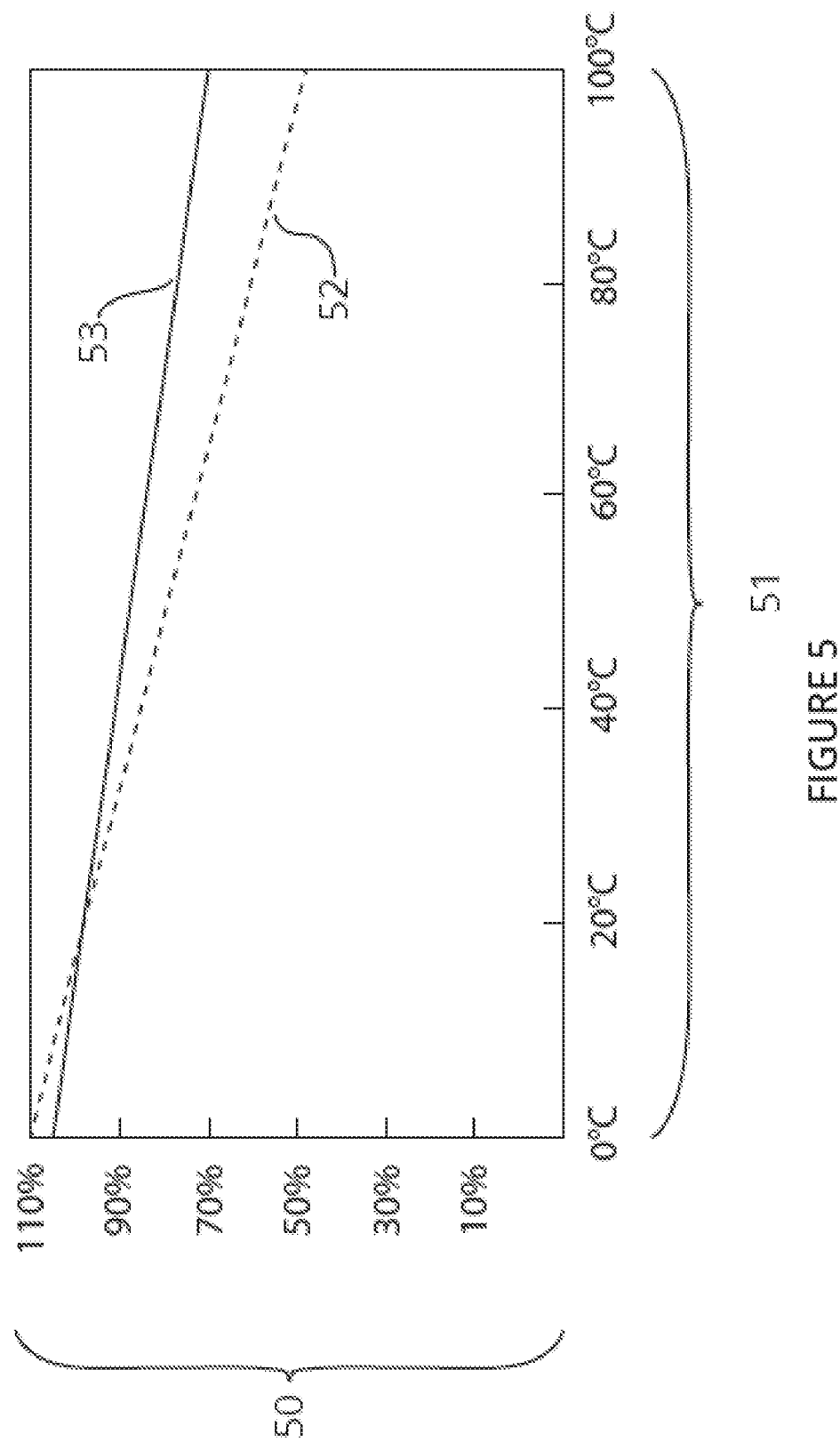

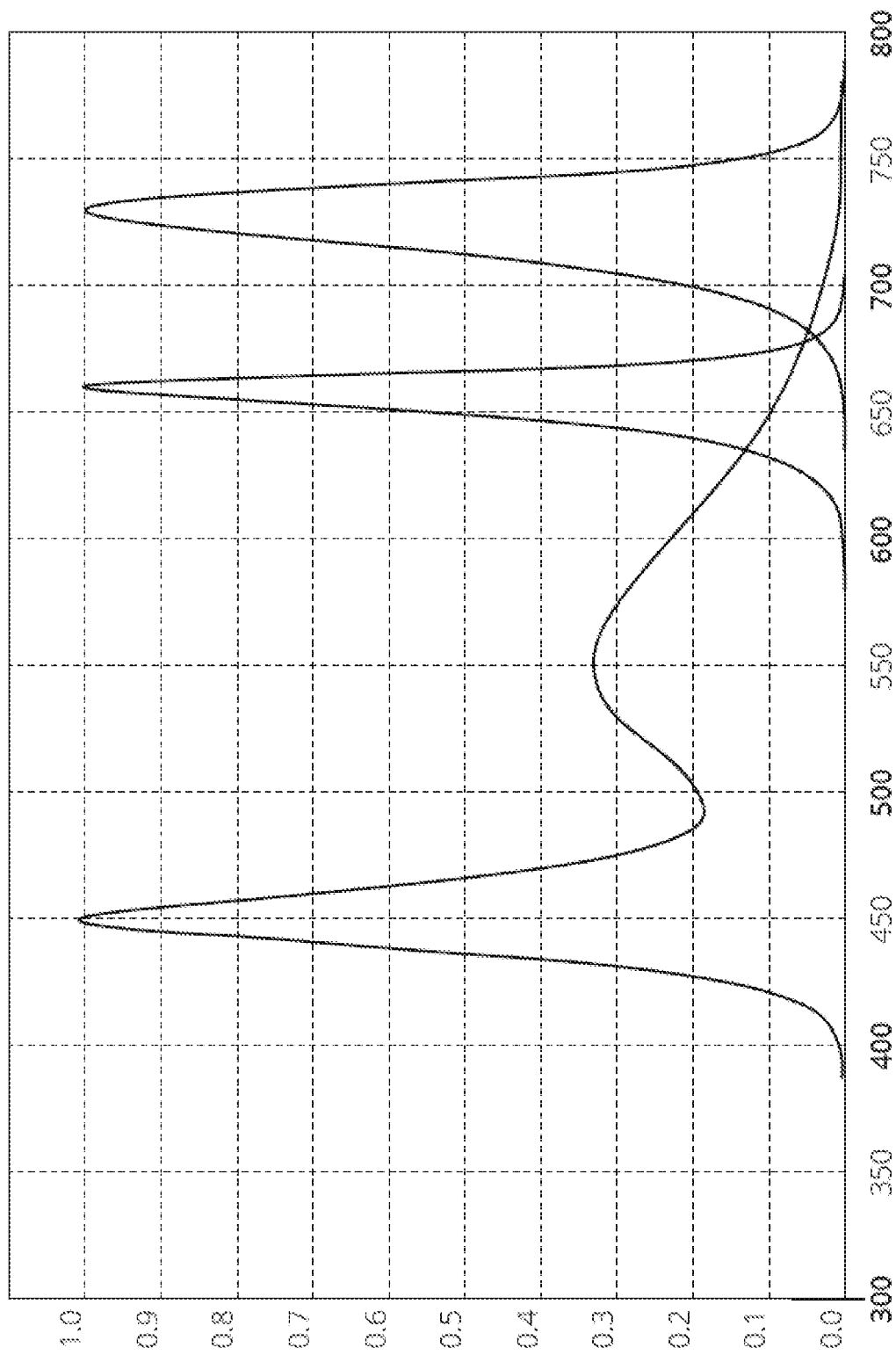

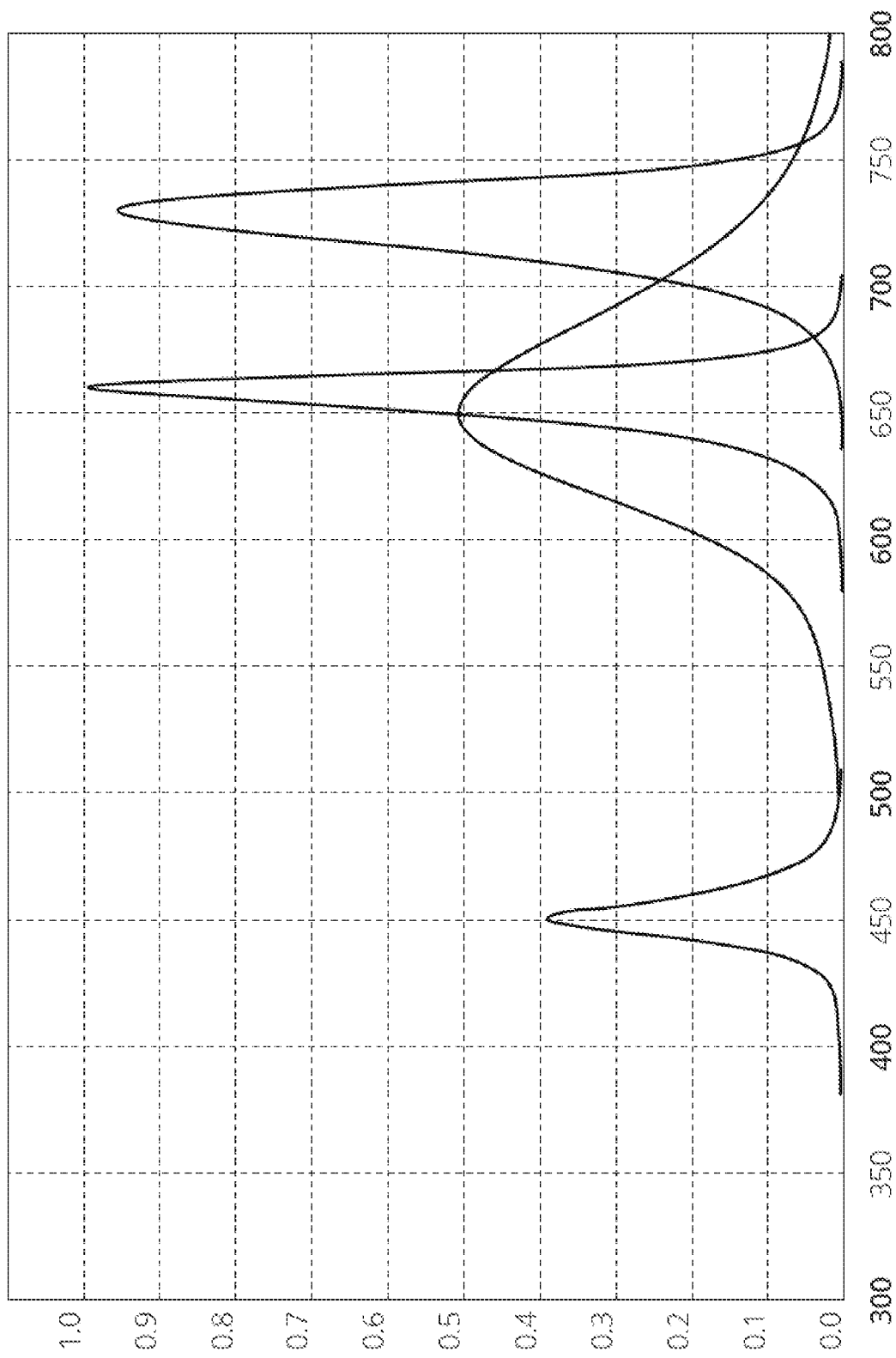

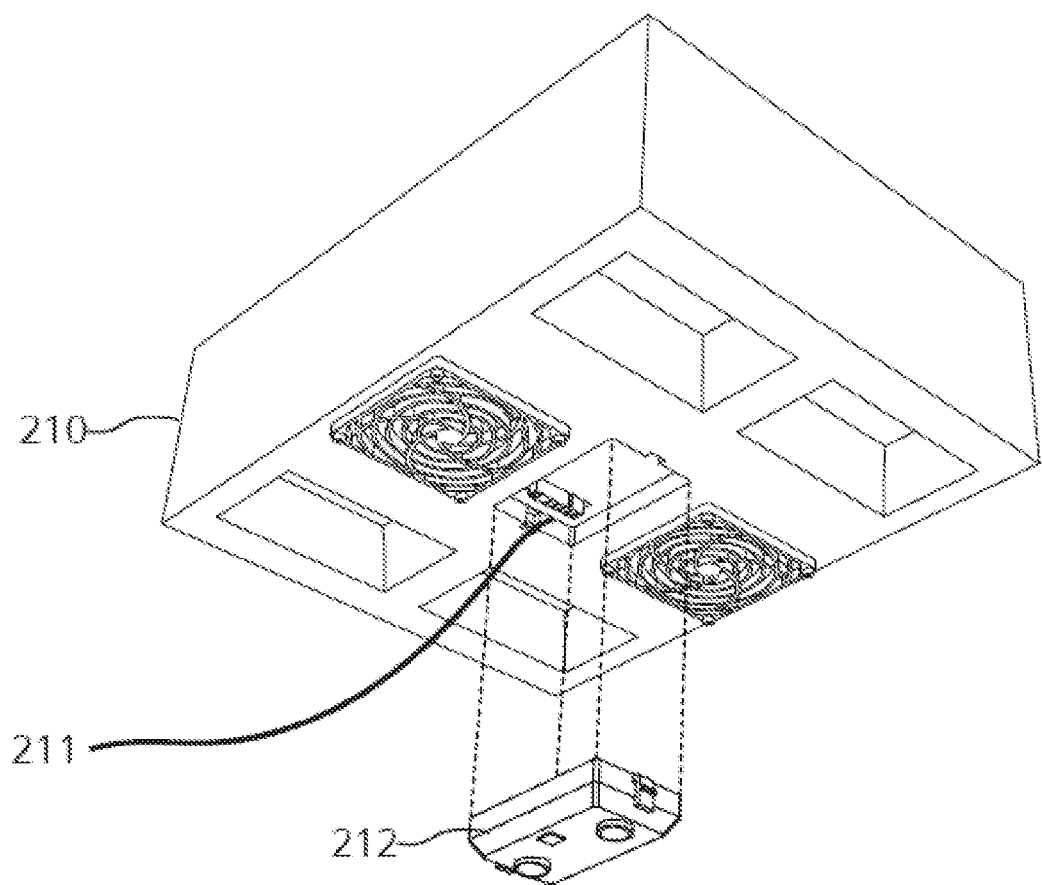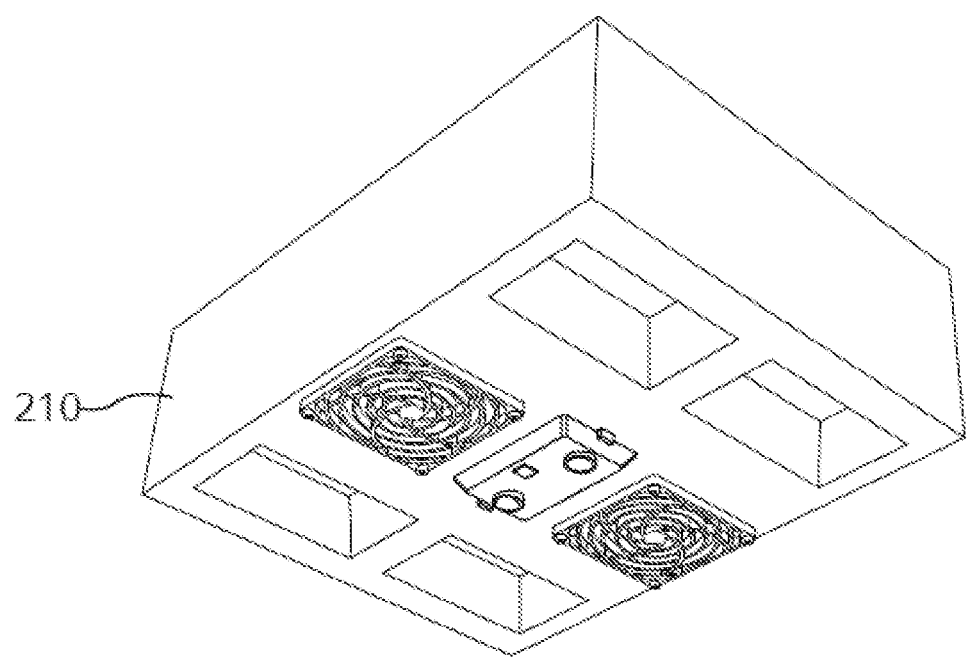
FIGURE 21

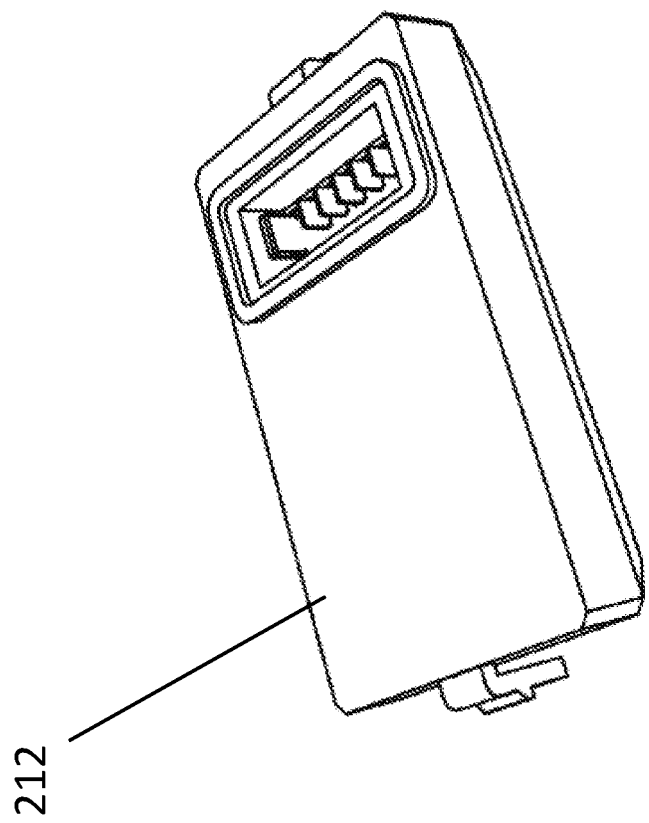
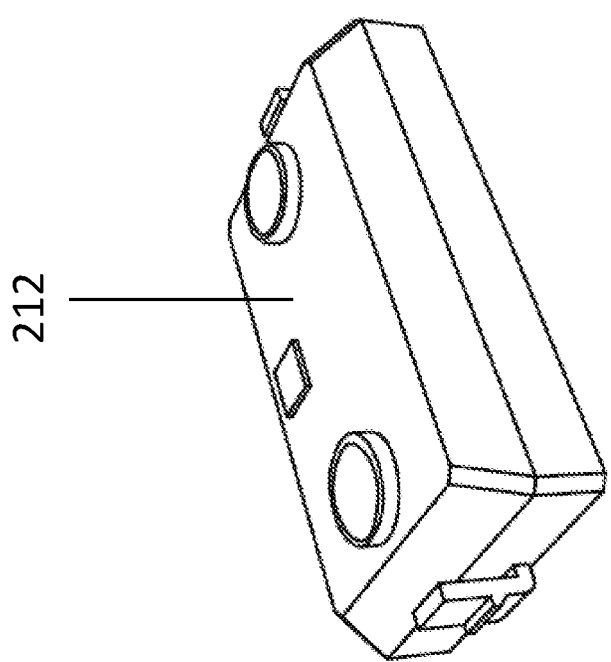
FIGURE 22A

SYSTEM AND METHOD FOR ADVANCED HORTICULTURAL LIGHTING

CROSS REFERENCE TO RELATED APPLICATIONS

This application is continuation of U.S. patent application Ser. No. 16/098,739, filed on Nov. 2, 2018, which is a national phase filing under 35 U.S.C. § 371 of International Patent Application No. PCT/US2017/030610, filed on May 2, 2017, which claims priority to U.S. Provisional Patent Application Ser. No. 63/330,566, filed on May 2, 2016, each of which is hereby incorporated by reference in its entirety herein.

TECHNOLOGICAL FIELD

The present invention generally relates to lighting and sensing devices and specifically relates to a system and method of providing photosynthetic active radiation (PAR) in precise quantities and of a precise spectral power distribution.

BACKGROUND

Horticulturalists have been using artificial light to aid the growth of plants indoors and in greenhouses since the earliest days of electric lighting. Controlled environment agriculture (CEA) experts have been using high intensity discharge (HID, including metal halide and high pressure sodium lighting) and fluorescent lighting for several decades with highly repeatable results. These conventional types of lighting have provided growers with a predictable spectral power distribution, high photosynthetic active radiation (PAR) levels, and a known PAR degradation rate over the lifetime of the bulb. Growers are accustomed to choosing specific bulbs with a well characterized spectral power distribution (SPD) which suits specific horticultural needs. For example, the high correlated color temperature (CCT) and blue/white color of metal halide lighting suits vegetative growth well, while the lower CCT of high pressure sodium lighting spurs flowering in plants. These conventional lighting technologies also offered the advantage of a broad spectral output, which better mimics natural sunlight in terms of spectral power distribution.

Within the context of horticultural lighting, several units of measure are commonly used to describe photosynthetic active radiation (PAR) and the relationship between PAR and the plant canopy. First, the top layer of foliage in a group of plants can be generally referred to as the plant canopy, and can be an area of interest with regard to measurements of PAR. Two important metrics commonly used to describe PAR include photosynthetic photon flux density (PPFD), measured in micro-moles irradiated photons in the PAR range of 400-700 nm per square meter per second, and the daily light interval (DLI), measured in irradiated photons per day in moles per square meter.

With the introduction of high power light emitting diodes (LEDs), the opportunity to tailor the spectrum of horticultural lighting presented itself, thereby saving significant amounts of energy. Over the last decade, many manufacturers seized upon this concept, developing LED based horticultural lighting products which emit radiation in the red and blue spectrum only, drawing on scientific evidence indicating that the peak absorption spectra of common plant pigments such as chlorophyll and carotenoids can be highest in these regions of the visible spectrum. Other research indicates that pigment-protein complexes present within leaves have a different absorption spectra compared to isolated pigments, indicating higher levels of absorption in the green spectrum within intact leaves compared to extracted pigments such as chlorophyll.

Many opportunities exist to manipulate plant growth and characteristics through modulating the spectrum during various stages of plant growth. For example, manipulating the red light to infrared light (far red) ratio (R:FR) triggers shade avoidance in many species of plants. LED lighting devices, when paired with the proper dimmable power supplies and controls, are well suited to supplying a specific spectrum within a certain range of repeatable tolerance.

High power LEDs commonly used for horticultural lighting applications are subjected to a binning process after manufacturing, whereby the radiant flux, forward voltage, and peak wavelength of LED devices are characterized and 'binned' accordingly. Since a limited number of devices are available in each bin, manufacturers of LED horticultural lighting products are challenged with delivering a consistent spectral power distribution and intensity due to the supply chain limitations imposed by binning and other forms of variability introduced by manufacturing.

High power LEDs commonly used for horticultural lighting applications exhibit a relationship between device temperature, service hours, and performance. AlInGaP based LEDs exhibit a marked decrease in radiant flux output with increasing temperature; InGaN LEDs exhibit this behavior as well to a lesser extent. All types of LEDs exhibit a gradual decline in radiant flux output with operation time; wavelength down conversion materials such as phosphors combined with encapsulants also have associated degradation mechanisms which results in shifts in the spectral power distribution of fixtures over time.

Many existing LED products claim efficiency figures which are based on best case conditions—such as the use of top performing bins and room temperature operation of fixtures—which do not reflect actual production and use of the devices. As a result of the aforementioned manufacturing limitations and variation in output over temperature and time, horticulturalists have not placed the same level of confidence in LED lighting as with conventional lighting technology with regard to spectral power distribution consistency and efficiency claims.

While great attention can be paid to quality control in manufacturing of lighting devices, many opportunities for introduction of device to device variation exist. Tolerance of passive components such as resistors and capacitors, quality of thermal interfaces, tolerance in phosphor or down conversion material content, small batch to batch differences in phosphor and encapsulation chemistry, LED voltage and wavelength bins, mechanical tolerances of components, optical defects in lenses, and small variations in manufacturing processing all introduce some amount of device to device variation. The embodiments incorporate a novel method and system to overcome such variation within lighting devices.

Conventionally, greenhouses have produced edible crops such as leafy greens, tomatoes, cucumbers, peppers, and other fruits and vegetables. In recent years, greenhouses, indoor farms, and vertical farms have increasingly been producing higher value crops, such as engineered seed, pharmaceutical products such as protein therapies and vaccines, and medicinal *cannabis*. The growth of these industries has spurred the adoption of quality control practices such as GMP (Good Manufacturing Practices), which further require certain quality control practices to be implemented within production facilities. Many of these quality control practices are related to maintaining consistent growth conditions, with which horticulturalists are challenged due to the aforementioned limitations associated with conventional horticultural lighting technology. The methods, system, and device described herein introduce novel opportunities for growers to implement quality control practices in controlled environment agriculture facilities.

Introducing LED technology as well as controls into controlled environment agriculture production environments presents several adjacent opportunities to implement novel automation and sensing techniques to extend the efficiency, quality control practices, and profitability of such facilities, several of which are described in the embodiments. First, sensing within greenhouses and controlled environment agriculture facilities can be critical to operations efficiency and facility control. Horticultural lighting devices equipped with communication capabilities can not only reliably extend wireless networking capability to small battery powered and energy harvesting devices, such devices can also host integral sensor technology which characterizes plant health and growth conditions. Second, natural lighting within greenhouse production facilities constitutes a significant and cost effective raw ingredient for greenhouse grown crops, however this raw ingredient can be subject to some level of uncertainty and natural variability.

The embodiments describe methods which combine lighting devices with natural light and result in highly repeatable growth conditions exhibiting consistent spectral power distribution and PAR levels. Horticultural lighting devices are often manually repositioned to accommodate changes to production needs and growth of plants in greenhouse facilities. Horticultural lighting devices equipped with communication capabilities, novel processing and control signal generation capabilities, novel optics, and novel actuators, described within, have the capability to autonomously adjust in response to operator input or sensor feedback. Finally, horticultural lighting devices integrated within indoor environments which also host occupants can further coordinate with natural light while regulating light levels as to prevent disruption to the human circadian rhythm.

SUMMARY

According to an embodiment, a lighting device and system generate light of a precise and repeatable spectral power distribution and intensity. Lighting devices are provided which utilize temperature measurements within the devices, initial performance measurements on the devices, reference performance datasets on similar devices, and operating lifetime data to generate validation data indicating delivered irradiance and spectrum levels. Further disclosed are emitter compositions and spectrum power distribution characteristics of emitters within lighting devices.

Some embodiments involve the use of light sensing devices to measure growth conditions generated by lighting devices, and in some cases, by natural light. Embodiments disclose various compositions related to light sensing devices, optical constructions useful for forming the light sensing devices, and computation techniques useful for generating actionable data from the light sensing devices.

In certain controlled growth applications, influencing the shape and morphology of plants can be considered to be of commercial and practical interest. While horticulturalists use several conventional techniques to influence plant shape, size, intermodal spacing, and the like, methods involving the manipulation of spectrum, timing, positioning, and intensity of photosynthetic active radiation and infrared radiation have shown promise in influencing the shape and morphology. An application of the embodiments includes varying the spectrum of photosynthetic active radiation throughout the day or growth cycle or restricting the photosynthetic active radiation spectrum to certain wavelengths to influence plant morphology, and can be considered within the scope of prior art associated with various forms of artificial horticultural lighting.

Novel methods involving the application of irradiance of at least two different spectra and regulation of the spectra to various areas of a plant are made possible by various embodiments. By way of example, such methods are useful to influence the location of flowers within a plant, the density and spacing of leaves and foliage at various parts of a plant, the height of a plant, the expression of certain pigments and compounds within various areas of a plant, the orientation of a plant or influence over phototropism, and expression of other desirable attributes of a plant. By way of example, such methods can be employed to control branching and foliage along the stem of a plant to facilitate harvest of the plant or fruit within the plant. By way of example, such methods are useful to expose fruit within the plant to a spectra profile selected to enhance desirable aspects in the fruit, such as color, flavor, or aroma. Such methods are disclosed within.

Between the various diverse typologies of controlled environment agriculture production environments, customization of sensing and communication methods associated with lighting devices can be often necessary to meet the specific needs of the production facility requirements. Described herein can be a lighting device which adapts a variety of sensing and communicating capabilities by means of a modular receptacle.

Embodiments relate to a lighting device and system capable of validating the spectrum power distribution and intensity of the light emitted by the device. Such validation methods are critical to the function of lighting systems in controlled environment agriculture production environments; the embodiments disclose in detail validation methods that make use of several pieces of data to determine delivered light intensity and spectrum power distribution, further described in the context of a Light Formula.

Further disclosed are Light Formulas which comprise control methods directed at controlling a plurality of lighting devices in accordance with a schedule relevant to specific types of horticultural growth. Such light formulas are further useful in supplementing artificial light with natural light to regulate plant growth while saving energy. In some instances, actual light levels and spectrum delivered to plants may not be consistent with requirements defined by Light Formulas, particularly in situations involving natural light. Methods are provided by which actual light levels and spectrum are recorded and processed to generate a master batch record, which can be useful in various regulated manufacturing environments.

According to an embodiment, methods by which controlled lighting devices may exhibit a variable angular distribution in emitted irradiance are provided; such variable angular distribution can be generally useful to control PPDF among the plant canopy where the height of a plant canopy may change throughout the growth period. According to an embodiment, methods are provided by which image data acquired by a camera directed at plants can be processed to generate analysis data of relevance to horticultural growth, where the analysis data can be computed over a time interval to generate a trend describing horticultural growth progression and growth conditions.

The effects of artificial light on human health has in recent years become of interest; further the application of horticultural lighting devices within interior environments has grown recently. Embodiments herein disclose methods which regulate the output of lighting devices to comply with both light formulas related to horticultural growth as well as certain lighting rules related to regulating the human circadian rhythm within buildings.

Embodiments can provide a method of light validation in a lighting device, comprising communicating a setpoint to a lighting device comprising a plurality of emitters; generating control signals for the plurality of emitters in response to the setpoint; calculating an estimate of the intensity and spectral power distribution of the composite radiant flux emitted by the lighting device through computing the control signals relative to lifetime performance data and a reference dataset.

Embodiments can further provide a method wherein lifetime performance data comprises at least one of operational hours or a statistically computed summary of operating conditions. Embodiments can further provide a method further comprising modifying the control signals based on the calculated estimated; regulating the composite spectral output of the lighting device in accordance with the setpoint. Embodiments can further provide a method further comprising calculating an appropriate duty cycle of one or more groups of the plurality of emitters based on the lifetime performance data or operational hours of the groups and the reference dataset; generating the control signals for the plurality of emitters based upon the calculation.

Embodiments can further provide a method further comprising calculating an appropriate duty cycle of one or more groups of the plurality of emitters based on the lifetime performance data or operational hours of the groups and the reference dataset, as well as one or more temperature references comprising at least one temperature measurement at or near the emitters within the lighting device or at least one ambient temperature measurement taken externally from the lighting device or near the external case or enclosure of the lighting device.

Embodiments can further provide a method further comprising estimating the composite spectral power distribution and intensity of the lighting device by comparing one or more real time temperature references and control signals to the lifetime performance data and a reference dataset. Embodiments can further provide a method further comprising estimating the composite spectral power distribution and intensity of the lighting device by comparing one or more real time temperature references and control signals to the lifetime performance data, a reference dataset, and one or more initial measurements related to the lighting device.

Embodiments can further provide a method further comprising determining a relative level of degradation associated with one or more groups of emitters based upon the lifetime performance data; expressing the relative level of degradation as the calculated efficiency of each group of emitters; comparing each level of degradation to a group of at least one light formula consisting of spectrum and intensity directives, wherein the aggregate efficiency associated with each of the light formulas can be calculated for the lighting device.

Embodiments can further provide a method further comprising storing the aggregate efficiency and relative levels of degradation in a database. Embodiments can further provide a method further comprising controlling the emitters to maintain a consistent irradiance and spectral power distribution irrespective of the level of degradation through limiting an initial output of the emitters to a pre-determined amount. Embodiments can further provide a method further comprising computing wavelength and intensity calibration coefficients based on one or more initial measurements, the reference dataset, and the lifetime performance data; and transmitting the wavelength and intensity calibration coefficients to each group of emitters.

Embodiments can further provide a method for quality control and reporting, comprising transmitting, via a lighting device, validation signals comprising operating conditions, initial measurements, lifetime operating data, reference datasets, and spectrum and intensity estimates, and a device identifier to a central controller; receiving, via the central controller, one or more condition measurements comprising light measurements, temperature measurements, humidity measurements, moisture measurements, and nutrient chemistry measurements, and device identifiers from one or more light sensing devices and growth condition sensors; recording, via the central controller, the validation signals, condition measurements, and device identifiers in a database; generating, via the central controller, a master batch record; and alerting, via the central controller, one or more operators in the event the validation signals indicate one or more growth conditions fall outside of a predetermined range.

Embodiments can further provide a lighting device to generate light in a horticultural environment, the lighting device comprising one or more groups of emitters, each of the one or more groups of emitters exhibiting a respective characteristic spectral power distribution; one or more power conversion circuitry units, each of the one or more power conversion circuitry units associated with a respective one of the one or more groups of emitters and configured to modulate power to its respective one of the one or more groups of emitters; at least one processor configured to generate and transmit control signals to the one or more power conversion circuitry units, wherein each of the one or more power conversion circuitry units modulates power to its respective one of the one or more groups of emitters in accordance with the control signals; at least one temperature sensor coupled to the at least one processor and positioned near at least one of the one or more groups of emitters, the at least one temperature sensor configured to sense a temperature of the at least one of the one or more groups of emitters and transmit the sensed temperature to the at least one processor; and a memory unit coupled to the at least one processor and configured to store data relating to the one or more groups of emitters and the control signals.

Embodiments can further provide a lighting device further comprising a communication interface coupled to the at least one processor and configured to transmit communication signals relating to the one or more groups of emitters. Embodiments can further provide a lighting device wherein a globally unique device identifier associated with the one or more groups of emitters is stored in the memory unit. Embodiments can further provide a lighting device wherein the at least one processor implements an algorithm to generate the control signals in response to the sensed temperature to maintain an operating temperature of each of the one or more groups of emitters below a threshold temperature or above the threshold temperature. Embodiments can further provide a lighting device wherein the algorithm is unique to each of the one or more groups of emitters and is related to the respective characteristics spectral power distribution of each of the one or more groups of emitters. Embodiments can further provide a lighting device wherein the sensed temperature, the control signals, and an average current delivered to each of the one or more groups of emitters is stored in the memory unit for use by the at least one processor for generating the control signals. Embodiments can further provide a lighting device wherein the respective characteristics spectral power distribution of the one or more groups of emitters are selected to achieve desired affects for plants contained within the horticultural environment.

Embodiments can further provide a light sensing device for sensing characteristics of light in a horticultural environment, the light sensing device comprising at least one light sensing element configured to receive light from a conditioning optical assembly; at least one temperature sensor positioned near the at least one light sensing element and configured to sense a temperature of the light sensing element; at least one processor configured to receive data relating to the received light and the sensed temperature; and a memory unit coupled to the at least one processor and configured to store data relating to the received light and the sensed temperature.

Embodiments can further provide a lighting device further comprising a communication interface coupled to the at least one processor and configured to transmit communication signals relating to the at least one light sensing element and the received light. Embodiments can further provide a lighting device wherein a globally unique device identifier associated with the at least one light sensing element is stored in the memory unit. Embodiments can further provide a lighting device further comprising a link to a central controller configured to store calibration data. Embodiments can further provide a lighting device wherein the conditioning optical assembly forms an aperture to an optical cavity, wherein walls of the cavity are configured to exhibit high optical reflectance from an applied coating or film. Embodiments can further provide a lighting device wherein the at least one processor implements an algorithm to modify light signals based on a response of the at least one light sensing element. Embodiments can further provide a lighting device further comprising a proximity sensing element configured to generate a proximity signal representing a distance to proximal objects obstructing the at least one light sensing element.

Embodiments can further provide a method for compensating for natural light, comprising acquiring a composite spectrum and intensity of natural light from at least one lighting device; comparing the composite spectrum and intensity to one or more light formulas comprising spectrum directives and PAR directives; communicating one or more spectrum and intensity setpoints to the at least one lighting device; generating, by the at least one lighting device, one or more control signals; and generating, by the lighting device, irradiance in accordance with the one or more control signals.

Embodiments can further provide a method further comprising acquiring the composite spectrum and intensity through one or more sensing devices. Embodiments can further provide a method further comprising acquiring the spectrum and intensity using one or more calculation techniques using validation signals from one or more lighting devices in combination with one or more external data sources that characterize natural light. Embodiments can further provide a method further comprising receiving, by a processor, the one or more spectrum and intensity setpoints; receiving, by the processor, condition data relating to natural sunlight exposure; generating, by the processor, one or more control signals for the lighting device. Embodiments can further provide a method further comprising providing the condition data to the processor by a central controller. Embodiments can further provide a method wherein the condition data includes at least one of operator inputted data, light sensor data, and remote weather data. Embodiments can further provide a method further comprising providing the condition data to the processor through one or more light sensors. Embodiments can further provide a method further comprising detecting, using the one or more light sensors, composite irradiance and composite spectral distribution from natural sunlight and the one or more lighting devices. Embodiments can further provide a method further comprising calculating composite irradiance and composite spectral distribution from one or more real time intensity estimates, real time spectra estimates, and the condition data. Embodiments can further provide a method further comprising alerting one or more operators when the composite irradiance and composite spectral distribution deviates by a preset offset from one or more predetermined setpoints.

Embodiments can further provide an apparatus for providing multiple spectra of light, comprising a first lighting device configured to provide irradiance of a first characteristic spectral power distribution to a first portion of at least one plant; a second lighting device configured to provide irradiance of a second characteristic spectral power distribution to a second portion of the at least one plant.

Embodiments can further provide an apparatus wherein the first portion of the at least one plant substantially includes the top of the plant. Embodiments can further provide an apparatus wherein the second portion of the at least one plant includes the foliage below the canopy. Embodiments can further provide an apparatus wherein the first characteristic spectral power distribution and the second characteristic spectral power distribution change throughout a growth phase of the at least one plant. Embodiments can further provide an apparatus further comprising at least one light sensing device configured to detect the ambient photosynthetic active radiation transmitted through the first portion of the at least one plant.

Embodiments can further provide a connected system for providing lighting, comprising one or more lighting devices, each comprising a receptacle configured to accept one or more modular devices; wherein the modular devices can include at least one of a light sensor device, a depth sensing element, a camera, a stereoscopic camera, a hyperspectral camera, an infrared camera, a thermal imaging camera, a 3D camera, a 3D scanner, a spectroscopy device, a radar device, an environmental sensor, a distance sensor, or a light source; one or more light sensing devices; and a central controller; wherein the one or more lighting devices, one or more light sensing devices, and the central controller can be adapted to identify one or more spatial relationships between the one or more lighting devices and the one or more light sensing devices.

Embodiments can further provide a system wherein the identification of the one or more spatial relationships can be determined through modulating at least one emitter in at least one lighting device. Embodiments can further provide a system wherein the at least one emitter can be modulated to communicate binary data. Embodiments can further provide a system wherein the at least one emitter is configured to modulate by shifting a frequency of the emitted light in a specific pattern. Embodiments can further provide a system for lighting, comprising one or more lighting devices, each comprising a plurality of emitters and a control interface configured to implement a light formula comprising at least one time directive that corresponds to at least one spectrum directive.

Embodiments can further provide a system wherein the spectrum directive further comprises control signals for the plurality of emitters. Embodiments can further provide a system wherein the light formula further comprises an intensity directive describing a required intensity per unit area of plant canopy. Embodiments can further provide a system wherein the light formula further comprises an intensity interval associated with the spectrum directive; wherein the intensity interval is a cumulative total of moles of photons delivered per unit area by the lighting devices over time.

Embodiments can further provide a system comprising a central controller configured to receive a specification of a light formula; wherein the central controller is configured to process the spectrum and intensity directives of the light formula in relation to a spectral power distribution of one or more emitter groups installed in the lighting devices as well as lighting device height in relation to a plant canopy to generate a light schedule composed of spectrum and intensity setpoints. Embodiments can further provide a system wherein the lighting device height is specified through a user interface on the central controller.

Embodiments can further provide a system with each of the lighting devices further comprising a processor configured to receive the spectrum directives and intensity directives along with condition data; generate control signals for the emitters and one or more actuators in order to maintain spectrum distribution and irradiance intensity. Embodiments can further provide a system wherein the processor is further configured to receive composite irradiance and composite spectral distribution data provided by light sensors positioned to detect from natural sunlight and the lighting devices. Embodiments can further provide a system wherein the processor is further configured to receive composite irradiance and composite spectral distribution data calculated based on real time intensity estimates and real time spectra estimates. Embodiments can further provide a system further comprising an alert system configured to alert one or more operators when the composite irradiance and composite spectral distribution data deviates from setpoints by a preset offset. Embodiments can further provide a system wherein the processor is further configured to interpret light formulas; generate light schedules; and generate additional control signals based on the light schedules.

Embodiments can further provide a system wherein the control signals for the actuators adjust a height of the lighting device to alter an irradiance footprint. Embodiments can further provide a system wherein the control signals for the actuators adjust the position of at least one reflector assembly, lens assembly, or louvre to alter an irradiance footprint. Embodiments can further provide a system wherein the light formula further comprises one or more limits on irradiance levels during specific times of a growth cycle.

Embodiments can further provide a flux vectoring light system, comprising a lighting device comprising at least one emitter having a spectral power distribution within the visible spectrum; a communication interface; a processor; at least one actuator; at least one mobile optical element comprising a formed reflector assembly; wherein the at least one actuator is adapted to move the at least one mobile optical element relative to an emission axis of the lighting device.

Embodiments can further provide a system wherein the processor is configured to generate control signals for the at least one actuator in response to one or more actuator directives received by the communication interface. Embodiments can further provide a system with the lighting device further comprising at least one stationary optical element comprising a reflector assembly. Embodiments can further provide a system wherein the reflector assembly is configured to be actuated as to modulate the angular distribution of irradiance emitted by the lighting device. Embodiments can further provide a system with the lighting device further comprising at least one stationary optical element comprising a lens assembly. Embodiments can further provide a system further comprising a depth sensing element configured to detect the average height of one or more plants relative to the lighting device; wherein one or more raw signals generated by the depth sensing element are computed by the processor and communicated to a central controller. Embodiments can further provide a system further comprising at least one camera configured to generate one or more image frames of a plant; wherein the one or more images are communicated by the camera to a central controller and analyzed to generate a canopy height directive.

Embodiments can further provide a method of hyperspectral imaging, comprising acquiring, via one or more cameras, one or more image frames of a plant canopy throughout a growth cycle of the plant canopy; transmitting the one or more image frames to a processor; generating, via the processor, one or more analysis results representing at least one of plant health, plant pigment development, plant water stress, leaf reflectance, leaf color, plant density, flower stage, flower density, fruit development, disease presence, plant shape, or canopy height; storing the one or more analysis results and image frames in a database.

Embodiments can further provide a method further comprising acquiring the one or more image frames at predetermined intervals throughout the growth cycle of the plant canopy. Embodiments can further provide a method wherein at least one of the one or more cameras is sensitive to light in the visible spectrum. Embodiments can further provide a method wherein at least one of the one or more cameras is sensitive to light in multiple spectra. Embodiments can further provide a method further comprising arranging at least one lighting device in proximity to the plant canopy; providing one or more control signals to direct the lighting device to emit irradiance of a specific spectral power distribution; capturing one or more images exhibiting at least one spectral response channel. Embodiments can further provide a method further comprising providing one or more additional control signals to direct the lighting device to emit irradiance of one or more additional specific spectral power distributions in succession; capturing one or more images exhibiting at least one spectral response channel.

Embodiments can further provide a horticultural wall system, comprising at least one sensor configured to detect a first reflectance spectra and a second reflectance spectra from the horticultural wall; at least one lighting device configured to generate reflected light levels consistent with an occupant light formula; wherein the occupant light formula is based on real time measurements taken from the at least one sensor directed at the horticultural wall.

Embodiments can further provide a system further comprising a second sensor positioned in proximity to the horticultural wall along a vertical plane; and wherein the at least one lighting devices are configured to emit enough light to satisfy the occupant light formula and a horticultural light formula. Embodiments can further provide a system further comprising a processor; wherein at least one sensor is configured to generate at least one image frame; and wherein the processor is configured to compute at least one of canopy reflectance spectra, canopy reflected light level, reflected equivalent melanopic lux, incident light level, or incident spectra using the at least one image frame. Embodiments can further provide a system further comprising a second sensor positioned in proximity to the horticultural wall along a vertical plane; and wherein the at least one lighting devices are configured to emit enough light to satisfy the occupant light formula and daily light interval light requirements defined within a horticultural light formula.

BRIEF DESCRIPTION OF THE FIGURES

The foregoing and other aspects of the embodiments are best understood from the following detailed description when read in connection with the accompanying drawings. For the purpose of illustrating the invention, shown in the drawings are embodiments that are presently preferred, it being understood, however, that the invention can be not limited to the specific instrumentalities disclosed. Included in the drawings are the following Figures:

FIG. 5 shows the temperature coefficient associated with two exemplary LED emitters.

FIG. 10A depicts an exemplary spectral power distribution of several groups of emitters, wherein one group exhibits substantially white emission with a correlated color temperature (CCT) of 5,000-20,000 kelvin, one group exhibits a narrow band substantially far red emission, and one group exhibits a narrow band substantially red emission.

FIG. 16B depicts the spectral power distribution emitted by a lighting device, wherein control signals are computed as to maintain the combination of emission from the lighting device and natural sunlight to levels defined within a light formula.

FIG. 21 shows a lighting device with a modular assembly installed and directed toward the plant canopy.

FIG. 22A depicts a modular sensing and communication assembly incorporating a power and data interconnect, an elastomer seal, and a latching mechanism.

DETAILED DESCRIPTION OF EXEMPLARY EMBODIMENTS

Lighting Device

Figure 1:
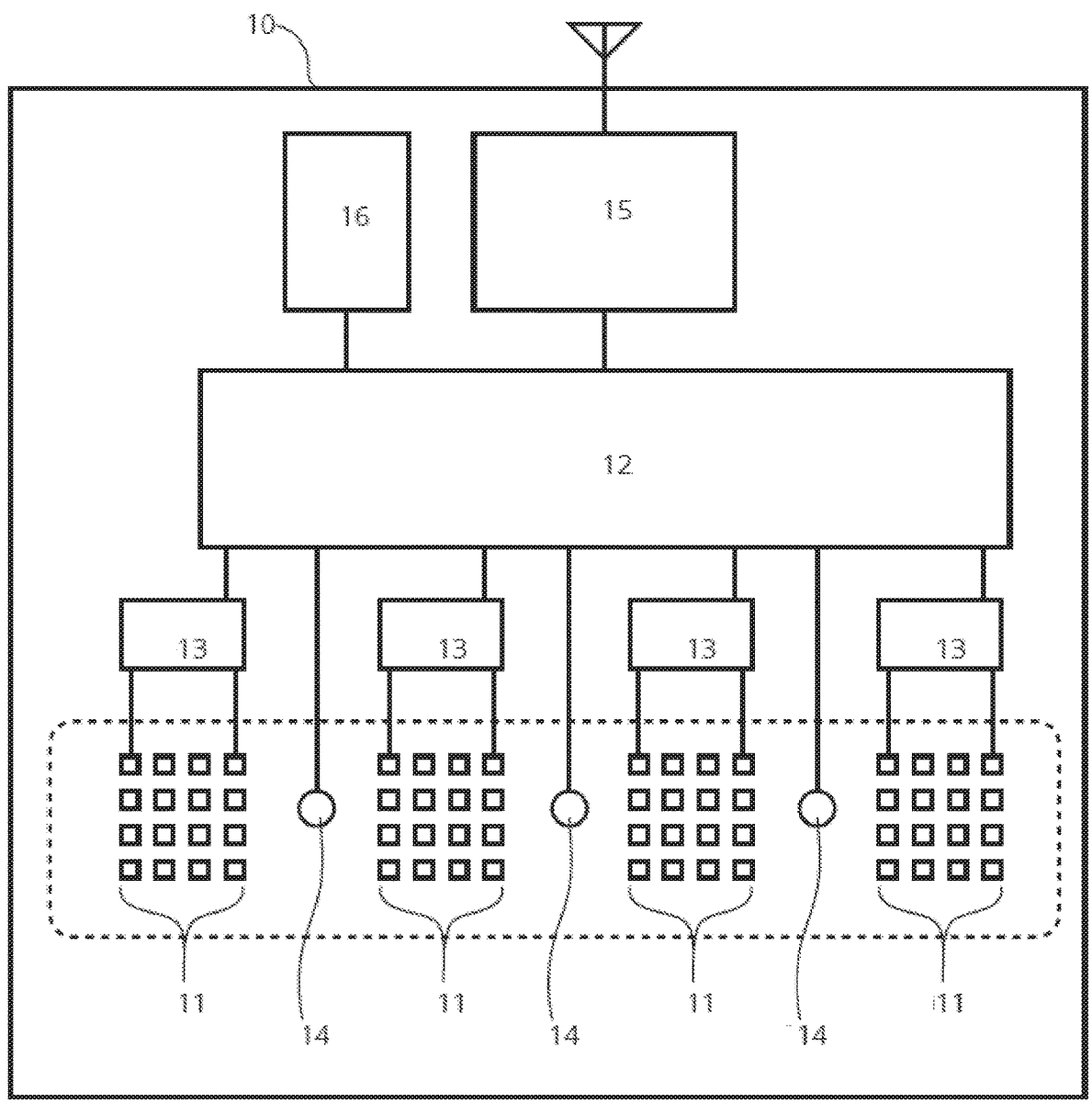
FIG. 1 shows a block diagram of a horticultural lighting device comprising a plurality of LED emitters, temperature sensing elements, a processing unit, memory, and a communications interface.

As shown in FIG. 1, according to embodiments herein, a lighting device generates light of a precise and repeatable spectral power distribution and intensity. In an embodiment, the lighting device 10 comprises a plurality of emitters 11, at least one processor 12, memory 16 (which can be, according to an embodiment, non-volatile memory), and at least one temperature sensor 14. In a further embodiment of the invention, the lighting device may further comprise a communication interface 15 and a globally unique device identifier stored in memory 16.

Many examples of prior art exist in which temperature or light measurements internal to a lighting device are utilized by an algorithm and control circuit to regulate the output of emitters. In these examples of the prior art, regulation methods making use of temperature or light measurements internal to lighting devices are directed at protecting emitters from thermal damage and controlling the color point of white and color tunable lighting devices. Further, these examples of prior art do not account for the operating history of the lighting device, during which emitters will exhibit a certain amount of degradation in intensity and shift in wavelength. Finally, the use of light sensors within lighting devices, particularly for high power lighting devices adapted for horticultural applications, has a number of disadvantages, most notably that light sensors placed within confined cavities within lighting devices often are not equally exposed to irradiance from all groups of emitters, making light sensor measurements a poor correlation to the composite irradiance of a plurality of emitters; additionally, light sensors internal to lighting devices exhibit a certain temperature coefficient and modes of degradation, further complicating light regulation methods. Embodiments disclosed herein overcome many of these issues; in various embodiments of the invention, temperature measurements are utilized to determine performance characteristics of emitters under operation, and are described herein.

In an embodiment, a lighting device 10 incorporates a plurality of groups of emitters 11 in close proximity as to generate a composite spectral power distribution, wherein each group of emitters exhibits a characteristic spectral power distribution. In this embodiment, control signals are generated by a processor unit 12 which are passed to power conversion circuitry 13 for each group of emitters, wherein the power conversion circuitry modulates power to each group of emitters in accordance with the control signal, and at least one temperature sensor 14 can be incorporated in close proximity to the groups of LED emitters. FIG. 1 depicts the general arrangement of the aforementioned components. In this embodiment, temperature signals are interpreted by an algorithm computed in the processor unit 12 which generates control signals in response to temperature, as to maintain emitter operating temperature below a threshold temperature. In an embodiment, the algorithm can be unique to each of the groups of emitters and can be related to a characteristic temperature-performance coefficient for the emitters. In a yet further embodiment, the algorithm generates control signals as to maintain each emitter group operating efficiency above a threshold level. In a yet further embodiment, temperature conditions are communicated by the processor 12 to the operator by means of a communication interface 15. In a further embodiment, operating temperatures, control signals, and the average current delivered to the groups of emitters can be continuously stored within memory 16 for use by the algorithm in computing appropriate control signals. In an embodiment of the invention, a globally unique device identifier can be stored within memory 16.

Figure 2:
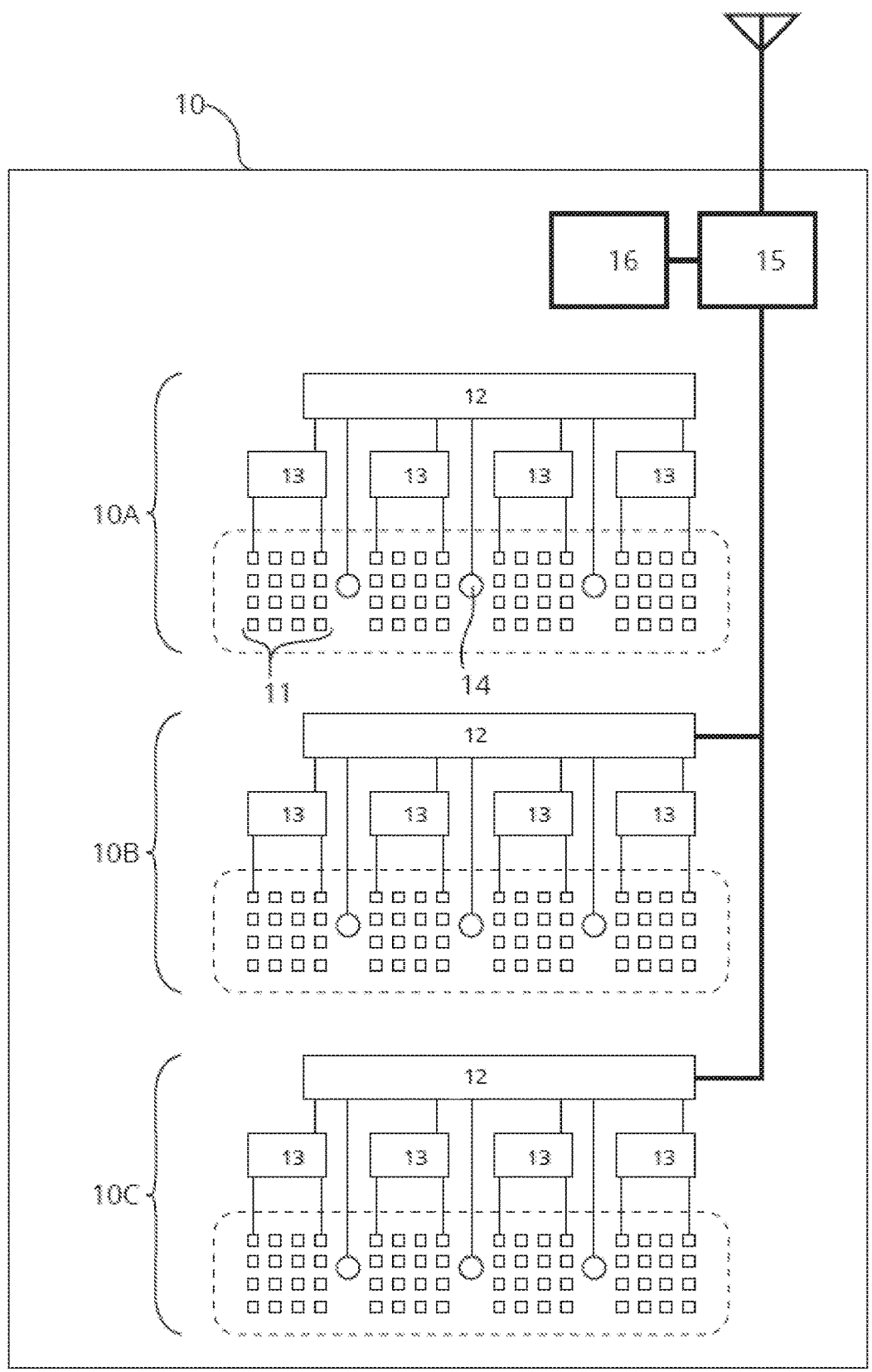
FIG. 2 shows a block diagram of a horticultural lighting device comprising several modules, wherein several modules communicate to at least one radio, transceiver, or network terminal, and each module comprises a plurality of LED emitters, temperature sensing elements, and a processing unit.

In an embodiment, a lighting device 10 comprises a plurality of light emitting subassemblies 10A, 10B, 10C, wherein each light emitting subassembly comprises a plurality of groups of at least one emitter 11, at least one processor 12, power conversion circuitry 13 and at least one temperature sensor 14. In this embodiment, the lighting device may further comprise a communication interface 15 and memory 16. FIG. 2 depicts an arrangement of the light emitting subassemblies 10A, 10B, 10C within the lighting device 10.

Figure 3:
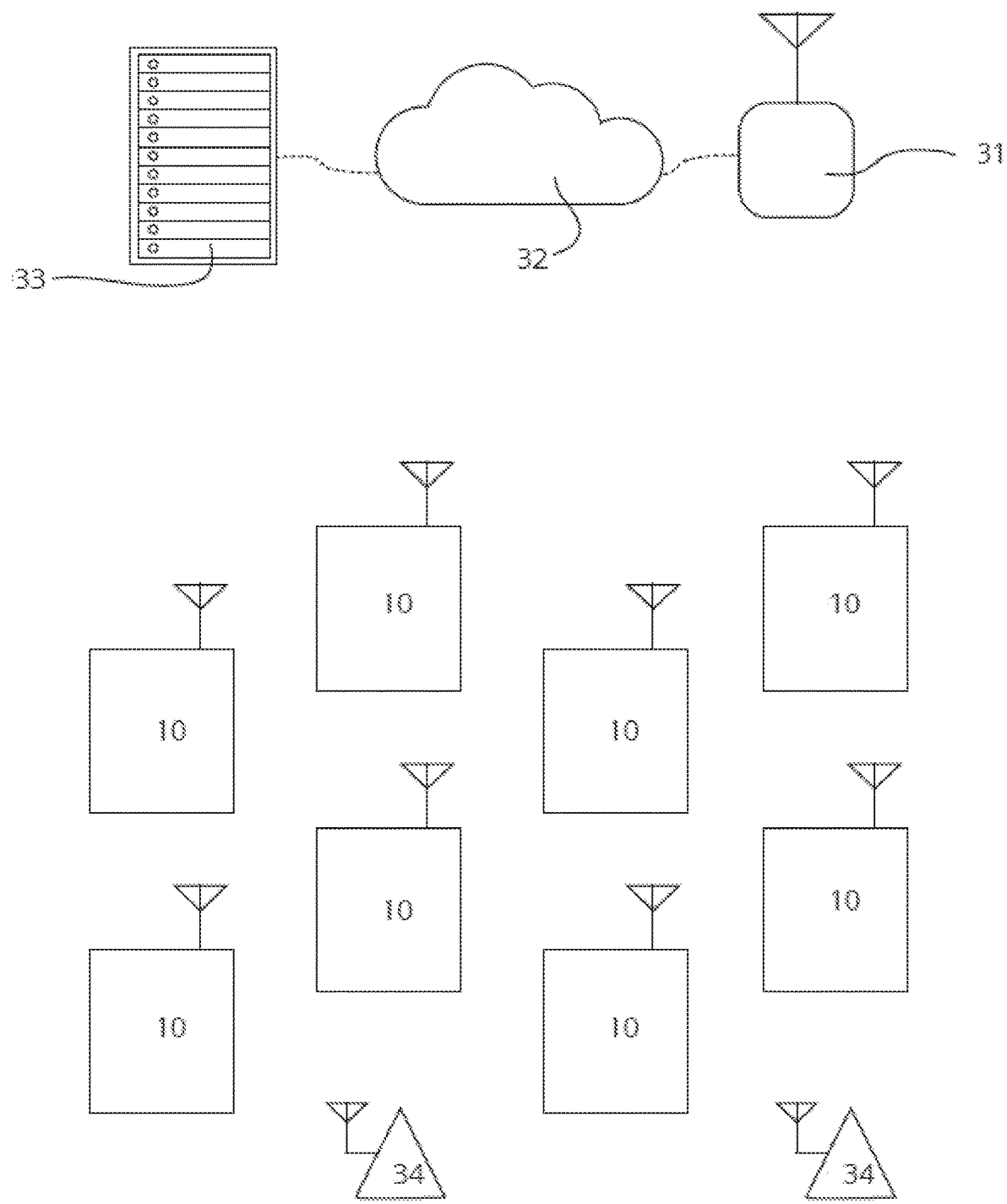
FIG. 3 depicts a network including at least one central controller, at least one lighting device, at least one light sensing device, and a remote server.

In an embodiment, at least one lighting device 10 communicates with a central controller 31; FIG. 3 depicts this arrangement. In this embodiment, globally unique device identifiers, operating temperature signals, control signals, and current signals are communicated to the central controller 31 over a communication network and the identifiers and signals are logged within a time series database or similar repository stored within the central controller 31. In a further embodiment, the central controller 31 can be connected to a local area network or the internet 32, and the identifiers and signals are recorded within a database stored on a remote server 33. In an embodiment, the communication network comprises a wireless communication network. In a further embodiment, light sensing devices 34 measure at least one wavelength range of UV, visible, or infrared light and are associated with a globally unique device identifier, communicate the measurements and the identifier to the central controller 31, wherein the central controller 31 records the measurements and the identifiers to a time series database or similar repository. In some embodiments, the measurements are stored in a database hosted within memory inside the lighting device.

Figure 4:
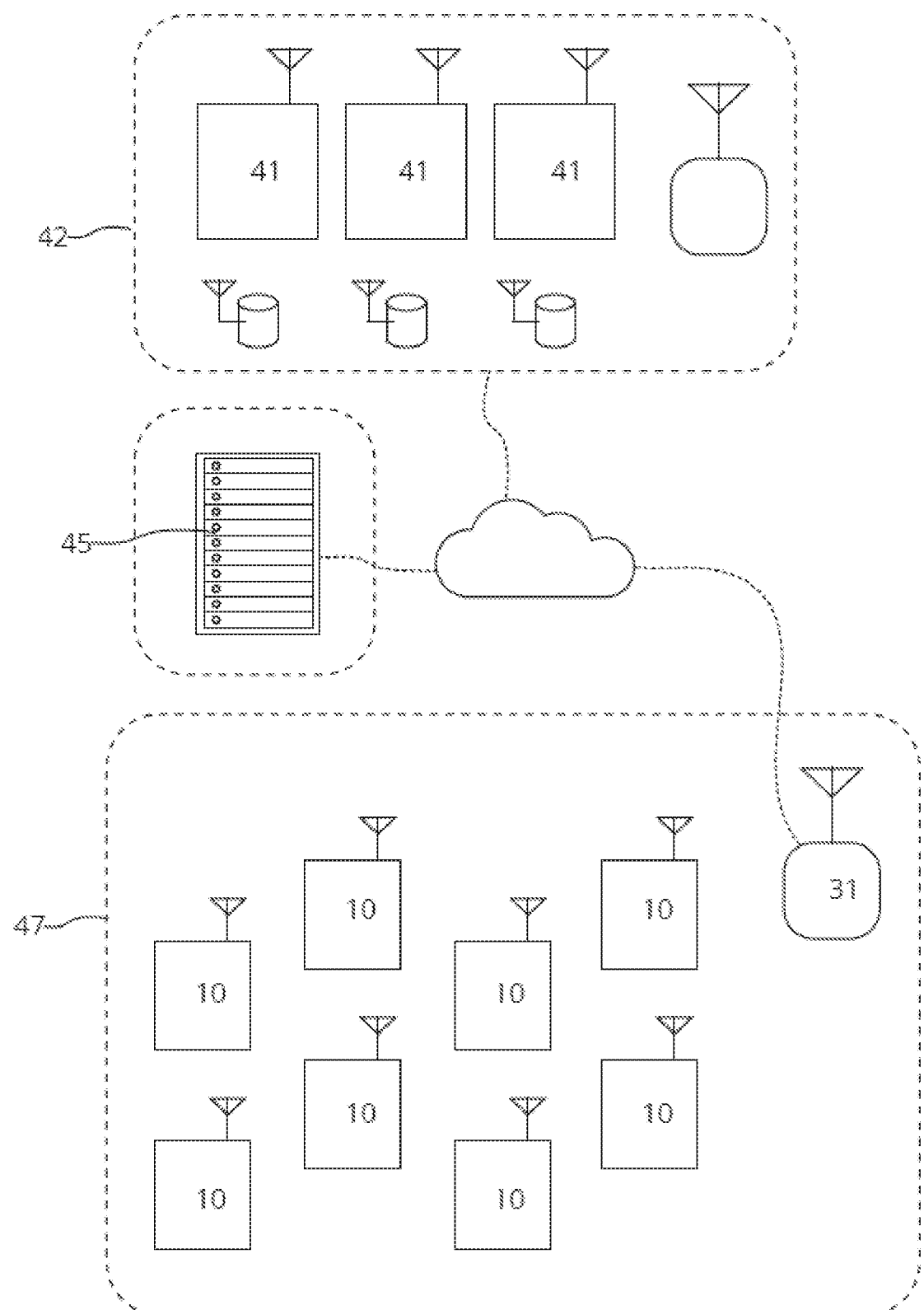
FIG. 4 depicts a network including at least one central controller, at least one lighting device, at least one light sensing device, a remote facility within which at least one reference lighting device is operated, and a remote server.

In another embodiment (see FIG. 4), at least one reference lighting device 41 can be operated within a test facility 42 wherein periodic optical measurements, operating temperature signals, and current signals gathered from the reference lighting device are recorded and comprise a reference dataset. In this embodiment, the reference dataset can be transmitted to a remote server 45. In this embodiment, at least one lighting device 10 can be operated in a remote facility 47, and at least one central controller 31 within the remote facility 47 communicates to the remote server 45 to receive the reference dataset or a derivative thereof. In this embodiment, the reference dataset or derivative thereof can be generally useful to compute accurate control signals for lighting devices which have degraded in performance over time. In this embodiment, the optical measurements may be generated by automatic sensors or detectors 43 within the test facility 42.

Figure 6A:
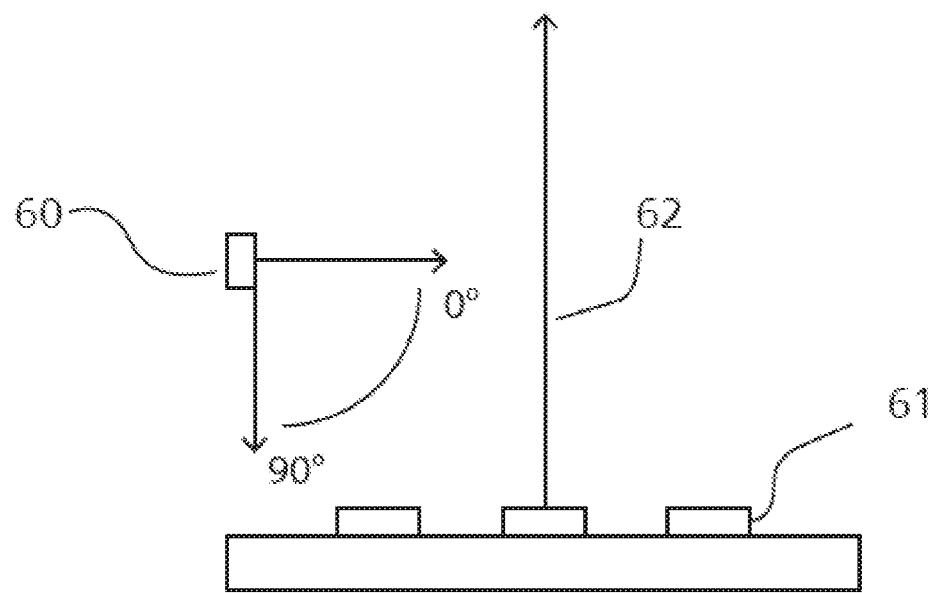
FIG. 6A depicts a thermopile or non-contact temperature sensing element directed toward a group of LED emitters, wherein the angle between the light emitting axis and the non-contact sensing axis is between 0-90 degrees.
Figure 6B:
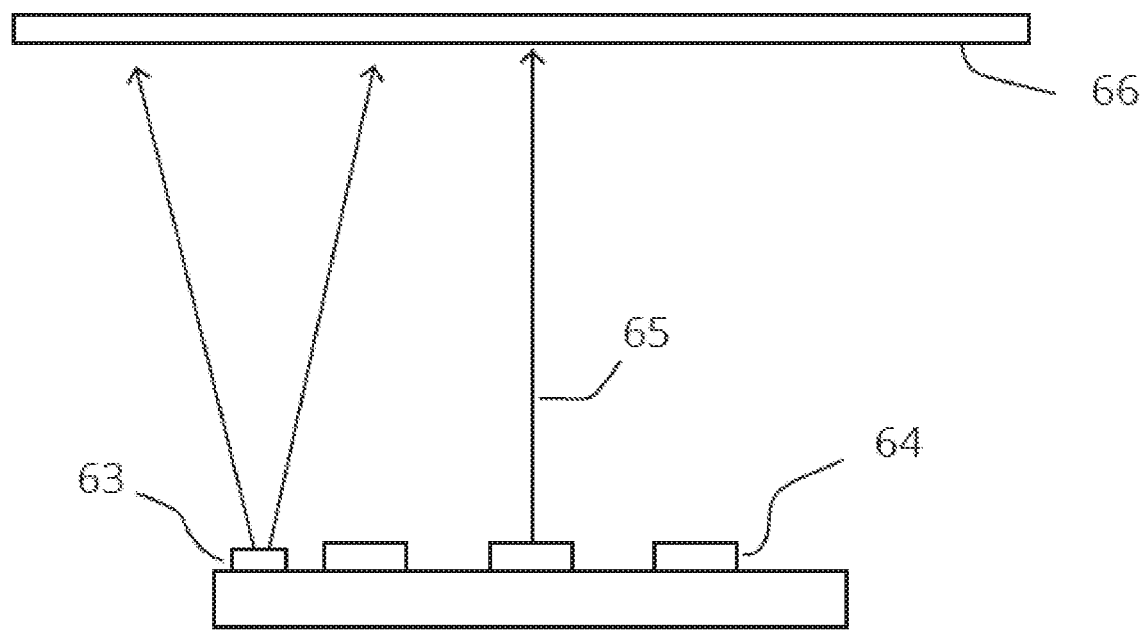
FIG. 6B depicts a thermopile or non-contact temperature sensing element directed toward a lens cover or optical window, wherein the thermopile or non-contact temperature sensing element detects reflected radiant IR radiation emitted by emitters.

Due to the relationship between emitter temperature and efficacy present with most types of emitters including light emitting diodes (LEDs), temperature sensors are, according to an embodiment, incorporated in close proximity to the emitters. By way of example, AlInGaP based LEDs exhibit a marked decrease in radiant flux output with increasing temperature; InGaN LEDs exhibit this behavior as well to a lesser extent. FIG. 5 depicts the relationship between emitted radiant flux 50 and emitter temperature 51 for AlInGaP 52 and InGaN 53 LED emitters. In an embodiment, the at least one temperature sensor may comprise a thermistor, thermocouple, digital temperature sensor, light emitting diode, Zener or schottky diode, thermopile, or a thermopile array. In an embodiment (see FIG. 6A), the at least one temperature sensor comprises at least one thermopile 60 oriented adjacent or substantially adjacent to the emitters 61 at an angle between 0 and 90 degrees from perpendicular to the light emitting axis 62 as to detect long wave infrared radiation emitted by the emitters. In another embodiment (see FIG. 6B), the at least one temperature sensor comprises at least one thermopile 63 placed adjacent or substantially adjacent to emitters 64 and oriented parallel or substantially parallel to the light emitting axis 65. In this embodiment, a lens or transparent cover 66 can be provided above the emitters, and the thermopile 63 detects a reflected long wave infrared radiation from the emitters.

Light of nearly any characteristic spectral power distribution may be applied for the purpose of horticultural illumination and for embodiments disclosed herein. According to an embodiment, lighting devices that emit light in a range of characteristic spectral power distributions which are generally relevant to plant growth, flowering, photosynthesis, photomorphogenesis, photoperiodism, and other plant functions are utilized. According to an embodiment, compositions of emitters which emit a characteristic spectral power distribution, wherein drive circuitry and a processor 12 within the lighting device modulate the emitters to achieve a broad range of variability in the composite spectral power distribution of the lighting device, where such variability in spectral power distribution can be useful for modulating plant growth and plant functions, are provided. The compositions of emitters generally relate to modulating the proportion of irradiance in the red region, the green region, the blue region, and the far red region; the embodiments incorporate spectral selectivity among the composite irradiance in these ranges while maintaining the ability to cover the entire spectrum relevant to plant growth of 400-750 nm. In some embodiments, disclosed in the following paragraphs, more spectral selectivity can be offered to portions of the spectrum which are highly relevant to certain plant functions, while less spectral selectivity can be offered to regions of the spectrum which are less relevant to certain plant functions. By way of example, one embodiment discloses two individually addressable groups of emitters with substantially red emission, where one group exhibits a narrow band red emission and another group exhibits a wide band red distribution, while the entire yellow-green-orange region can be covered by one group of emitters exhibiting wide band substantially green emission. Several compositions of emitters are disclosed herein.

Figure 7A:
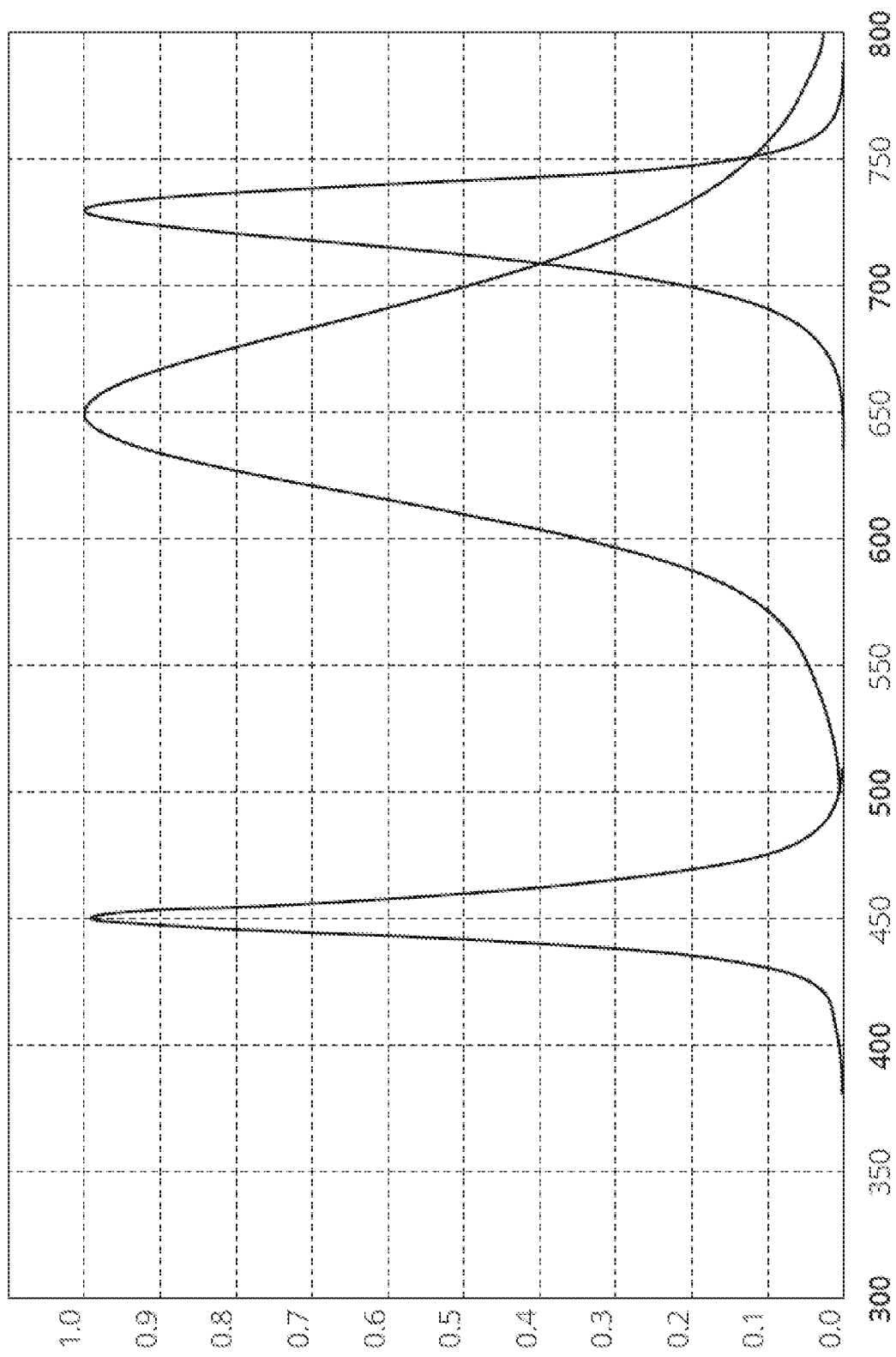
FIG. 7A depicts an exemplary spectral power distribution of several groups of emitters, wherein one group exhibits a narrow band substantially blue emission, one group exhibits a narrow band substantially far red emission, and one group exhibits a wide band substantially red emission.
Figure 7B:
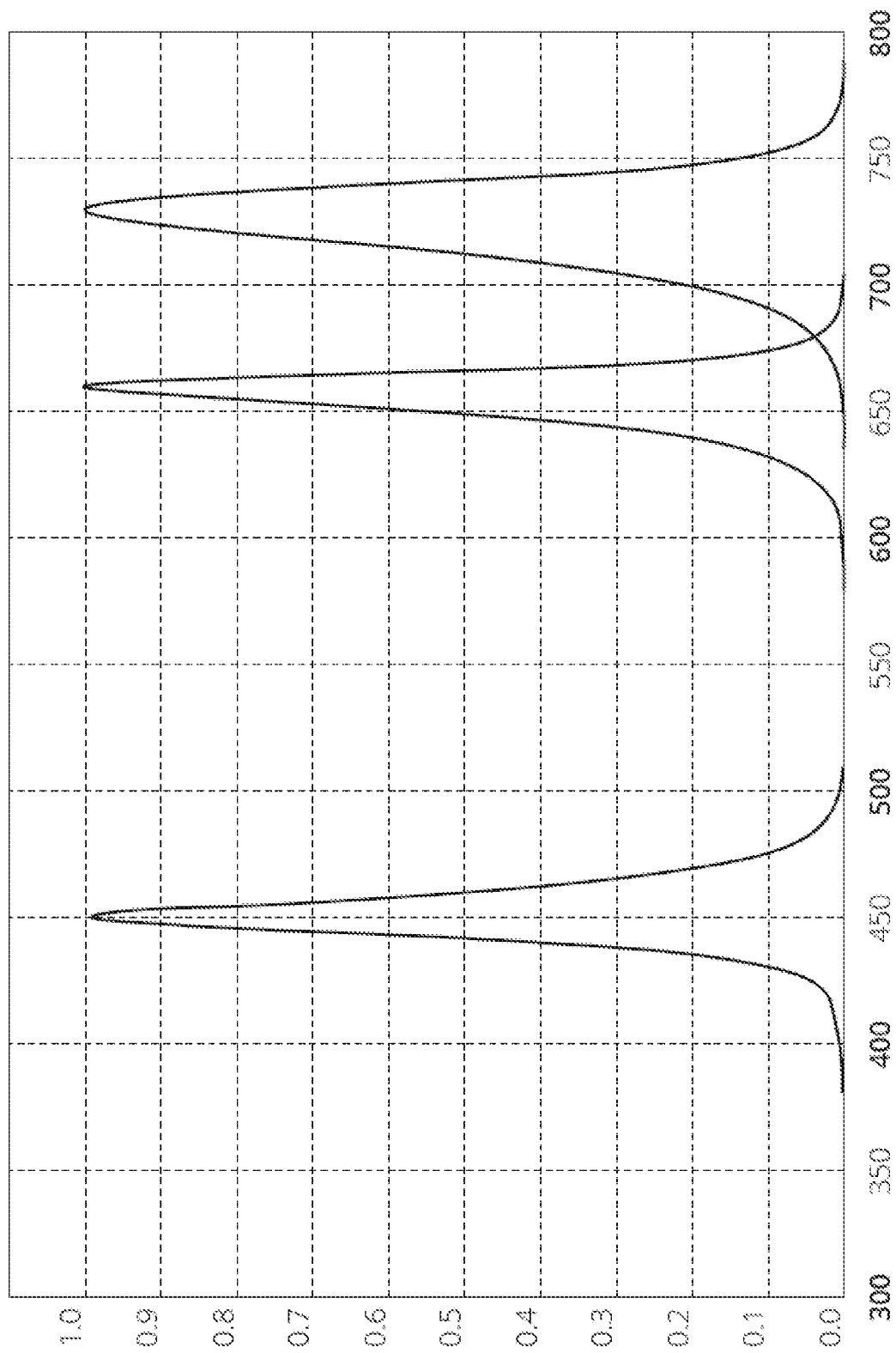
FIG. 7B depicts an exemplary spectral power distribution of several groups of emitters, wherein one group exhibits a narrow band substantially blue emission, one group exhibits a narrow band substantially far red emission, and one group exhibits a narrow band substantially red emission.
Figure 8A:
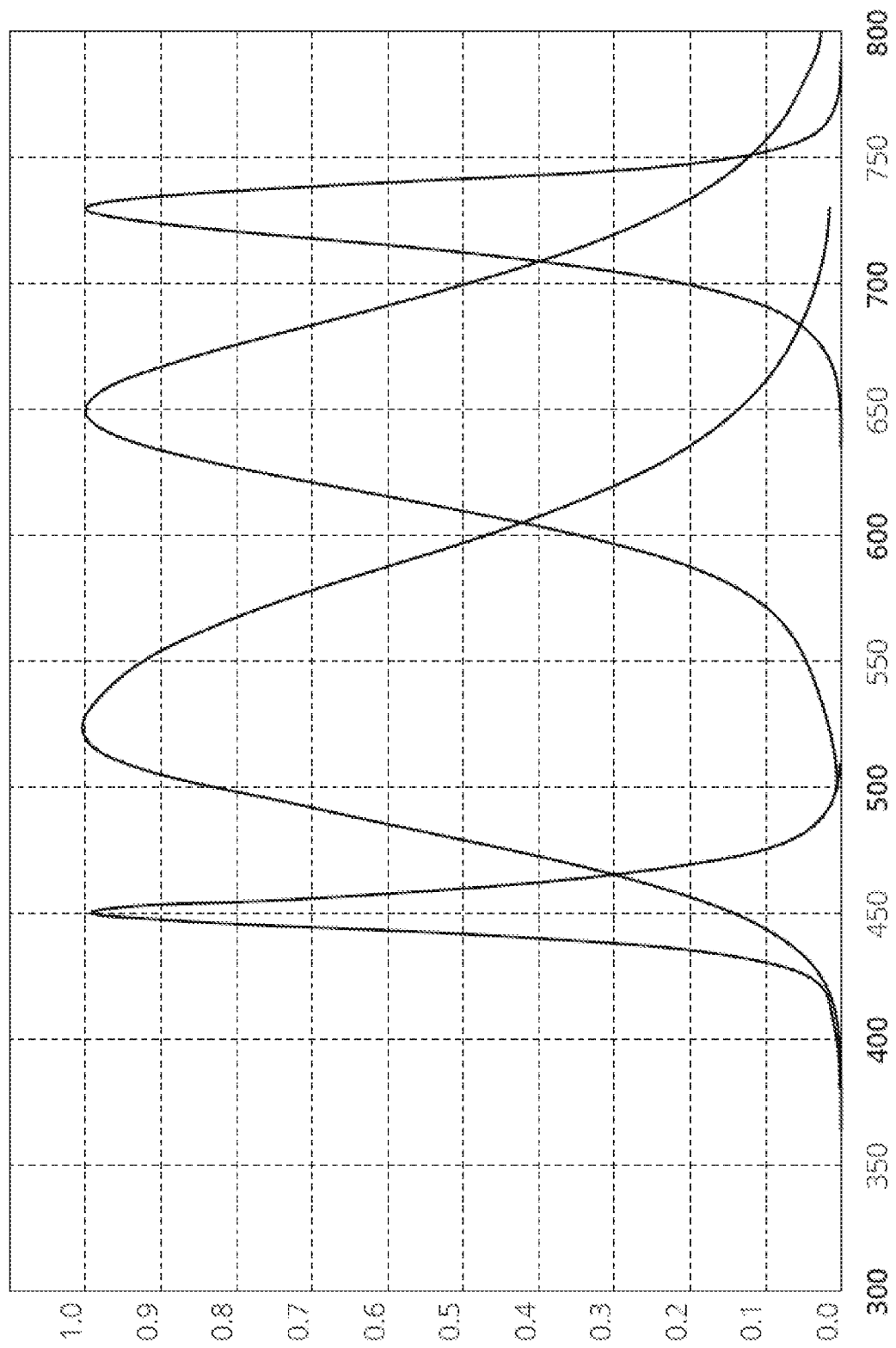
FIG. 8A depicts an exemplary spectral power distribution of several groups of emitters, wherein one group exhibits a narrow band substantially blue emission, one group exhibits a narrow band substantially far red emission, and one group exhibits a wide band substantially red emission, and one group exhibits a wide band substantially green emission.
Figure 8B:
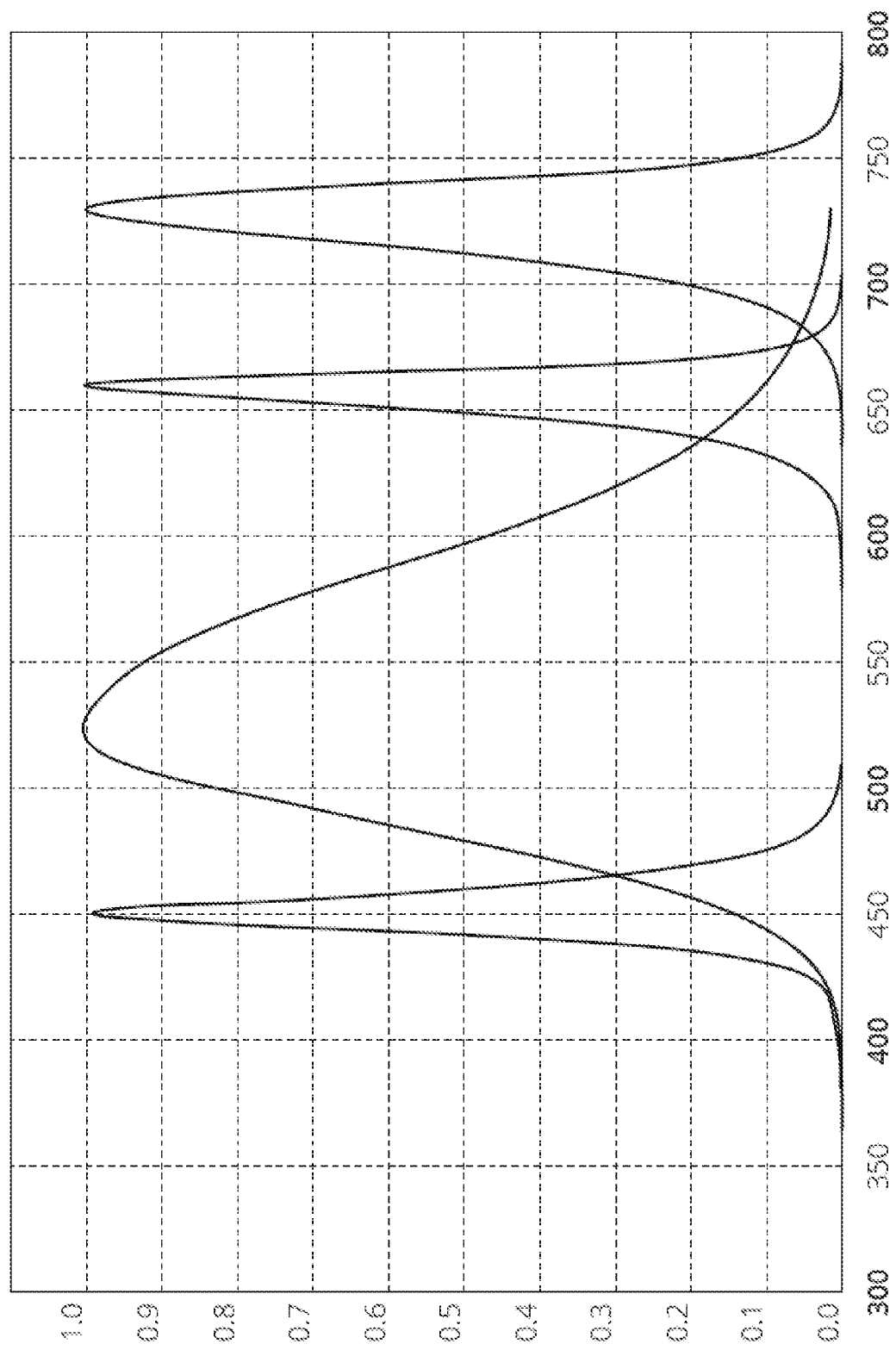
FIG. 8B depicts an exemplary spectral power distribution of several groups of emitters, wherein one group exhibits a narrow band substantially blue emission, one group exhibits a narrow band substantially far red emission, and one group exhibits a narrow band substantially red emission, and one group exhibits a wide band substantially green emission.

(Blue+broad green+broad red OR mono red+FR) In an embodiment, a lighting device contains a plurality of groups of emitters, wherein a first group of emitters exhibits a characteristic spectral power distribution in the blue region with a peak wavelength of 440-475 nm and a full width half maximum (FWHM) of 12-30 nm, a second group of emitters exhibits a characteristic spectral power distribution in the far-red region with a peak wavelength of 720-740 nm and a FWHM of 15-40 nm, and a third group of emitters exhibits a characteristic spectral power distribution substantially in the red region; in one embodiment, the third group of emitters exhibits a peak wavelength of 640-670 nm and a FWHM of 60-120 nm (FIG. 7A depicts an exemplary spectral power distribution of emitters), and in another embodiment, the third group of emitters exhibits a peak wavelength of 640-670 nm and a FWHM of 15-60 nm (FIG. 7B depicts an exemplary spectral power distribution of emitters). In a further embodiment, a fourth group of emitters exhibits a characteristic spectral power distribution substantially in the green region with a peak wavelength of 513-547 nm and a FWHM of 60-140 nm. FIGS. 8A and 8B show exemplary characteristic spectral power distributions of the groups of emitters in these embodiments incorporating a fourth group of emitters.

Figure 9A:
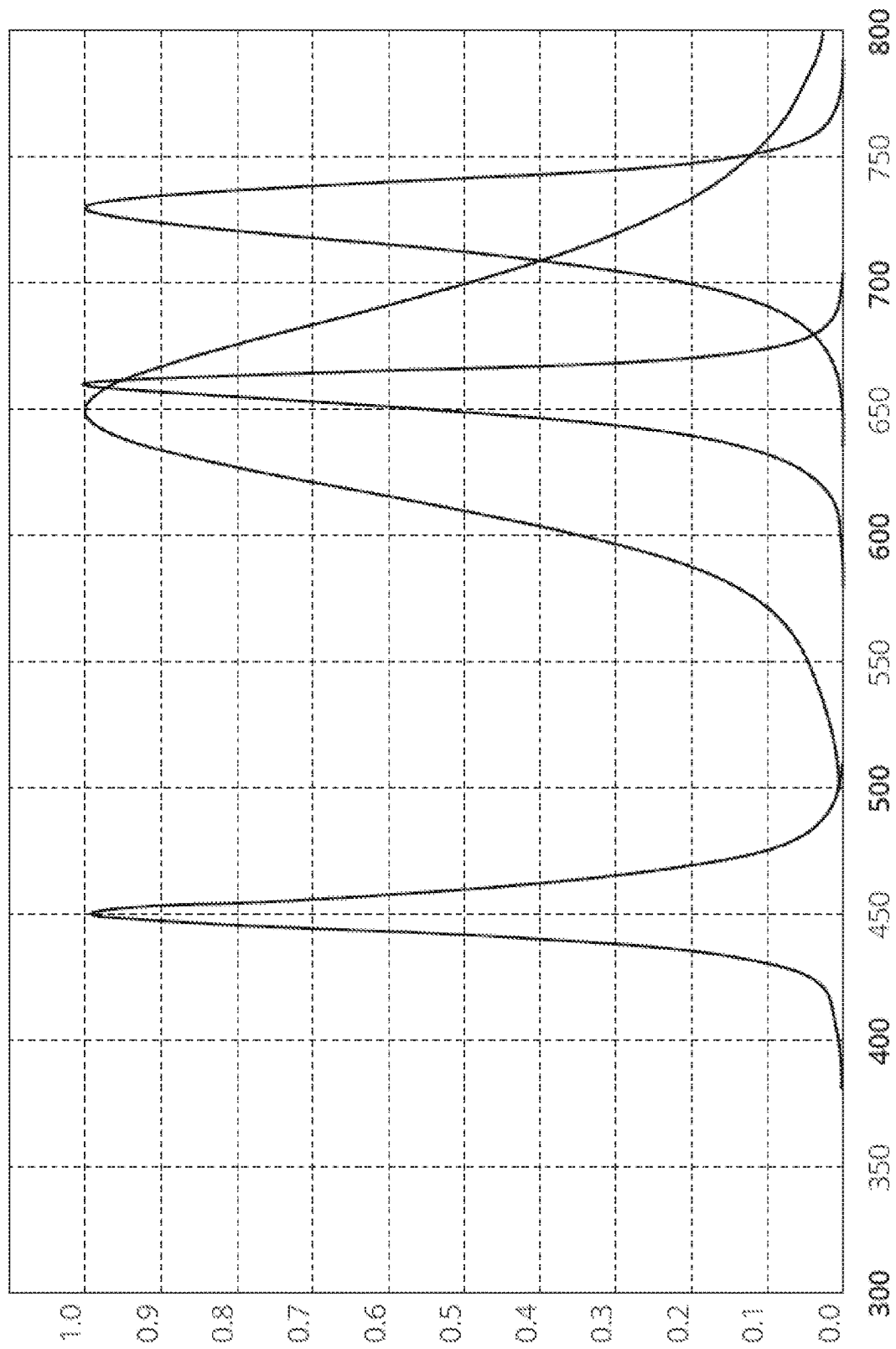
FIG. 9A depicts an exemplary spectral power distribution of several groups of emitters, wherein one group exhibits a narrow band substantially blue emission, one group exhibits a narrow band substantially far red emission, and one group exhibits a wide band substantially red emission, and one group exhibits a wide band substantially red emission.
Figure 9B:
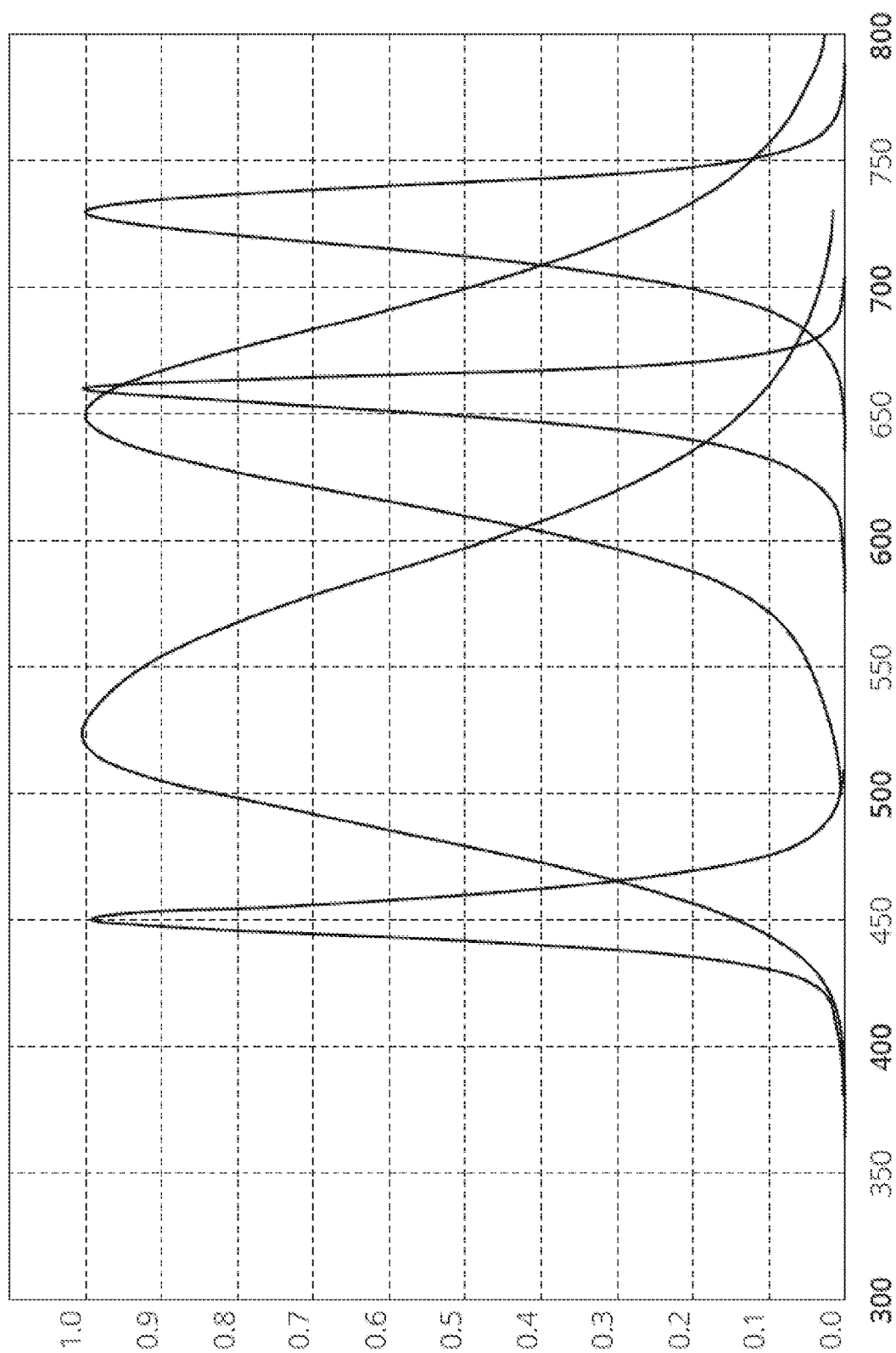
FIG. 9B depicts an exemplary spectral power distribution of several groups of emitters, wherein one group exhibits a narrow band substantially blue emission, one group exhibits a narrow band substantially far red emission, and one group exhibits a wide band substantially red emission, and one group exhibits a wide band substantially red emission, and one group exhibits a wide band substantially green emission.

(Blue+broad green+broad red+mono red+FR) In an embodiment, a lighting device contains a plurality of groups of emitters, wherein a first group of emitters exhibits a characteristic spectral power distribution in the blue region with a peak wavelength of 440-475 nm and a full width half maximum (FWHM) of 12-30 nm, a second group of emitters exhibits a characteristic spectral power distribution in the far-red region with a peak wavelength of 720-740 nm and a FWHM of 15-40 nm, a third group of emitters exhibits a characteristic spectral power distribution substantially in the red region with a peak wavelength of 640-670 nm and a FWHM of 60-120 nm, a fourth group of emitters exhibits a characteristic spectral power distribution in the red region with a peak wavelength of 640-670 nm and a FWHM of 15-60 nm. FIG. 9A shows an exemplary characteristic spectral power distribution of the groups of emitters in this embodiment. In a further embodiment, a fifth group of emitters exhibits a characteristic spectral power distribution substantially in the green region with a peak wavelength of 513-547 nm and a FWHM of 60-140 nm. FIG. 9B shows an exemplary characteristic spectral power distribution of the groups of emitters in this embodiment.

Figure 10B:
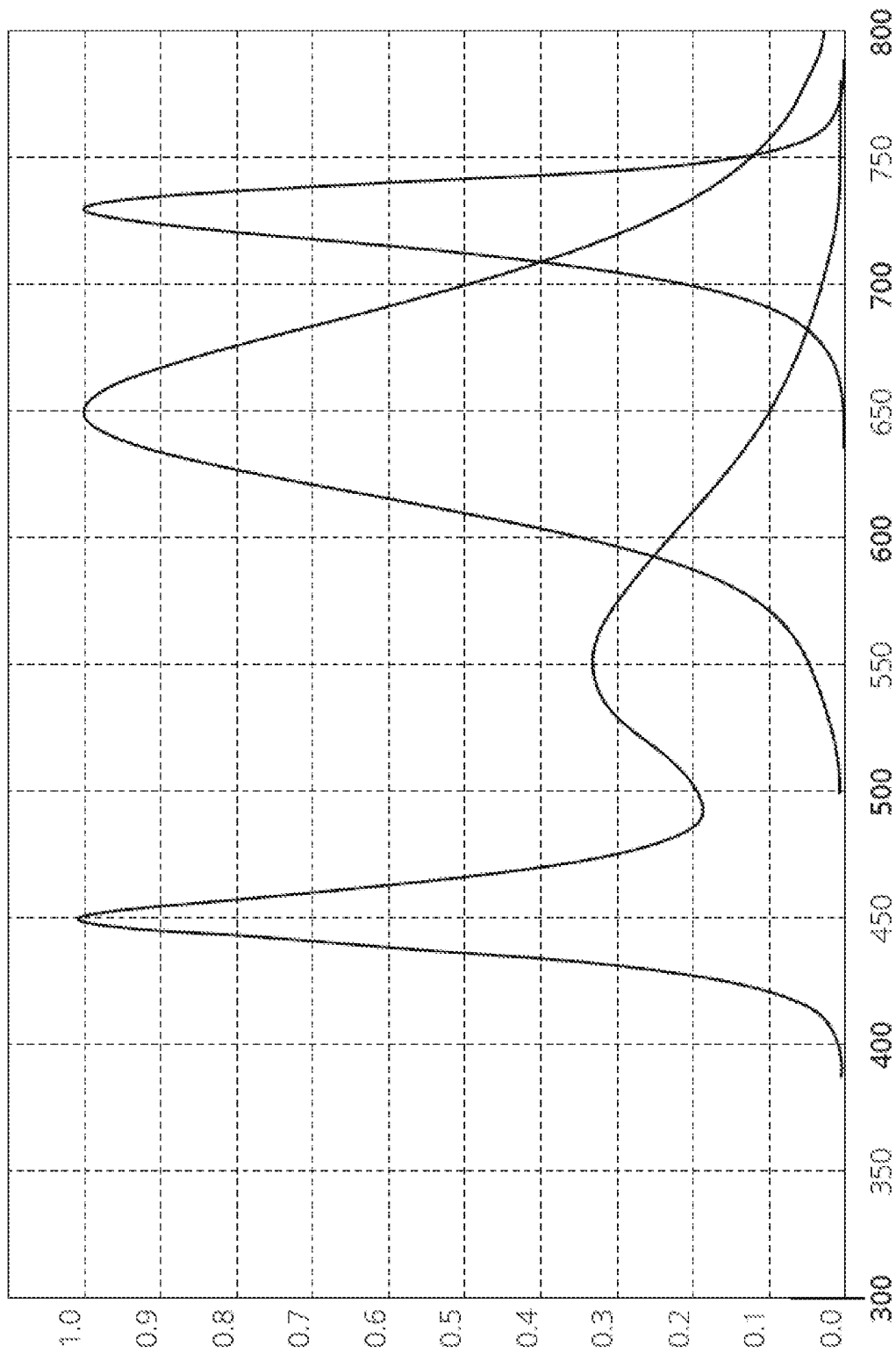
FIG. 10B depicts an exemplary spectral power distribution of several groups of emitters, wherein one group exhibits substantially white emission with a correlated color temperature (CCT) of 5,000-20,000 kelvin, one group exhibits a narrow band substantially far red emission, and one group exhibits a wide band substantially red emission.

(cold white+broad red OR mono red+FR) In an embodiment, a lighting device contains a plurality of groups of emitters, wherein a first group of emitters exhibits a substantially white emission with a correlated color temperature (CCT) of 5,000-20,000 kelvin, a second group of emitters exhibits a characteristic spectral power distribution in the far-red region with a peak wavelength of 720-740 nm and a FWHM of 15-40 nm, and a third group of emitters exhibits a characteristic spectral power distribution substantially in the red region; in one embodiment, the third group of emitters exhibits a peak wavelength of 640-670 nm and a FWHM of 60-120 nm, and in another embodiment the third group of emitters exhibits a peak wavelength of 640-670 nm and a FWHM of 15-60 nm. FIGS. 10A and 10B show exemplary characteristic spectral power distributions of the groups of emitters in these embodiments.

Figure 11:
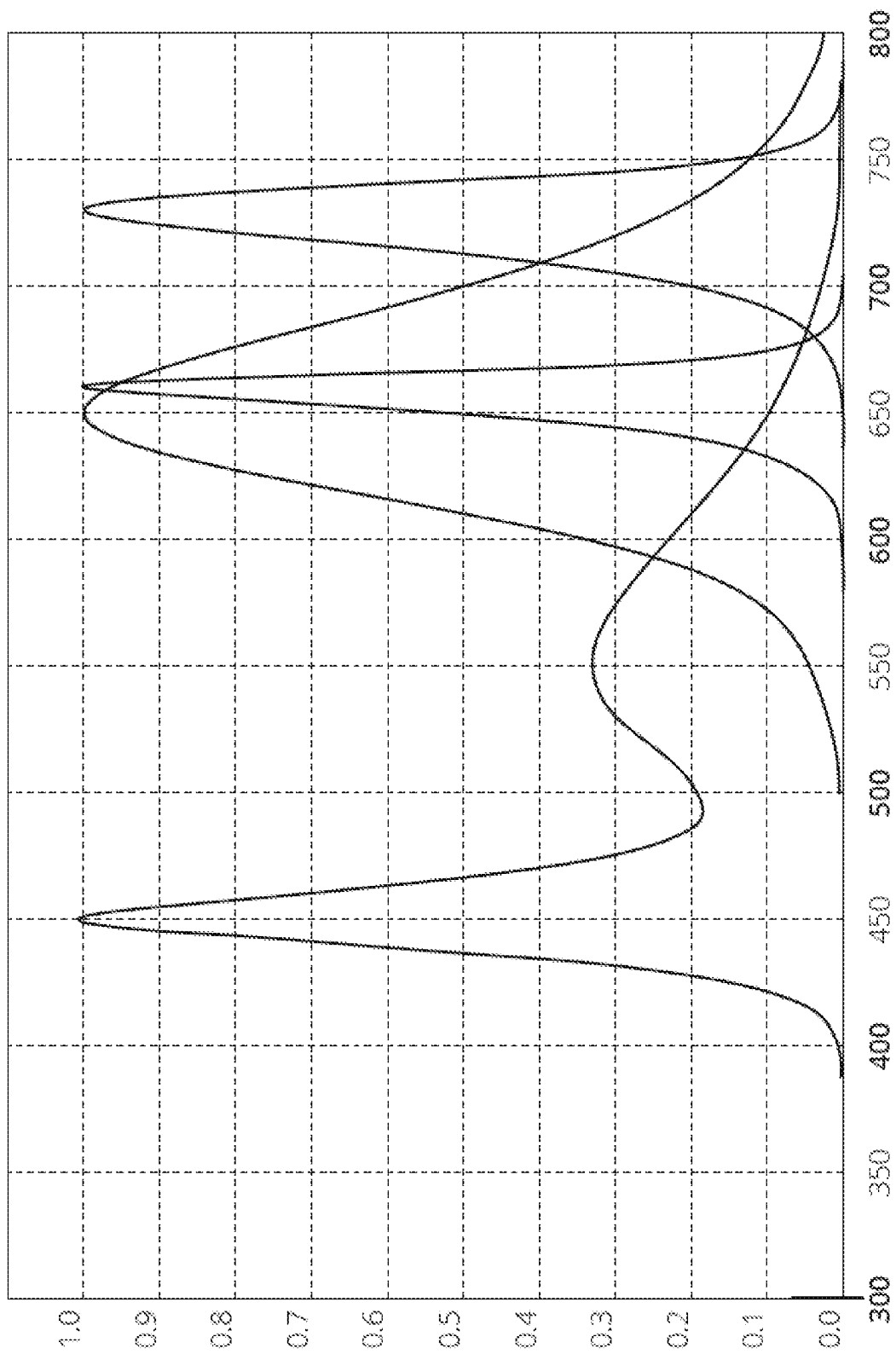
FIG. 11 depicts an exemplary spectral power distribution of several groups of emitters, wherein one group exhibits substantially white emission with a correlated color temperature (CCT) of 5,000-20,000 kelvin, one group exhibits a narrow band substantially far red emission, one group exhibits a narrow band substantially red emission, and one group exhibits a wide band substantially red emission.

(cold white+broad red+mono red+FR) In an embodiment, a lighting device contains a plurality of groups of emitters, wherein a first group of emitters exhibits a substantially white emission with a correlated color temperature (CCT) of 5,000-20,000 kelvin, a second group of emitters exhibits a characteristic spectral power distribution in the far-red region with a peak wavelength of 720-740 nm and a FWHM of 15-40 nm, and a third group of emitters exhibits a characteristic spectral power distribution substantially in the red region with a peak wavelength of 640-670 nm and a FWHM of 60-120 nm, a fourth group of emitters exhibits a characteristic spectral power distribution in the red region with a peak wavelength of 640-670 nm and a FWHM of 15-60 nm. FIG. 11 shows an exemplary characteristic spectral power distribution of the groups of emitters in this embodiment.

Figure 12A:
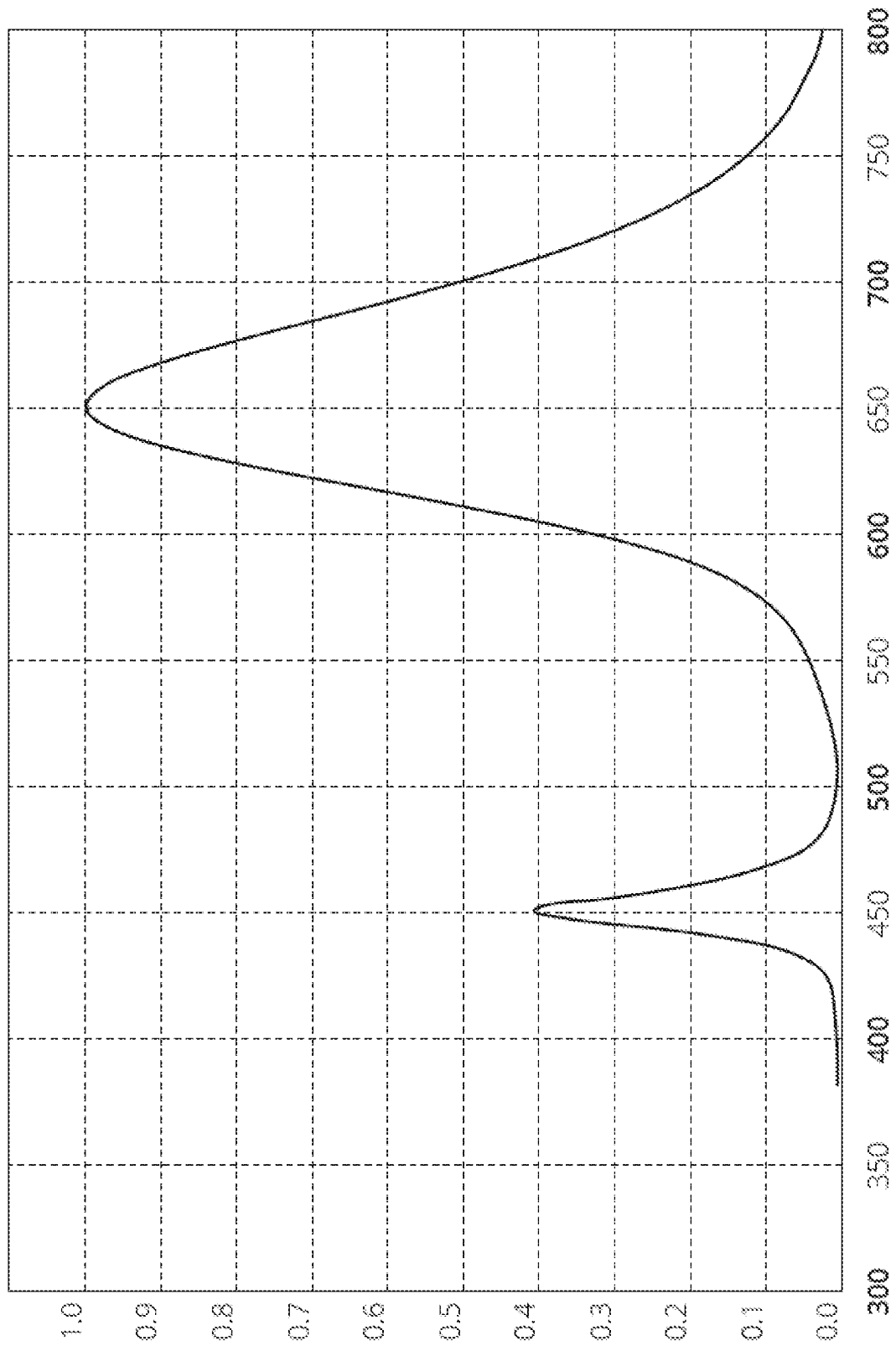
FIG. 12A depicts an exemplary spectral power distribution a group of emitters exhibiting substantially red emission with a bimodal spectral power distribution.
Figure 12B:
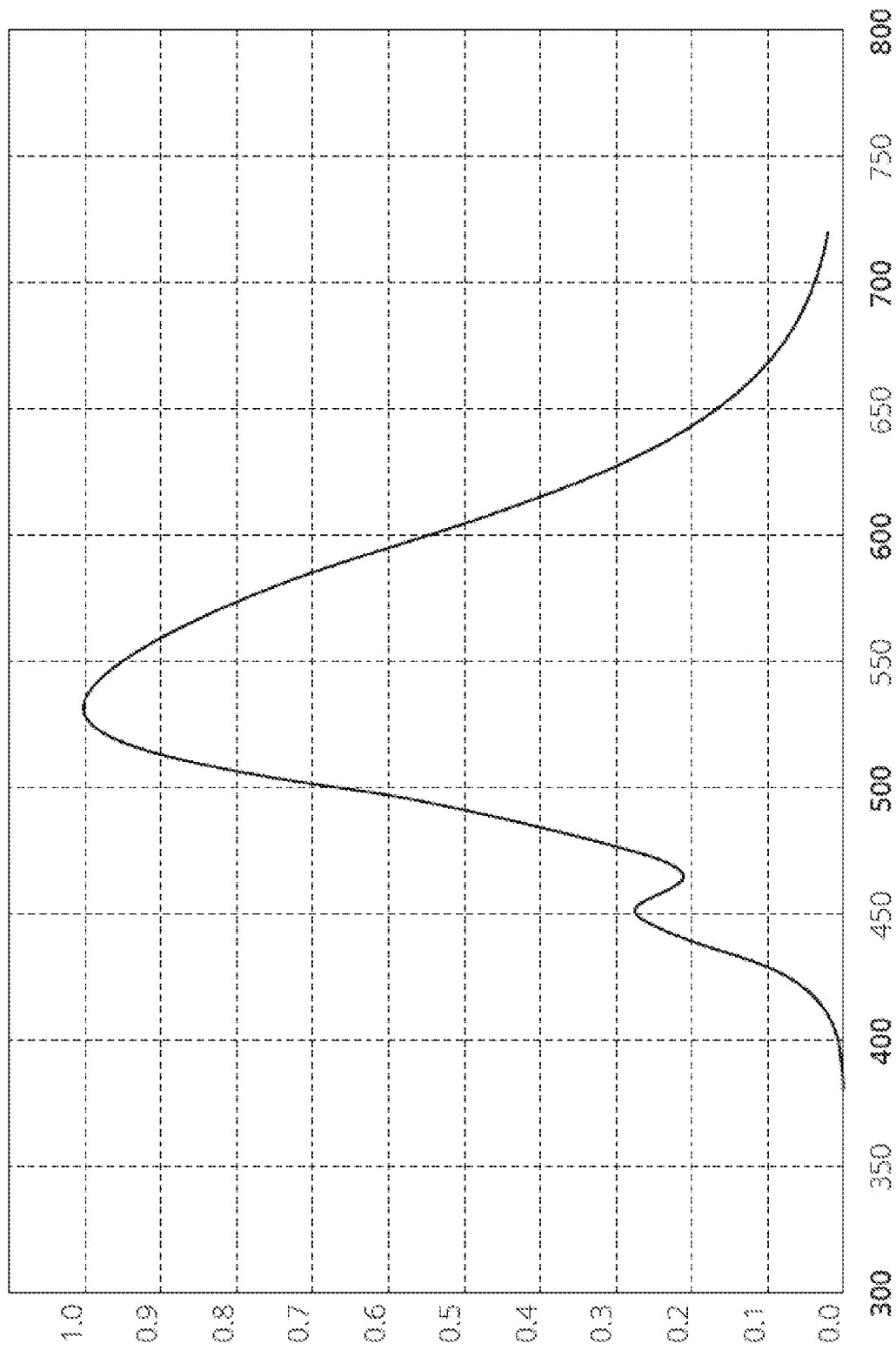
FIG. 12B depicts an exemplary spectral power distribution a group of emitters exhibiting substantially red emission with a bimodal spectral power distribution.

Emitters exhibiting substantially white emission may utilize commonly available yellow phosphors, blends of red and green phosphors, blends of green and yellow phosphors, and blends of quantum dot materials in combination with blue, UV, or violet emitters to result in the substantially white irradiance. In embodiments disclosed herein, the emitters exhibiting a characteristic spectral power distribution substantially in the red, green, or blue regions may utilize phosphors or quantum dot materials in combination with blue, UV, or violet emitters to result in the irradiance. In embodiments disclosed herein, the emitters exhibiting a characteristic spectral power distribution substantially in the red or green region may comprise an overall spectral power distribution exhibiting a bi-modal distribution with up to 15% of the radiometric power distributed in the blue, UV, or violet region of 320-475 nm; such compositions are useful to achieve a higher overall efficacy; FIG. 12A depicts an exemplary bimodal distribution for a substantially red emitter and FIG. 12B depicts an exemplary bimodal distribution for a substantially green emitter.

In various embodiments, lighting devices may additionally comprise a group of emitters exhibiting a characteristic spectral power distribution in the UV or violet range of 240 nm-440 nm. Irradiance in this range can be generally useful for certain plant functions and has been found to exhibit germicidal effects on common foodborne pathogens and bacteria, including *Listeria monocytogenes, Escherichia coli*, and *Salmonella Typhimurium*.

In an embodiment, the lighting device incorporates a communication interface to communicate to external devices or a central controller 31 on a network. By way of example, the communication interface may comprise wireless transceivers and/or radios. By way of example, such radios or transceivers may communicate to identification tags associated with plants, sensors placed below or around fixtures, sensors placed around plants, or devices carried by operators or autonomous vehicles.

In an embodiment, the lighting device may further comprise a depth sensing element. By way of example, such depth sensing elements may utilize ultrasonic depth sensing techniques, visible or infrared light time of flight depth sensing techniques, 3D cameras, stereoscopic cameras, sonar, or RF or radar based depth sensing techniques. In an embodiment, depth sensing feedback can be provided by the fixture to a central controller 31 hosting control algorithms and a database. In another embodiment, canopy height data can be provided by devices external to fixtures, such as 3D scanners, cameras, 3D cameras, distance sensors, or the like. In another embodiment, plant canopy height data can be provided by the operator. In a further embodiment, plant canopy height data and calculated fixture output levels are used in an algorithm to calculate PPFD at the top of the canopy. In a yet further embodiment, plant canopy height data can be used within an algorithm to calculate PPFD at the top of the plant canopy and automatically adjust the height or beam angle of the lighting devices as to maintain the PPFD within certain levels.

In an embodiment, a lighting device can be characterized by a nameplate power rating, which can be the maximum continuous power draw in watts the fixture may consume. In an embodiment, this maximum continuous power draw can be in accordance with safety standards. In this embodiment, the lighting device contains addressable groups of emitters where each group emits radiation having a unique spectral power distribution. In this embodiment, the groups of emitters are activated as to generate a specific composite spectral power distribution while not consuming more power than the nameplate power rating of the lighting device. In this embodiment, the composite spectral power distribution exhibits substantially red colored irradiance with no more than 15% of the irradiance falling in the 350-500 nm range while consuming greater than 90% of the maximum nameplate power rating. In this embodiment, the emitters in the lighting device are activated with different control signals as to generate a composite spectral power distribution which can be substantially blue in color and wherein no more than 18% of the irradiance falls in the 600-700 nm range while consuming greater than 90% of the maximum nameplate power rating.

Light Sensing Device

Embodiments relate to a lighting device and system capable of validating the spectrum power distribution and intensity of the light emitted by the device as well as other sources of light, such as sunlight. Precisely regulating light levels in certain portions of the spectrum by means of a novel light sensing device can be described herein.

The novel light sensing device can be directed at detecting irradiance levels in key wavelength ranges relevant to photosynthesis, photomorphogenesis, and other biological processes present in plants, algae, living tissues and cell cultures, and humans. The key wavelength ranges include the UV region, encompassing 200 nm-400 nm, the blue region, encompassing 400-500 nm, the red region, encompassing 600-700 nm, and the far red region, encompassing 700-780 nm. The novel light sensing device utilizes at least one light sensing element, an optic assembly, memory, and a processor 12 to detect broad spectrum irradiance in precise quantities, including irradiance in the key wavelength ranges. The novel light sensing device may also comprise a communications interface, and a globally unique device identifier; the light sensing device may also communicate with a central controller 31 where calibration data can be stored.

Figure 13A:
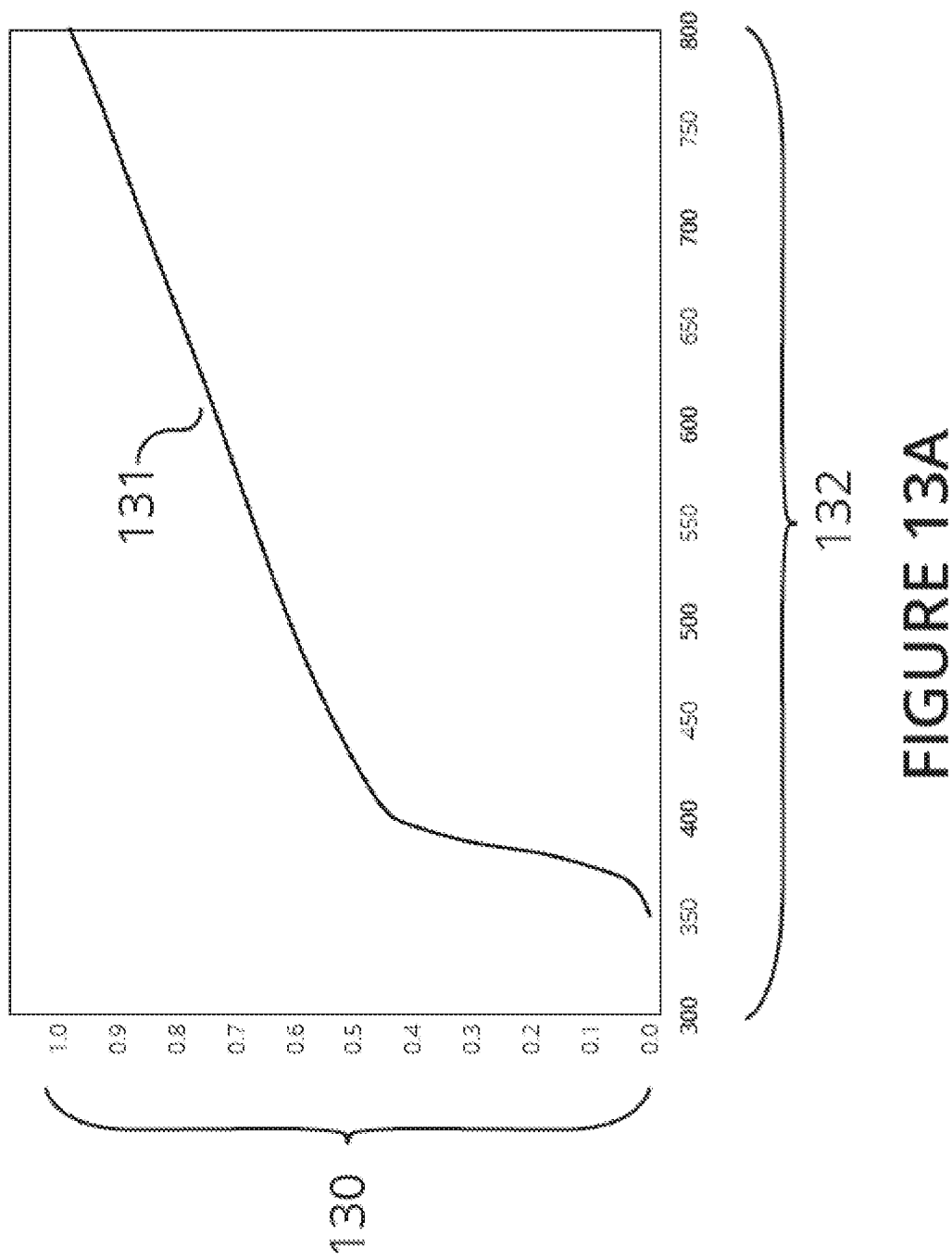
FIG. 13A shows the relative spectral response of a silicon photodiode, commonly used for general light sensing applications.

Conventionally, a silicon photodiode can be utilized to detect photosynthetic active radiation in precise quantities, and may be filtered to limit the photodiode sensitivity range to approximately 400-700 nm. FIG. 13A depicts the relative responsivity 130 of an unfiltered silicon photodiode 131 across various wavelengths 132 relevant to the embodiments disclosed herein.

Figure 13B:
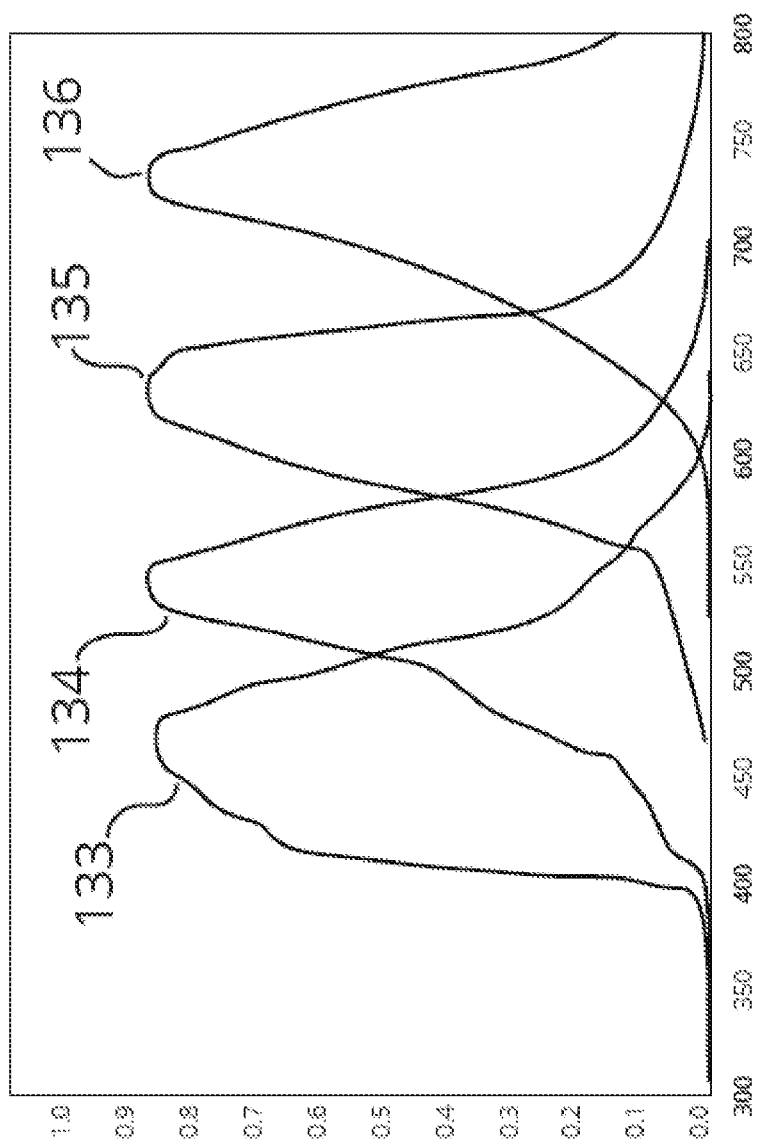
FIG. 13B shows the relative spectral response of a multi-channel light sensor incorporating a plurality of filtered sensors which exhibits a small amount of spectral selectivity.

As shown in FIG. 13B, in an embodiment, a light sensing device comprises a plurality of light sensing elements including at least one red sensitive light sensing element, at least one far red sensitive light sensing element, and at least one broad spectrum sensitive light sensing element. The red sensitive light sensing element can be filtered or adapted to exhibit spectral sensitivity to the red region with a peak response between 620 and 690 nm 135. The far-red sensitive light sensing element can be filtered or adapted to exhibit spectral sensitivity to the far red region encompassing 700-780 nm 136 and substantially not including the red region encompassing 600-700 nm. The broad spectrum sensitive light sensing element can be filtered or adapted to exhibit spectral sensitivity across the 400-700 nm range and not including the far red or infrared range greater than 700 nm. In another embodiment, the broad spectrum sensitive light sensing element can be not filtered and exhibits a spectral sensitivity from approximately 375 nm to approximately 1100 nm 131. In a further embodiment, the light sensing device may contain additional light sensing elements exhibiting spectral sensitivity to the blue region (with a peak sensitivity in the range of 400-500 nm) 133, the green region (with a peak sensitivity in the range of 500-600 nm) 134 or the UV region (with a peak sensitivity in the 200-400 nm region). In an embodiment, the light sensor elements are composed of silicon photodiodes and are filtered utilizing standard optical filter constructions, such as deposited thin film coatings.

Figure 13C:
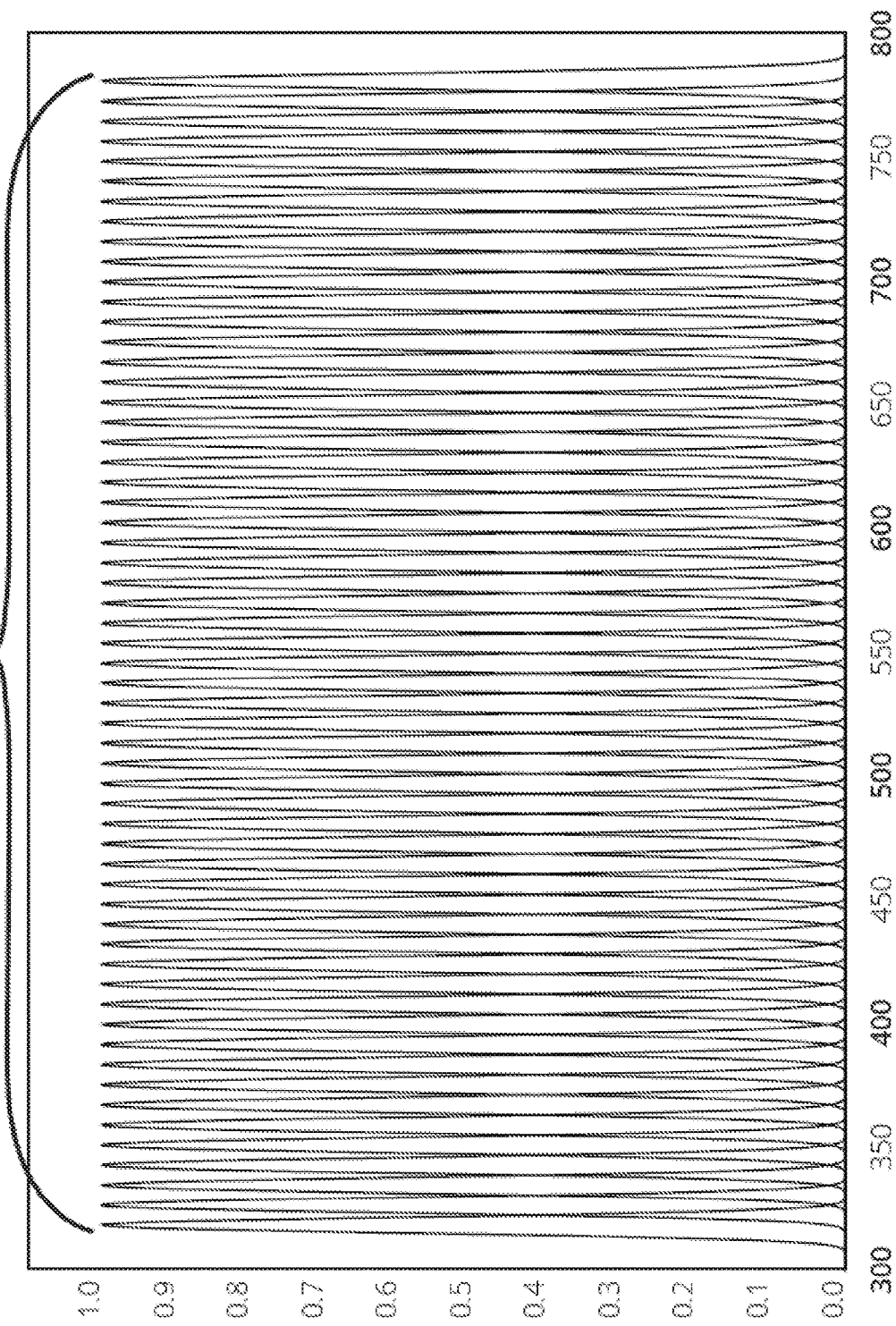
FIG. 13C shows the relative spectral response of a sensor or spectrometer exhibiting a plurality of response channels exhibiting a high degree of spectral selectivity.

As shown in FIG. 13C, in another embodiment of the invention, the light sensing element comprises a spectrometer element, which may further comprise a light sensor array and an optical assembly adapted to induce spectral selectivity within the light sensor array. In this embodiment, the spectrometer element generates at least six spectrally unique light signals throughout the UV, visible, or near IR spectrum 137. In other embodiments of the invention, the range of wavelengths of interest detected by the light sensing device includes the near infrared region, generally including the 800-1600 nm range.

Figure 14A:
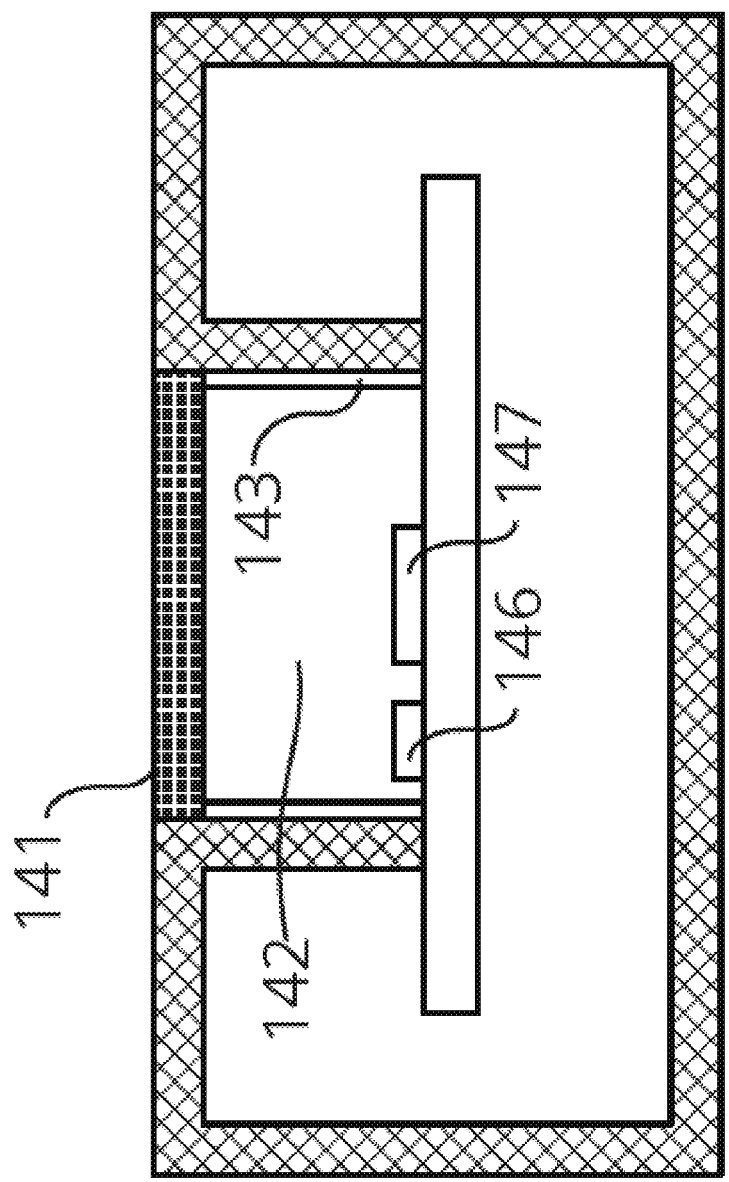
FIG. 14A depicts a light sensing device incorporating a conditioning optical assembly, a temperature sensor, at least one light sensing element, and an optical cavity with cavity walls adapted to exhibit high reflectivity.
Figure 14B:
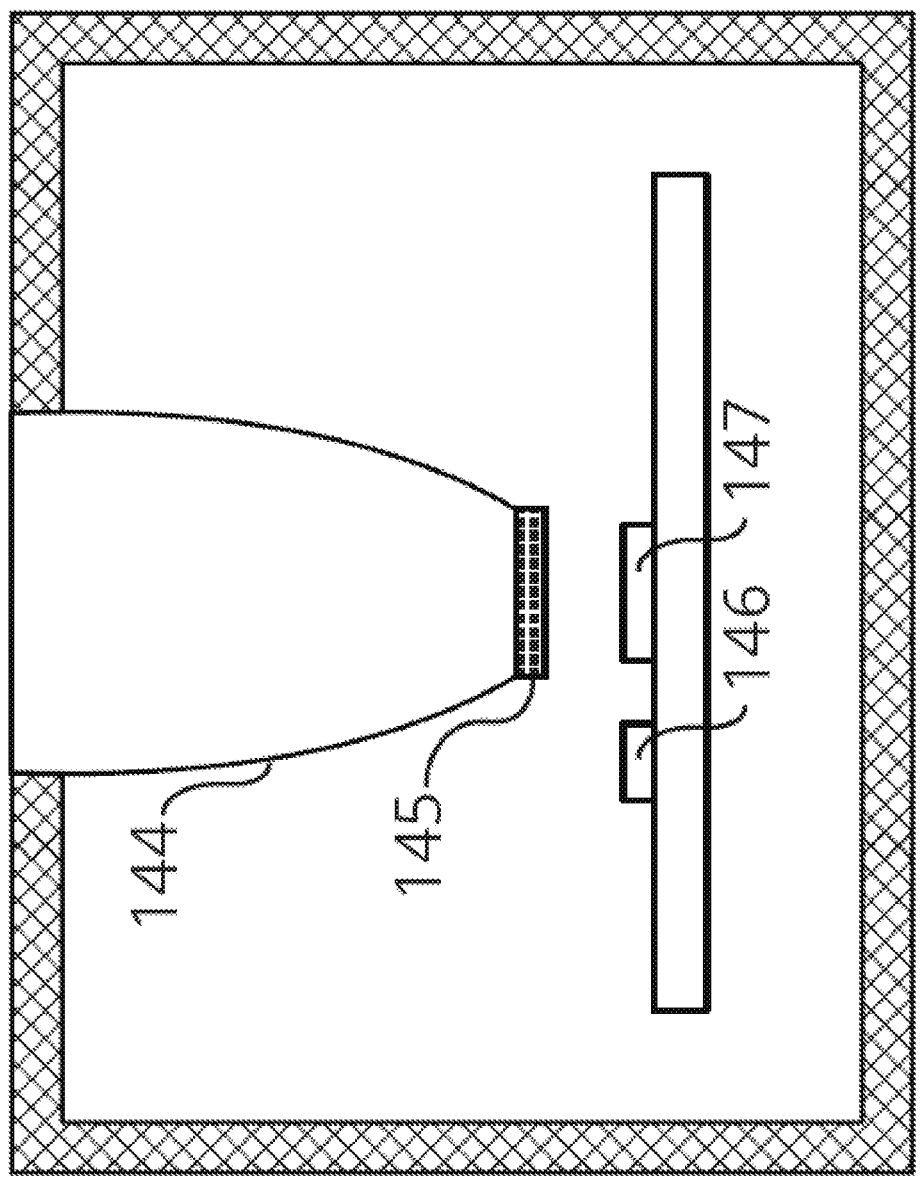
FIG. 14B depicts a light sensing device incorporating a non-imaging optical assembly exhibiting a field of view.

In one embodiment, the light sensing device comprising at least one light sensing element 147 can be adapted to receive light by means of a conditioning optical assembly 141, depicted in FIG. 14A. In this embodiment, the conditioning optical assembly can be formed from a translucent material exhibiting diffuse transparency of 50-90% transmittance across the range of 400-800 nm. In other embodiments, the conditioning element can be formed of a perforated material, such as photo-chemically etched stainless steel, or fused fiber optics adapted to limit the acceptance angle of the transmitted light to 5-45 degrees. In a further embodiment, the conditioning optical assembly forms the aperture to an optical cavity 142, where the walls of the cavity are adapted to exhibit high optical reflectance by means of an applied film or coating 143. In another embodiment, the light sensing device can be adapted to receive light by means of a non-imaging optic assembly exhibiting a field of view between 10 and 90 degrees. In this embodiment, a compound parabolic concentrator 144 formed of glass or an optically clear polymer can be preferably utilized to gather light from a fixed field of view; light received from a compound parabolic concentrator may be further conditioned by means of the conditioning optical assembly 145, depicted in FIG. 14B.

In an embodiment disclosed herein, the light sensing device additionally comprises a temperature sensor 146 in close proximity to the at least one light sensing element 147 or a spectrometer element. In this embodiment, temperature signals are communicated to a central controller 31 in addition to light sensor signals. In another embodiment, light sensor signals are modified by an algorithm within the light sensing device before being communicated to a central controller 31. The algorithm modifies signals based on the response of the light sensor elements or the spectrometer element at various temperatures.

In an embodiment, the light sensing device can be tested upon manufacture in a light sensor test jig, and a calibration dataset can be generated and stored on a central server or in a database. In this embodiment, the light sensor test jig comprises at least one reference light source and at least one reference light sensing element. In other embodiments, the light sensor test jig comprises at least one reference light source and a reference spectrophotometer; in yet another embodiment, the test jig comprises a broad spectrum light source modified by a monochromator and a reference spectrophotometer. In this embodiment, the calibration dataset comprises at least one raw signal from the light sensing element, at least one reference measurement from the reference light source or monochromator, at least one globally unique device identifier, and at least one temperature measurement. The reference light source may be selected from the group of a narrow spectrum LED, a phosphor converted LED, a tungsten halogen lamp, a deuterium halogen lamp, a xenon arc lamp, a mercury arc lamp, a metal halide lamp, a sodium lamp, or a mercury fluorescent lamp. In other embodiments, the calibration dataset can be stored within the light sensing device.

Figure 14C:
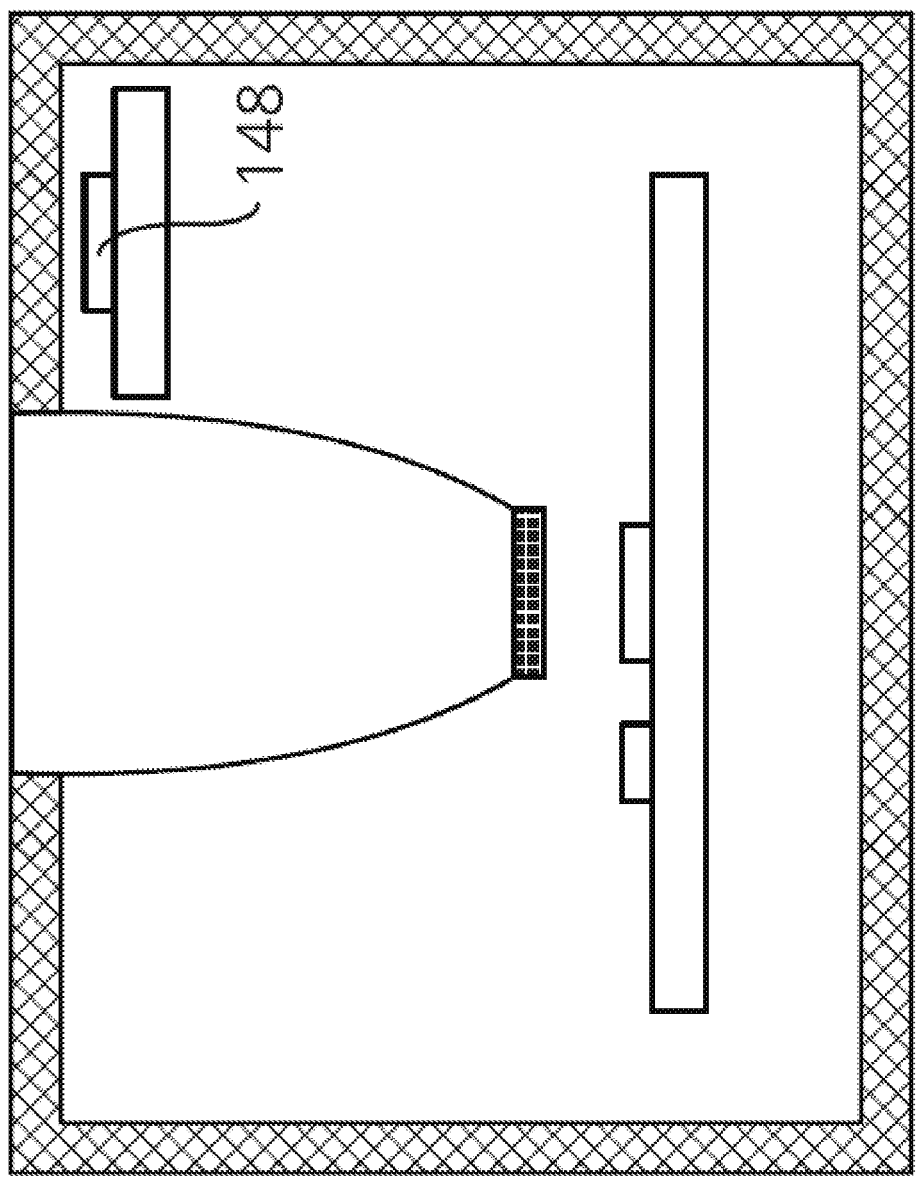
FIG. 14C depicts a light sensing device incorporating a proximity sensing element.

In an embodiment, the light sensing device additionally comprises a proximity sensing element 148, depicted in FIG. 14C. In this embodiment, the proximity sensing element can be selected from commonly available integrated circuits comprising a processor 12, infrared emitter, and infrared sensor adapted to detect proximal objects to the integrated circuit. In this embodiment, the proximity sensing element generates a proximity signal representing the distance to proximal objects obstructing the light sensing device; the proximity signal can be further communicated to a central controller 31. In this embodiment, proximity signals received by the central controller 31 are adapted to notify an operator of obstructed light sensing devices; in another embodiment, a proximity signal indicating an obstructed light sensing device can be received by the central controller 31, and additional light sensing data received by the controller can be discarded or referenced as potentially compromised.

In an embodiment, the light sensing device further incorporates a light emitting element adapted to emit light in the range of 750-950 nm, where the emitted light can be directed at a target, such as a plant canopy, and reflected light from the target can be received by a compound parabolic concentrator and further light sensing elements. In this embodiment, the light sensing device can be preferably operated in combination with horticultural lighting devices which are capable of emitting light in the range of 450-650 nm and 730 nm. In this embodiment, measurements are triggered via a communication interface, and at least one lighting device directed at a target emits irradiance in at least one of the wavelength ranges selected from the group of 450-475 nm, 630-680 nm, and 715-745 nm, and the light sensing device directed at a same target emits irradiance in the range of 750-950 nm, while simultaneously measuring reflected light in the irradiance ranges. Measurements can be further communicated to a central controller 31.

Natural Light Compensation

Figure 15A:
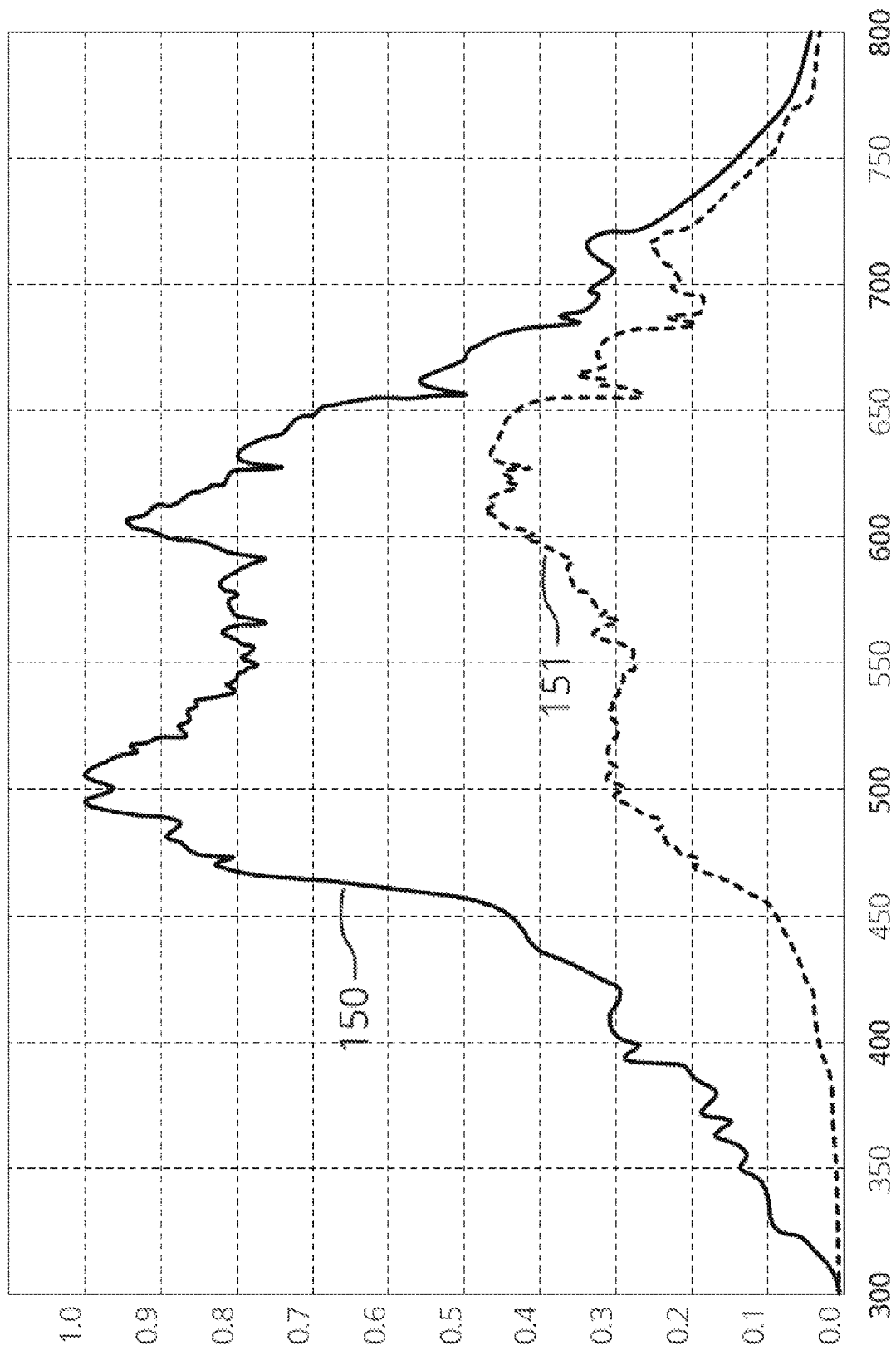
FIG. 15A depicts the spectral power distribution of natural sunlight at various times of the day.

Modern greenhouse cultivation techniques often employ supplemental horticultural lighting in addition to natural light to extend the daily light interval (DLI) and photosynthetic active radiation levels (PAR). FIG. 15A shows the spectral power distribution of natural sunlight on a cloudless day in the afternoon 150 and in the early evening 151, making apparent that significant shifts in spectral power distribution and intensity occur throughout the day. These shifts are even more pronounced on partly cloudy, cloudy, and overcast days. Methods which autonomously compensate natural light using artificial horticultural lighting in accordance with a light formula are to be considered within the scope of the embodiments. The embodiments also include methods by which delivered PAR spectrum and intensity levels are computed and recorded within a batch record; such methods play a significant role in enabling quality control protocols in production environments where natural light can be utilized.

Figure 15B:
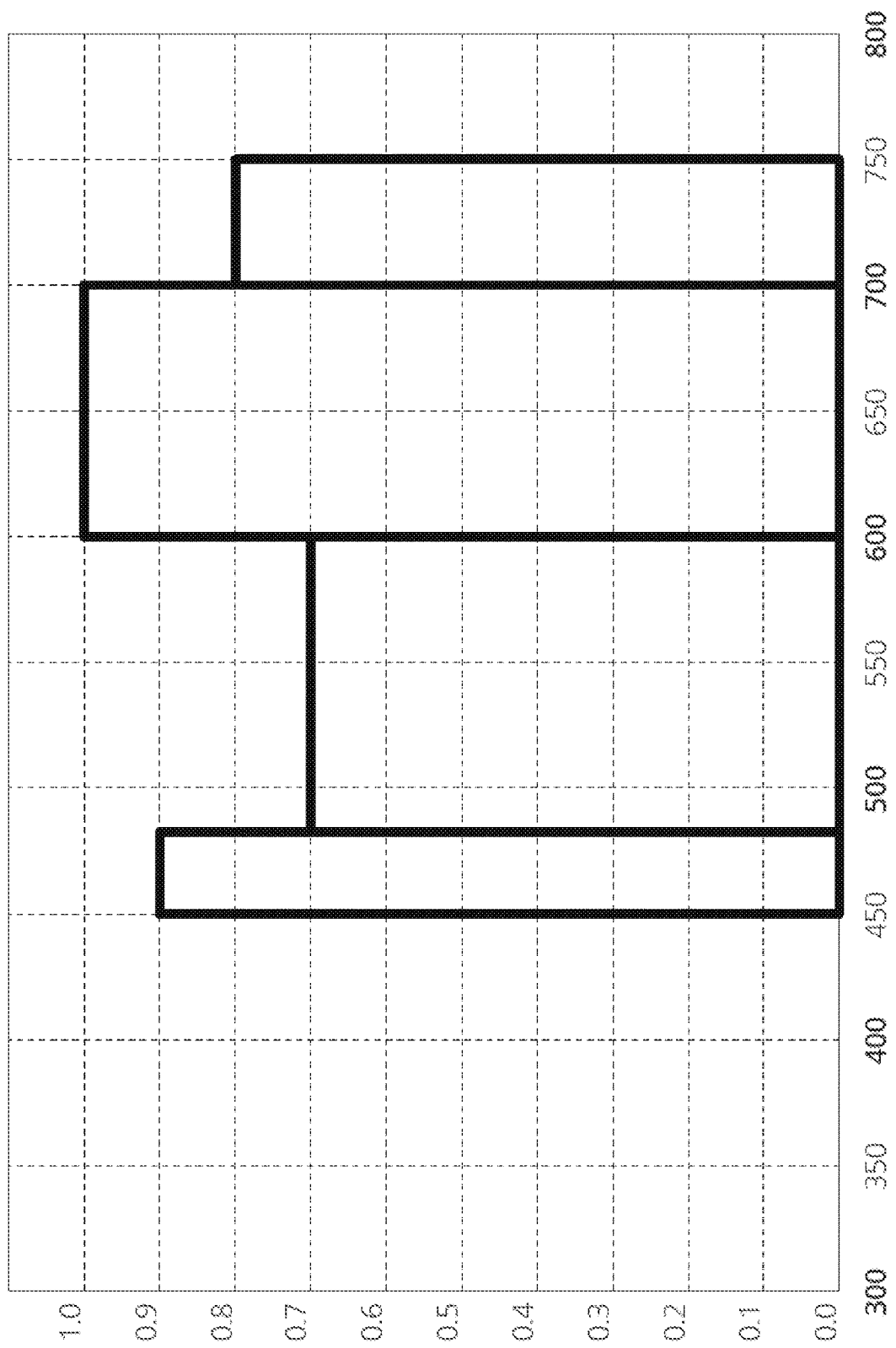
FIG. 15B depicts an exemplary light formula comprised of spectrum and intensity directives.

By way of example, FIG. 15B indicates a portion of an exemplary light formula comprising spectrum and intensity directives. In this example, several spectrum ranges are defined, and corresponding photosynthetic active radiation (PAR) levels are associated with the ranges. The units associated with the levels may include daily light interval (DLI) in moles of photons per photoperiod, photosynthetic photon flux density (PPFD) in micromoles of photons per square meter per second, or radiometric units such as joules, watts, and the like. The light formula may further comprise a minimum or maximum time for which the levels may be maintained.

Figure 16A:
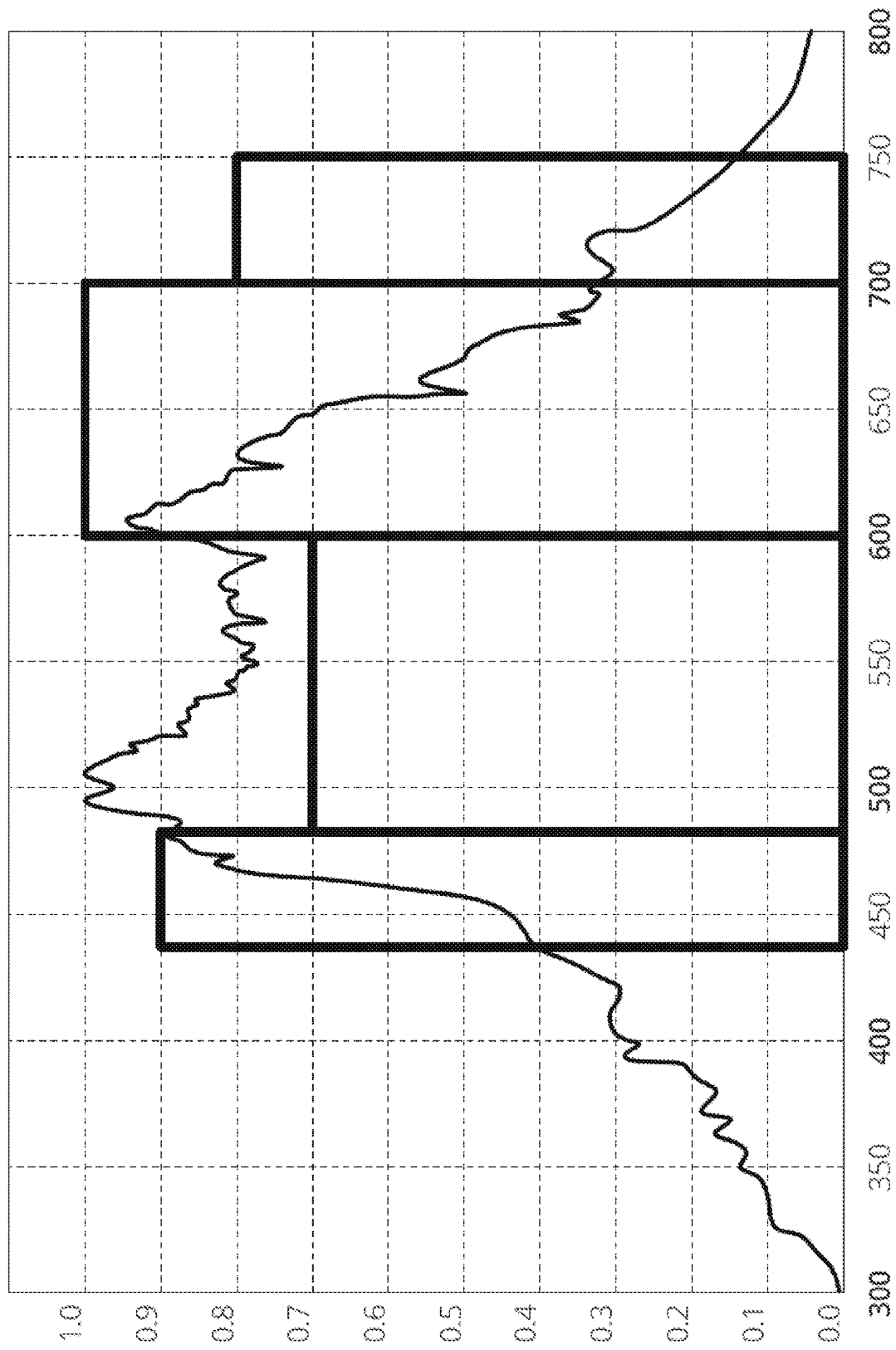
FIG. 16A depicts an exemplary light formula compared against a measured spectral power distribution of afternoon natural sunlight measured in a greenhouse.
Figure 17A:
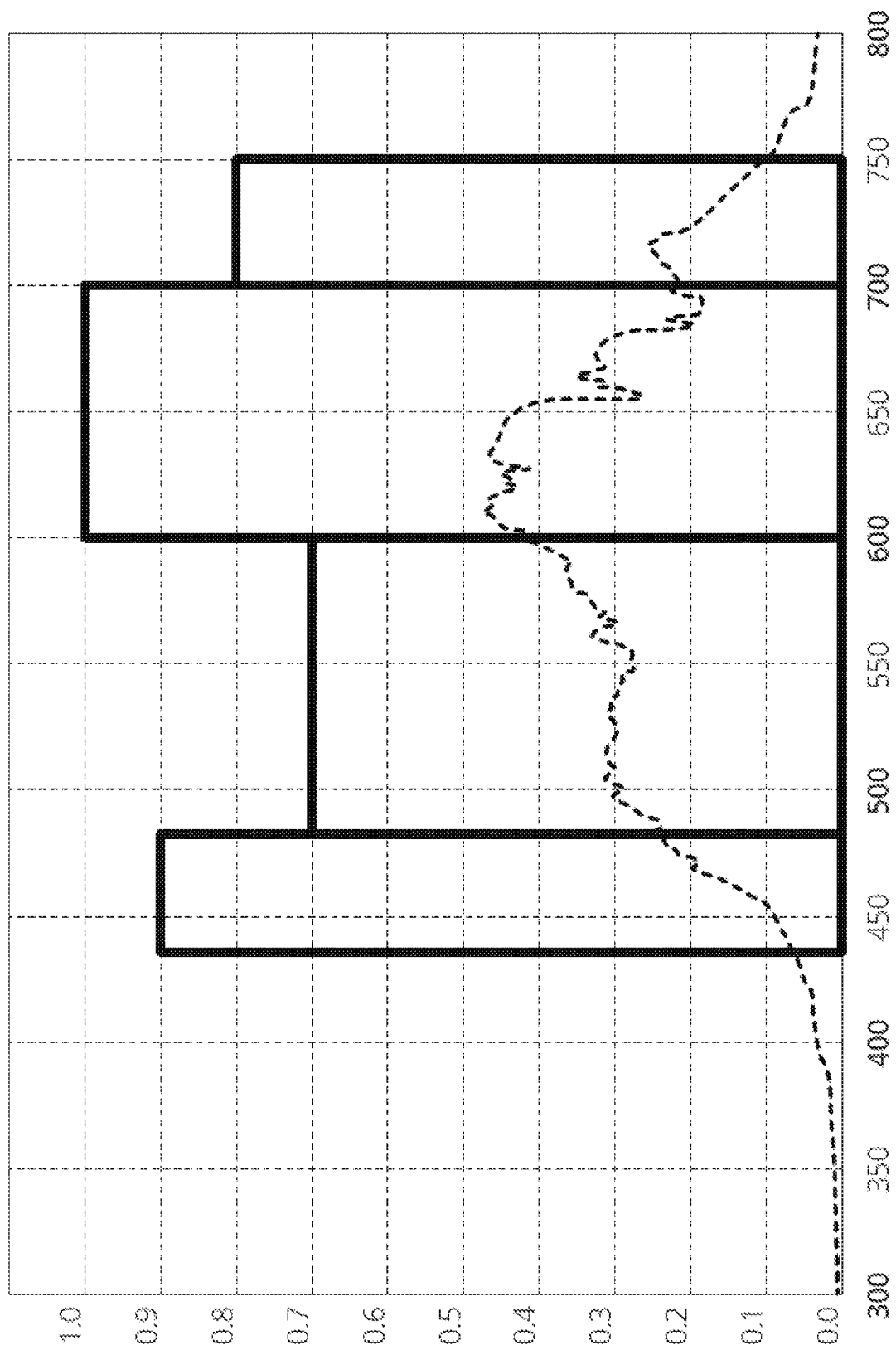
FIG. 17A depicts an exemplary light formula compared against a measured spectral power distribution of natural sunlight measured in a greenhouse at a different time of day.
Figure 17B:
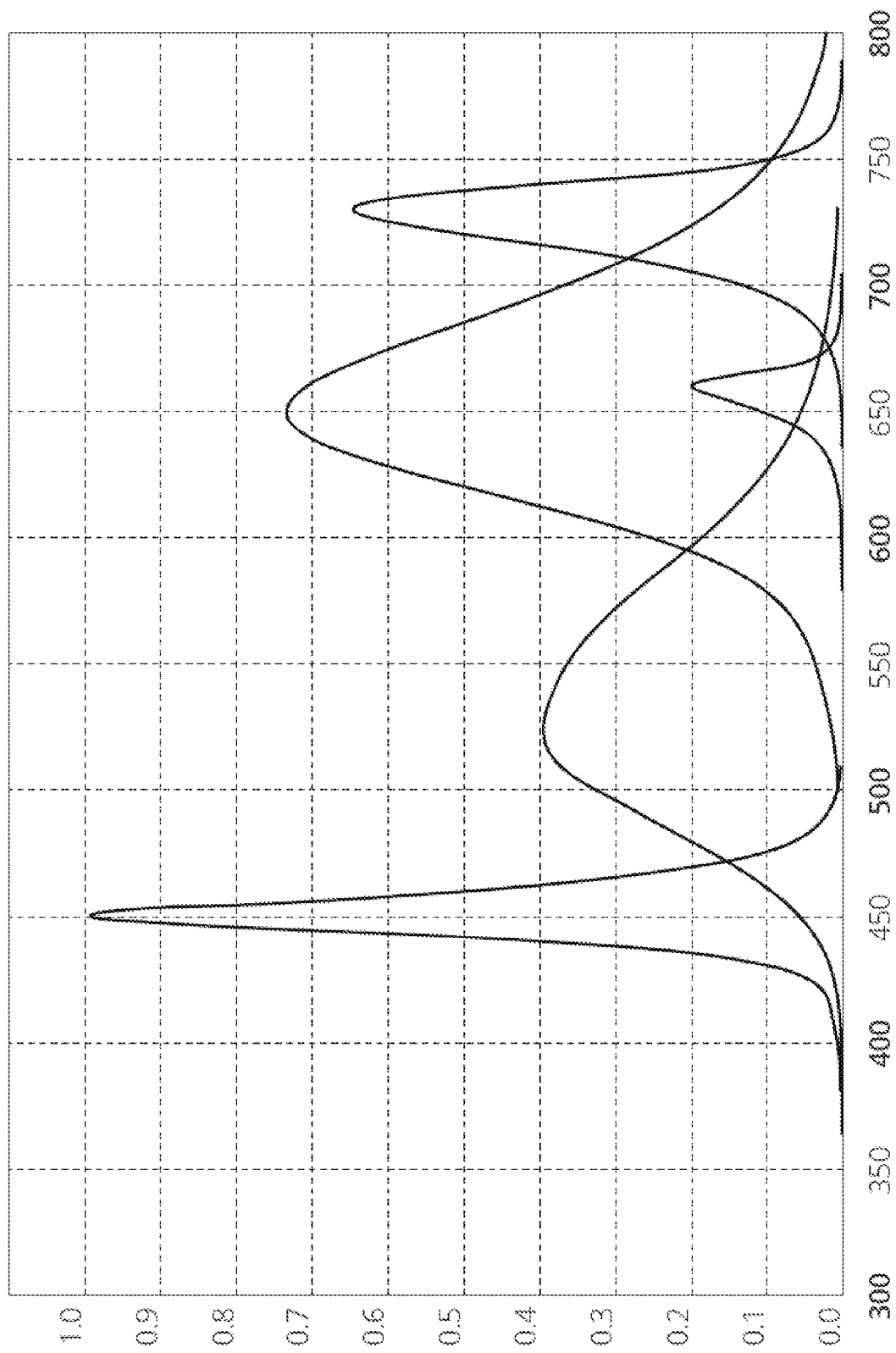
FIG. 17B depicts the spectral power distribution emitted by a lighting device corresponding with natural sunlight measured at a different time of day.
Figure 30:
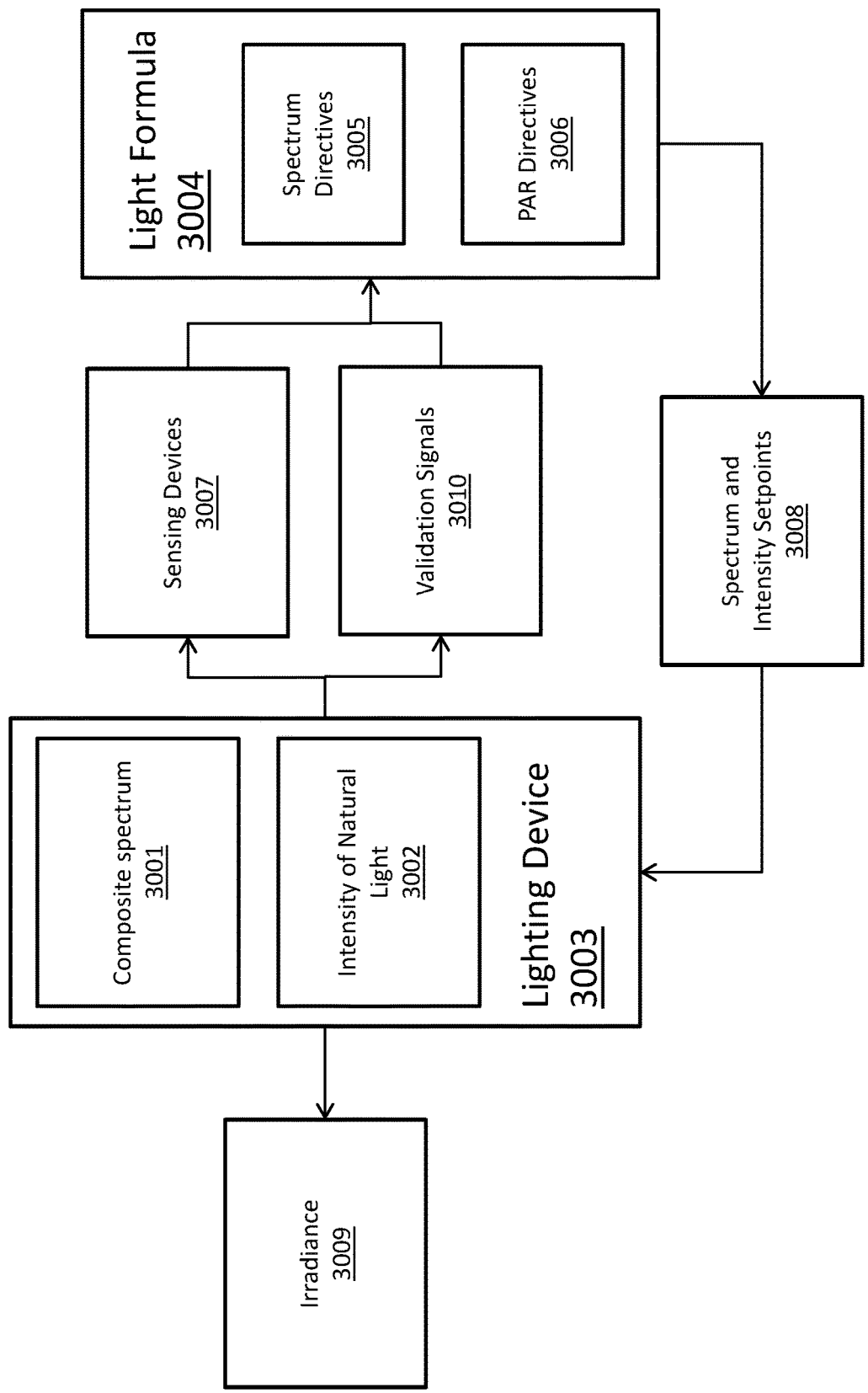
FIG. 30 illustrates a block diagram depicting elements for a method for compensating for natural light, according to embodiments discussed herein.

FIG. 30 depicts a method for compensating for natural light, according to embodiments described herein. In an embodiment, the composite spectrum 3001 and intensity of natural light 3002 and emission from at least one lighting device 3003 can be acquired and compared to a light formula 3004 comprising spectrum 3005 and PAR directives 3006, and spectrum and intensity setpoints 3008 are generated and communicated to the at least one lighting device 3003 which computes the setpoints, generates control signals, and generates irradiance 3009 in accordance with the directives. FIG. 16A depicts a measured spectral power distribution of natural light alongside an exemplary light formula; FIG. 16B depicts an exemplary spectral power distribution corresponding to control signals generated according to embodiments described herein to supplement natural light as well as to comply with spectrum and intensity directives associated with the exemplary light formula; FIGS. 17A and 17B depict the measured spectral power distribution and corresponding complimentary control signal spectrum for a different spectral power distribution of natural light occurring several hours later. In this embodiment, the spectrum and intensity may be acquired by means of sensing devices 3007 or calculation techniques which make use of data or validation signals 3010 from lighting devices in combination with external data sources which characterize natural light; by way of example, the external data sources may include real time local weather data. In this embodiment, the steps of acquiring, comparing, generating, and communicating may happen in a continuous fashion; by way of example, these steps may occur once per second.

In an embodiment, a processor 12 receives spectrum directives and intensity directives as well as conditions data related to natural sunlight exposure on the crop. In this embodiment, the processor 12 generates control signals for emitters and actuators as to maintain spectrum distribution and irradiance intensity as close as possible to the directives. In this embodiment, the conditions data may be provided by a central controller 31, and composed of operator inputted data, light sensor data, or remote weather data. In alternative embodiments, the conditions data may be provided by light sensors installed at the plant canopy, inside the growth facility, or within the lighting device. In a yet further embodiment, the sensors at the canopy level detect composite irradiance and composite spectral distribution from natural sunlight and lighting devices. In an alternative embodiment, the composite irradiance and the composite spectral distribution can be calculated based on real time intensity estimates, real time spectra estimates, and the conditions data.

In an embodiment, operators are alerted when the composite irradiance and the composite spectral distribution resulting from natural and artificial light deviates from set-points described in a light formula by a preset offset. In a further embodiment, the preset offset can be provided by the operator. In another embodiment, the difference between the composite irradiance and the composite spectral distribution and the light formula can be calculated and the result can be stored in a time series database along with the composite irradiance and the composite spectral distribution. In a yet further embodiment, the results are compiled into a batch record summarizing the total deviation from the light formula per day and per stage of growth cycle.

Multiple Spectra

Figure 18:
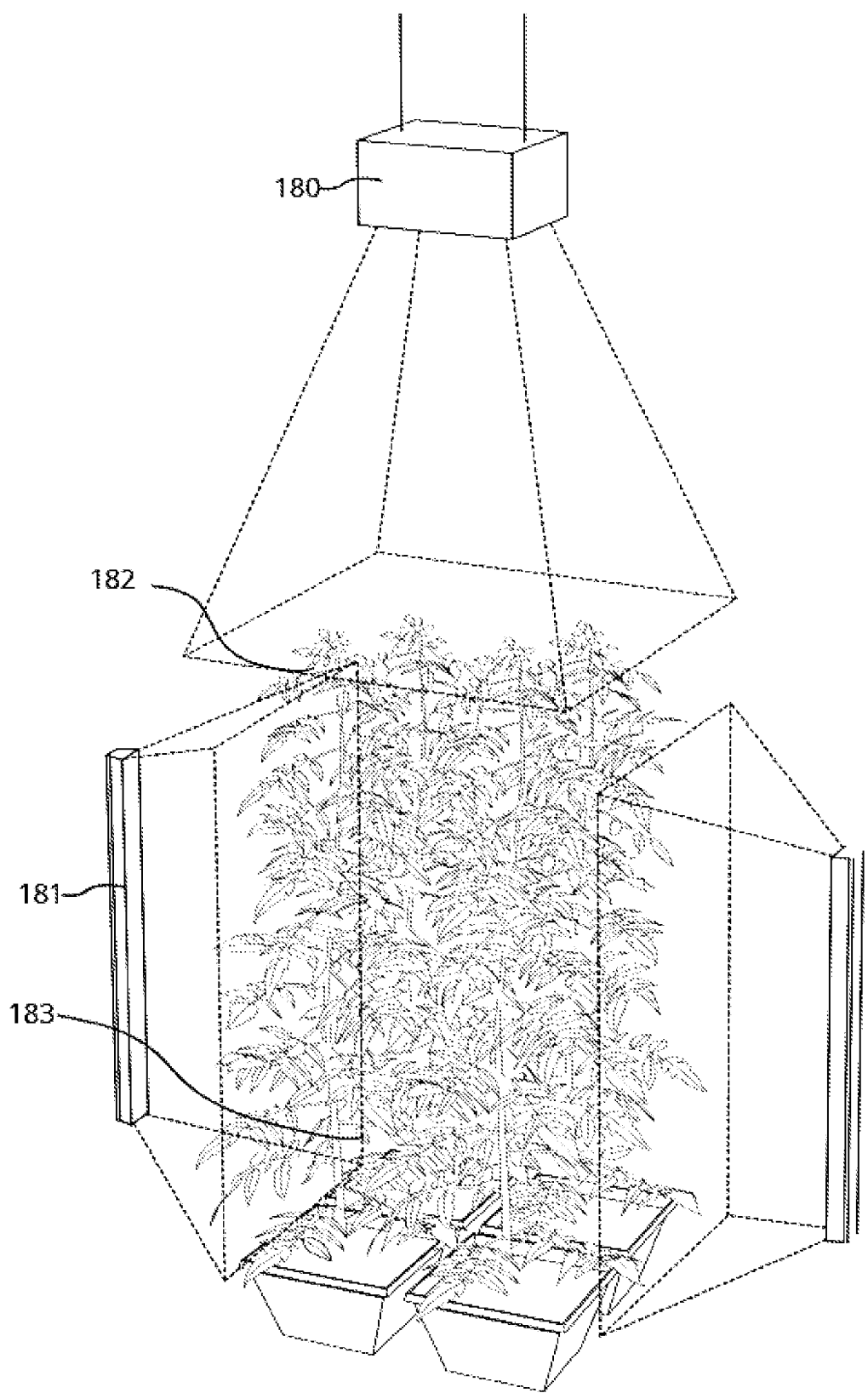
FIG. 18 shows a plurality of plants, wherein the top (canopy) of the plants is illuminated by at least one first group of lighting devices, and the intracanopy region (under the canopy) is illuminated by at least one second group of lighting devices.
Figure 31:
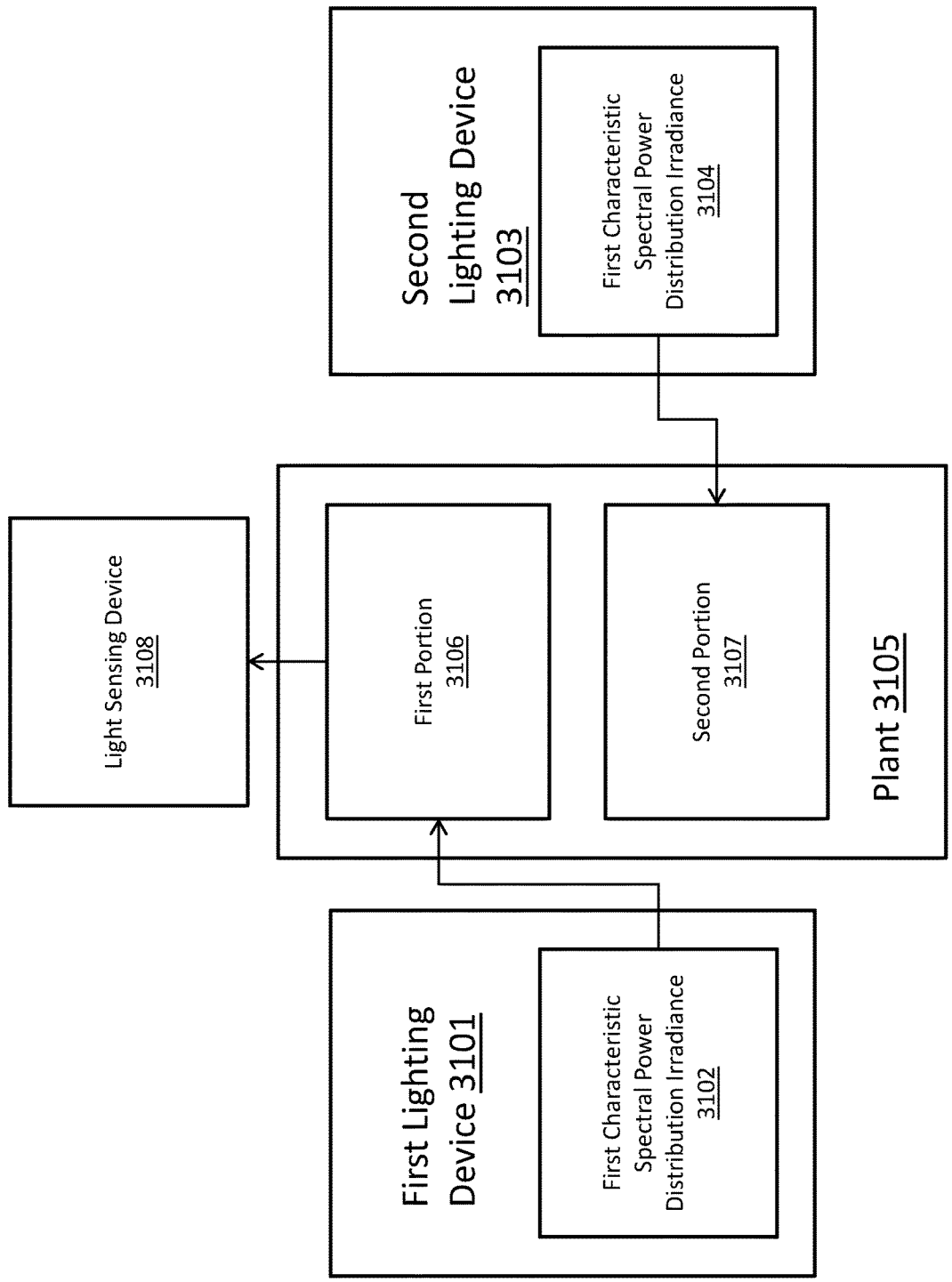
FIG. 31 illustrates a block diagram depicting an apparatus for providing multiple spectra of light, according to embodiments discussed herein.
Figure 32:
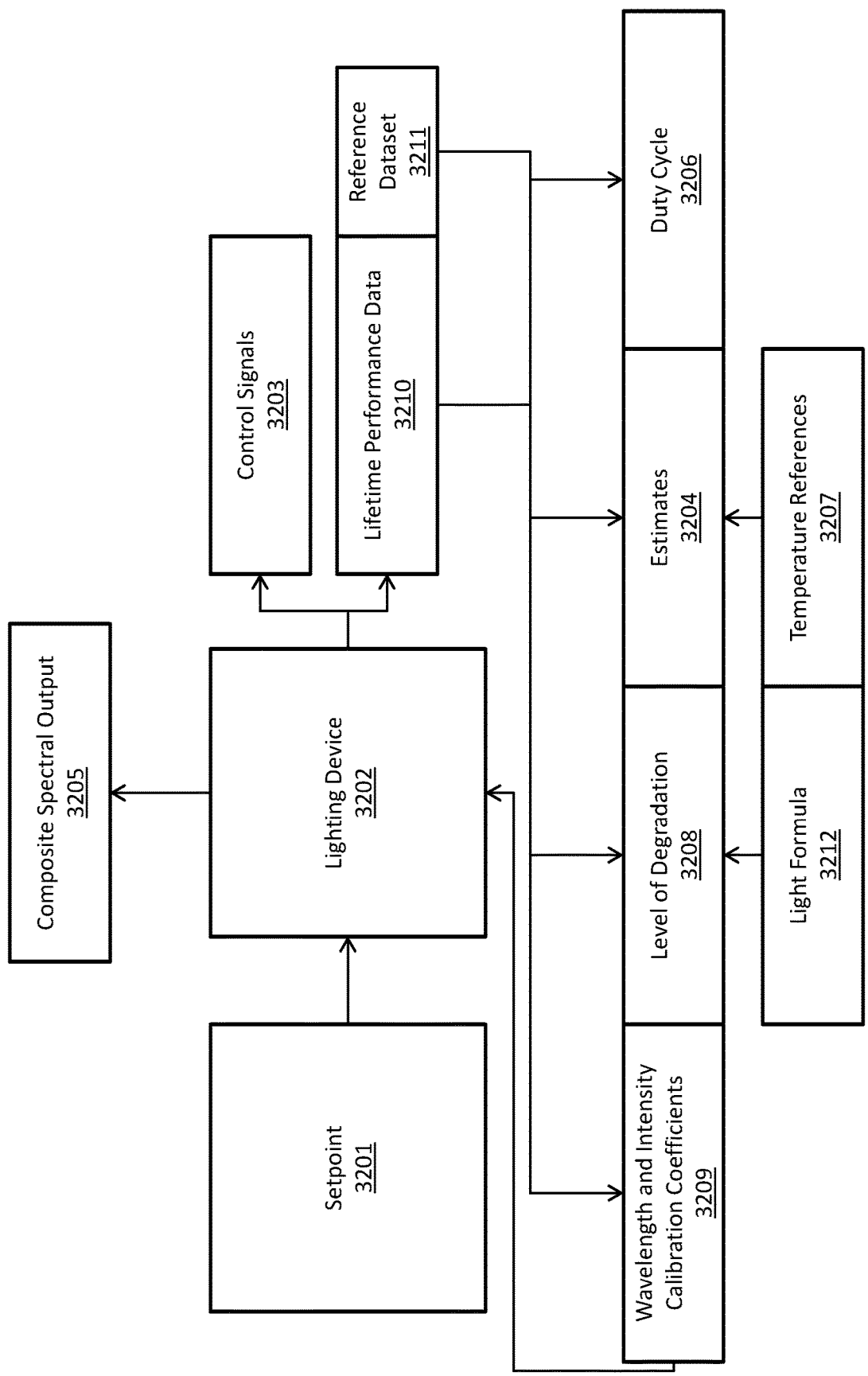
FIG. 32 illustrates a block diagram depicting a method of light validation in a lighting device, according to embodiments discussed herein.

As shown in FIG. 31, in an embodiment, irradiance of a first characteristic spectral power distribution 3102 can be provided by at least one lighting device 3101 (180 as shown in FIG. 18) to a first portion 3106 of at least one plant 3105, and irradiance of a second spectral power distribution 3104 can be provided by a second lighting device 3103 (181 as shown in FIG. 18) to a second portion 3107 of the at least one plant 3105 (see also FIG. 18). By way of example, the first portion 3106 of at least one plant 3105 may substantially include the top of the plant, otherwise known as the canopy 182 (as shown in FIG. 18), and the second portion 3107 of at least one plant may include the foliage below the canopy 183 (as shown in FIG. 18). In this embodiment, the first and second spectral power distribution may change throughout growth phase; by way of example, a spectrum selected to induce flowering may be delivered by the at least one lighting device to a portion of a plant.

Figure 19:
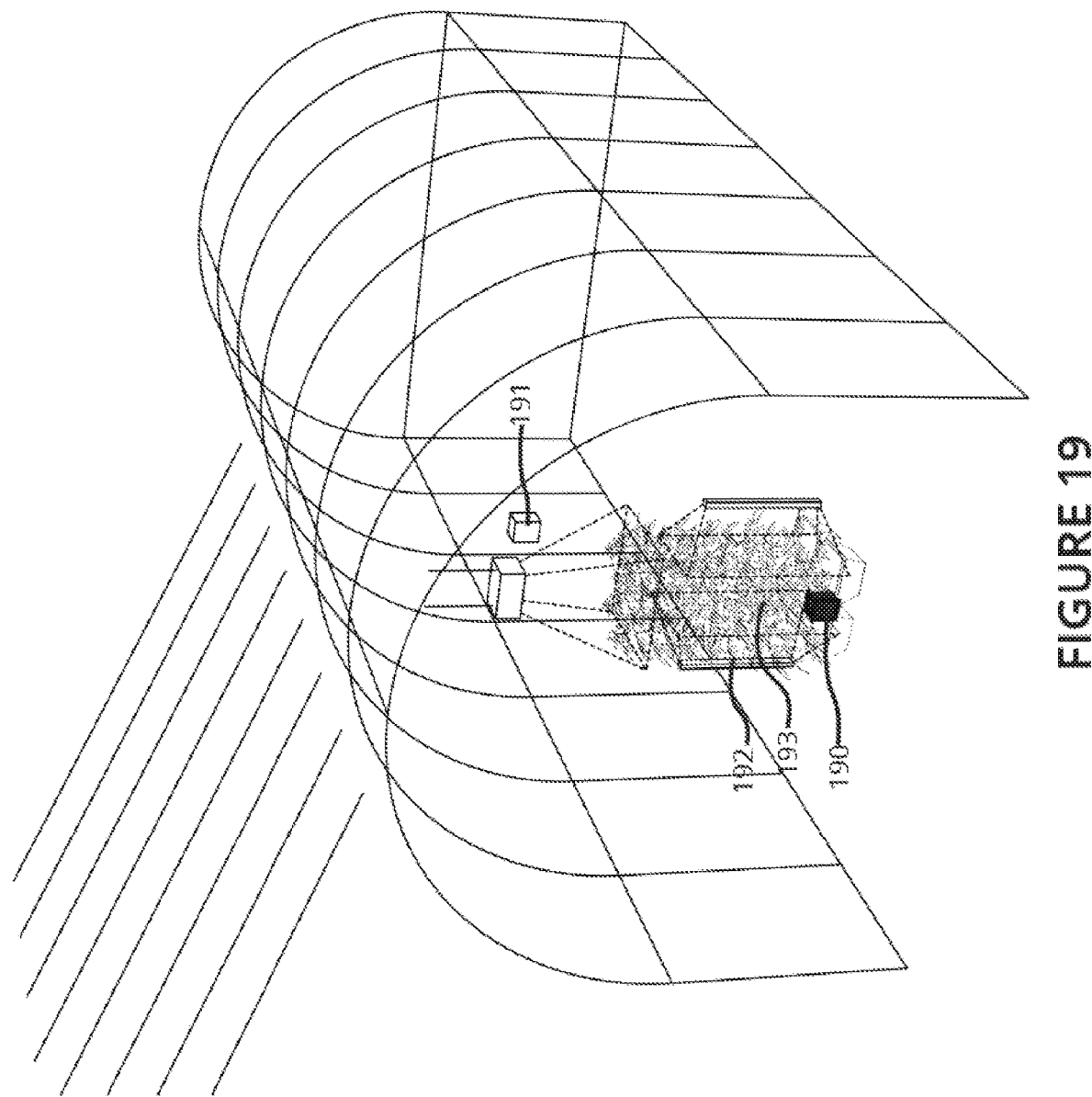
FIG. 19 shows a plurality of plants and two light sensing devices, wherein the top (canopy) of the plants is illuminated by at least one first group of lighting devices, and the intracanopy region (under the canopy) is illuminated by at least one second group of lighting devices, and a first light sensing device measures irradiance arriving at the top of the plants, and a second light sensing device measures irradiance arriving in the intracanopy region.
Figure 20:
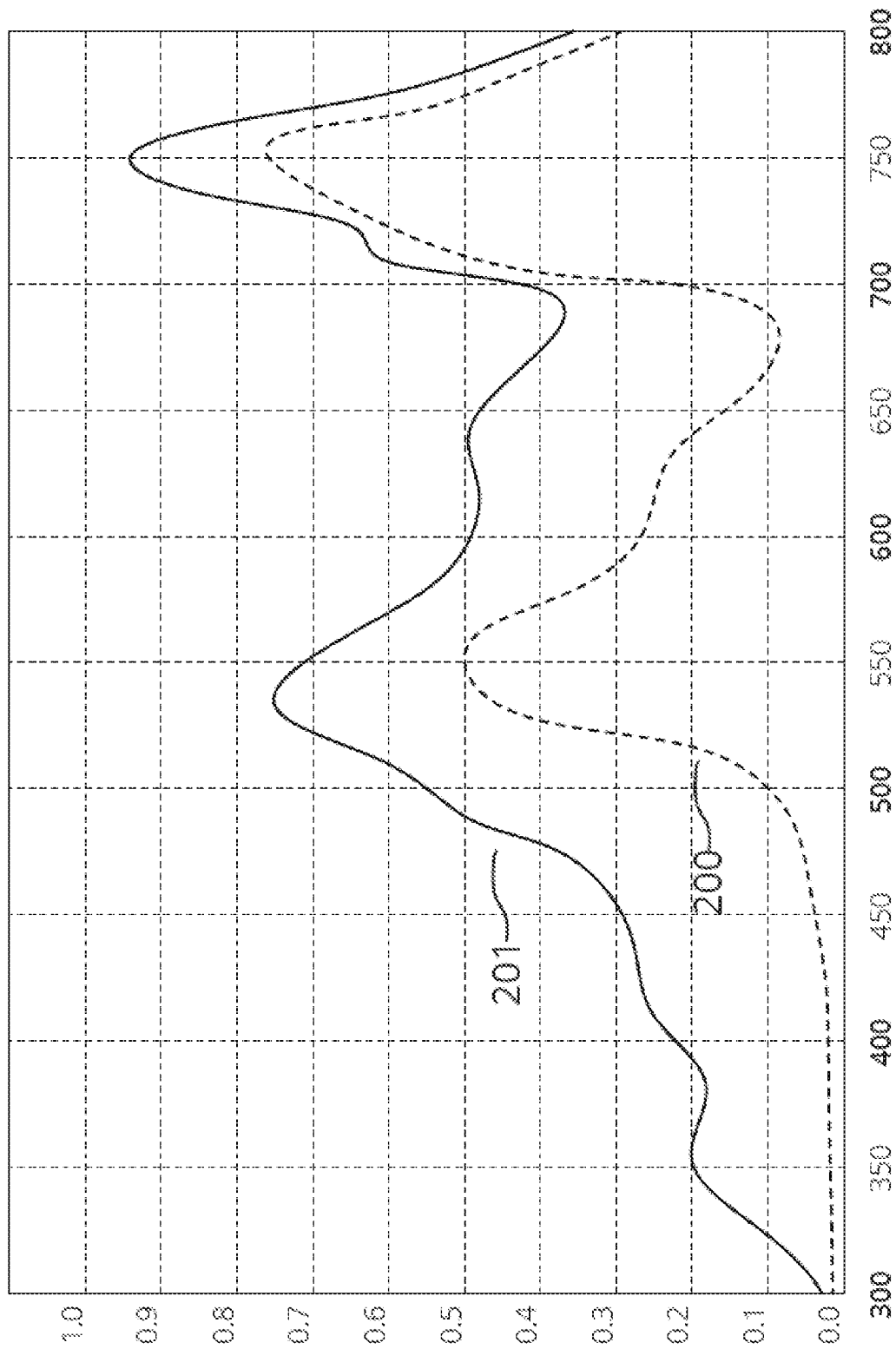
FIG. 20 shows an exemplary spectral power distribution of light reflected from the canopy of several plants and an exemplary spectral power distribution of light reflected from within the intracanopy region of the plants.

In another embodiment, a light formula may comprise spectrum and intensity directives for specific portions of a plant. In this embodiment, at least one light sensing device 3108 (191 as shown in FIG. 19) may be utilized to detect the ambient photosynthetic active radiation transmitted through the top canopy layer 190. FIG. 20 depicts the spectral power distribution of ambient light under an exemplary plant canopy 200 as well as the spectral power distribution of ambient light reflected from the top of the same exemplary plant canopy 201. In a further embodiment, an intracanopy spectra can be estimated from top of canopy spectra measurements rather than utilizing a dedicated sensor within the plant canopy.

In an embodiment, intra canopy spectra data can be computed to generate an intensity and spectrum directive for lighting devices 192 illuminating foliage under the canopy 190 as to comply with the light formula associated with this portion of the plant. By way of example, the composite light within the intracanopy region 193 may be controlled as to maintain a substantially similar composite light spectral power distribution to the light reaching the top of the canopy. By way of example, the composite light within the intracanopy region 193 may be manipulated to regulate plant growth in certain regions under the canopy; for example, substantially blue light or broad spectrum white light with a substantial level of blue irradiance may be emitted by lighting devices in this zone to regulate branching, elongation, and growth.

Lighting Device with Modular Insert

Figure 22B:
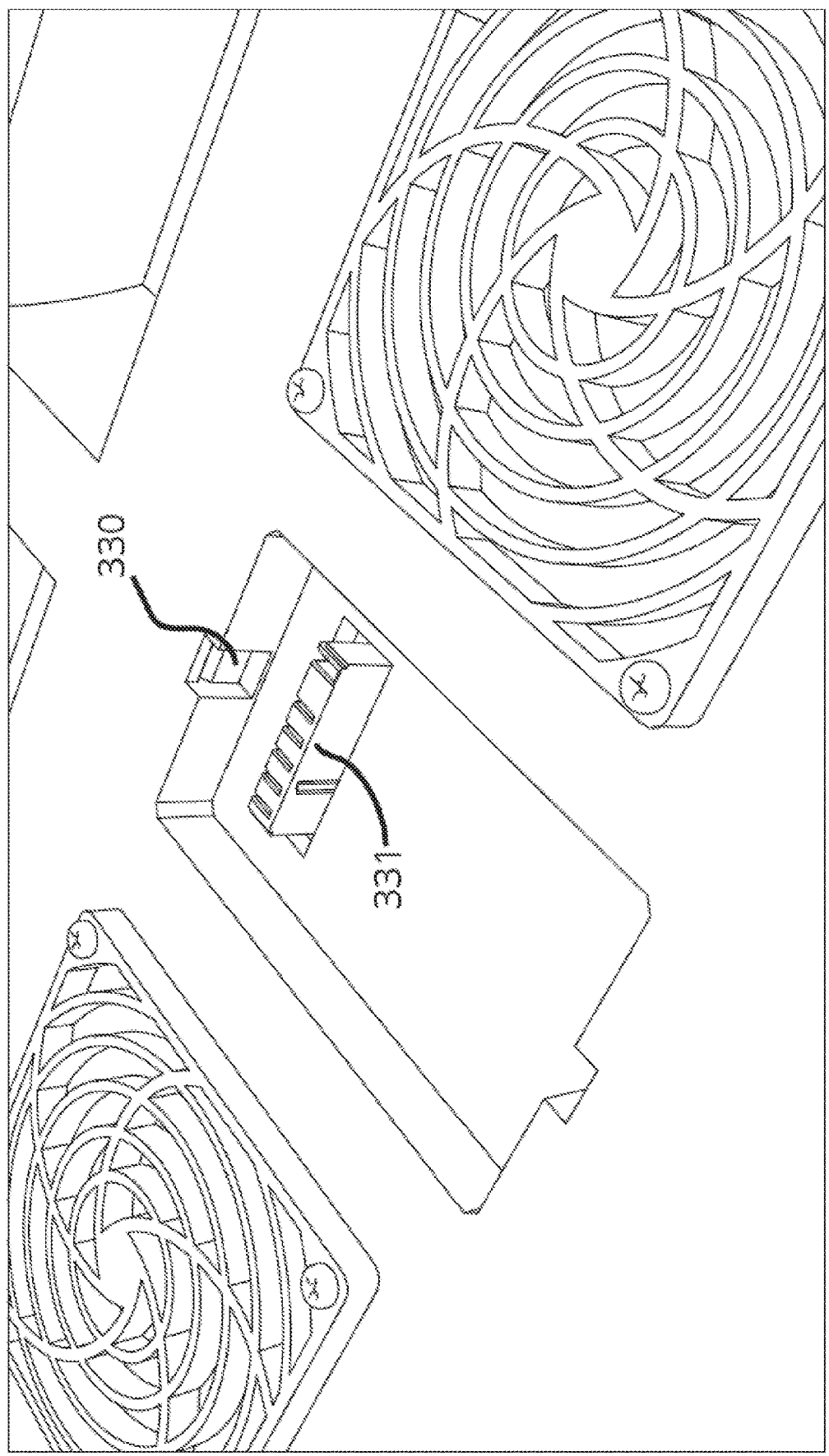
FIG. 22B depicts a receptacle on a lighting device adapted to receive a modular assembly.

In an embodiment, the lighting device 210 incorporates a receptacle 211 into which modular devices 212 can be installed; see FIG. 21, FIG. 22A, and FIG. 22B. In this embodiment, the receptacle may provide mechanical fixation, power, network access, or access to the functions of the lighting devices. In a further embodiment, the modular device contains a wireless radio, wireless transceiver, or wired network interface for network communication. In an embodiment, a variety of modular devices are made available for installation by end users into lighting devices through the use of a mechanical clip 330 (as shown in FIG. 22B), and a wire connector 331 (as shown in FIG. 22B). Such variety of modular devices may include, but are not limited to, a light sensor device, a depth sensing element, cameras, stereoscopic cameras, hyperspectral cameras, infrared cameras, thermal imaging cameras, 3D cameras, 3D scanners, spectroscopy devices, light sensors, radar devices, environmental sensors such as air temperature, mean radiant heat sensors, humidity sensors, $CO_2$ sensors, oxygen sensors, or distance sensors such as ultrasonic sensors, light based time of flight sensors, radar sensors, or light sources such as UV light sources, infrared light sources, or the like. In various embodiments of the invention, the receptacle can be oriented such that the modular device and light emitted from the lighting device are substantially aimed in the same direction to facilitate reflected light sensing techniques, by way of example.

In certain horticultural production environments, operators track individual plants, trays containing plants, and the like with identification numbers, often facilitated by barcodes, RFID devices, or other identification tags. According to embodiments disclosed herein, methods of validating light levels and spectrum delivered to growth environments are provided, and the methods may further provide such validation on a plant ID or tray id basis. Such correlation can be generally useful in regulated production environments, such as cGMP managed facilities. In some embodiments, the lighting device incorporates an identification system and a communication interface, wherein the identification system identifies proximal tags and communicates the presence of the proximal tags to a central controller 31 via the communication interface. In these embodiments, the identification system may comprise a radio frequency ID antenna and radio, a Bluetooth radio, or other real time location system known to those skilled in the art. In these embodiments, the identification system may be contained within a modular device, wherein the modular device can be installed into a lighting device comprising a receptacle.

Deploying connected networks of sensor devices and lighting devices can be a labor intensive process, particularity when specific devices must be placed correctly in fixed locations. In some facilities, operators find the ability to move sensing devices around a facility as needed to be useful in diagnosing problems requiring conditions monitoring. In other situations, data received from sensors can be compromised when sensor locations are mis-matched.

In an embodiment, the system including the light sensing device(s), lighting device(s), and central controller 31 can be adapted to identify the spatial relationship between fixed positions of lighting devices and potentially mobile positions of light sensing devices by means of modulating at least one emitter in the lighting device. This emitter modulation might include generating light modulated by amplitude, phase, or frequency. The modulation contains a binary data which may include the globally unique device identifier associated with the lighting device, among other pieces of data. One method in which the light fixture may communicate this data can be by shifting the frequency of the light in a specific pattern.

By way of example, a system of at least two lighting devices can be controlled by a central controller 31, which can be also in communication with at least one light sensing device, wherein the central controller 31 might periodically alternate the output of a substantially red and blue groups of emitters on the first lighting device, while periodically alternating the output of substantially red and green groups of emitters on the other lighting device. The light sensing device would then detect the spectrum distribution of the lighting devices and communicate the modulated signals to the central controller 31. In this example, the central controller 31 can be able to match the location of the light sensing device to a specific lighting device, and further quantify the degree to which the irradiance of specific lighting devices affect the response of any one light sensing device.

Light Validation Methods

According to an embodiment, a lighting device and system capable of validating the spectrum power distribution and intensity of the light emitted by the device can be provided. Such validation methods are critical to the function of lighting systems in controlled environment agriculture production environments. In an embodiment, a setpoint comprising at least one of a spectral power distribution directive (herein referred to as spectrum directive) and/or an intensity level (herein referred to as intensity directive) can be communicated by a central controller 31 to a lighting device, and the lighting device communicates validation signals back to the controller, wherein the controller computes the validation signals which may indicate the intensity and/or spectrum of light emitted by the lighting device can be within the set point. In this embodiment, the validation signals may include temperature measurements proximal to emitters within the lighting device. In other embodiments, a central controller 31 receives validation signals from at least one sensor external to the lighting device, and the central controller 31 computes the validation signals which may indicate lighting devices are emitting intensity and/or a spectral power distribution within the setpoint. In embodiments, validation methods form the basis of a feedback loop designed to ensure consistent intensity and spectral power distribution can be emitted by lighting devices.

Several examples of prior art exist relating to control and feedback loops intended to result in consistent light and spectrum power distribution; many of these methods involve temperature sensors and light sensors placed inside lighting devices. While these methods are effective for mass produced general lighting luminaires which rarely offer spectrum control, we argue that these methods do not properly account for lifetime degradation of the lighting device respective of the operating conditions of each individual lighting device as well as lighting device performance variability in manufacturing. Further, these methods do not provide data to a central controller 31 validating lighting device performance, which can be a key aspect of embodiments disclosed herein.

Embodiments disclosed herein make use of several sources of data to realize novel performance validation techniques. These sources of data include validation signals provided by lighting devices, initial measurements, lifetime performance data, and reference datasets, and each of these sources of data will be described in detail in the following sections.

Embodiments disclosed herein make use of validation signals provided by lighting devices or a central controller 31. The validation signals may comprise spectrum and intensity estimates computed based on real time operating conditions and historic operating conditions. The validation signals may further comprise spectrum and intensity measurements generated by light sensing devices. The validation signals may further comprise temperature measurements made on or near emitters internal to lighting devices, temperature measurements within the lighting device of external ambient conditions, heat flux measurements near internal emitters, thermopile measurements near internal emitters, frequency measurements, current measurements, or voltage measurements. Measurements from at least one temperature sensor integrated circuit or thermistor placed as close as possible to the emitters are utilized, however other embodiments may incorporate any combination of the aforementioned measurements. In some embodiments where an estimation of the intensity and spectral power distribution can be computed within the lighting device, validation signals may comprise the estimation.

Embodiments disclosed herein may make use of initial measurements of lighting device performance. During the manufacture of components (such as emitters) utilized within lighting devices, a small amount of manufacturing variability can be introduced into the final lighting device; manufacturing tolerances associated with downstream processes such as assembly processes, coating processes, and forming processes may also introduce variability into the final lighting device. This variability most often manifests as small variations in maximum intensity, small variations in spectrum, and small variations in drive frequency—both device to device and across production runs. Initial measurements performed upon manufacture of the lighting devices are utilized by the embodiments to estimate delivered intensity and delivered spectrum respective of the variations. These initial measurements may include, but are not limited to, irradiance measurements and spectral power distribution measurements of the radiant flux emitted by the lighting devices. The initial measurements may be performed at one or more fixed and known points relative to the axis of illumination; the initial measurements may also be performed with the aid of an integrating sphere, gonio spectrophotometer, or other instrument familiar to those skilled in the art for performing repeatable spectra and irradiance measurements. In an embodiment, each lighting device can be tested upon manufacture utilizing one or more of the aforementioned methods; in other embodiments, a selection of a statistically significant number of devices from each production batch can be tested. In an embodiment, the results of the initial measurements are stored in memory within each lighting device. In other embodiments, each lighting device can be assigned a globally unique device identifier, which can be stored in memory within each lighting device. In this embodiment, the initial measurements are stored in the central database along with the globally unique device identifier associated with each of the initial measurements.

The lifetime performance data may comprise tabular, sequential data related to the operating conditions of the lighting devices, including quantity of operational hours, and may further comprise operational hours as well as set-points, control signals, and validation signals associated with each operational hour. The lifetime performance data may also comprise a statistically computed summary of the operational hours, set-points, control signals, and validation signals. By way of example, a statistically computed summary of operating conditions may further comprise a plurality of intervals each comprising a fixed number of operational hours as well as average, maximum, and standard deviation in set-points, control signals, and recorded validation signals per interval. By way of example, the interval may span 500 operating hours. In an embodiment of the invention, the lifetime performance data can be recorded to the lighting device within memory (e.g., non-volatile memory). In other embodiments of the invention, the lifetime performance data can be recorded to a central database and associated with a globally unique device identifier which can be further associated with each of the lighting devices.

The reference datasets may comprise a simulated lifetime performance dataset, a measured performance dataset from reference lighting devices under operation, or a projected lifetime performance dataset based on measured performance data from reference lighting devices. The measured performance datasets may be developed using standard techniques known to those skilled in the art, such as LM-80 "Measuring Luminous Flux and Color Maintenance of LED Packages, Arrays and Modules," which requires several intervals of measurements over a minimum of 6000 operational hours; measured performance datasets may also comprise continuous measurements on reference devices for well over 6000 hours. Reference datasets may be generated on reference lighting devices in a remote facility under controlled conditions, and the reference datasets may be updated in real time over the internet or via software updates to provide accurate reference datasets throughout the useful lifetime of the lighting devices. Reference datasets may likewise be generated to reflect specific operation conditions, such as high humidity or high heat environments. The projected lifetime performance datasets may be computed using techniques known to those skilled in the art, such as Illuminating Engineering Society TM-21 "Projecting Long Term Lumen Maintenance of LED Light Sources."

In an embodiment, a setpoint 3201 can be communicated to a lighting device 3202 containing a plurality of emitters, control signals 3203 for the emitters are generated in response to the setpoint 3201, and an estimate 3204 of the intensity and spectral power distribution of the composite radiant flux emitted by the lighting device 3202 can be calculated by computing the control signals 3203 relative to lifetime performance data 3210 and a reference dataset 3211. In an embodiment, lifetime performance data 3210 comprises operational hours, and may further comprise a statistically computed summary of operating conditions. In an embodiment, the estimate can be computed within the lighting device; in another embodiment, the estimate 3204 can be computed by a central controller 31. In an embodiment, the control signals 3203 can be modified based on the estimate 3204 as to regulate the composite spectral output of the lighting device in accordance with the setpoint.

In another embodiment, a setpoint 3201 can be communicated to a lighting device 3202 containing a plurality of emitters, and corresponding control signals 3203 for the emitters are computed by the lighting device 3202 by calculating an appropriate duty cycle 3206 for each group of emitters based on operational hours or lifetime performance data 3210 of the emitter groups and a reference dataset 3211 associated with the groups of emitters. In a further embodiment, temperature references 3207 are utilized in addition to operational hours or lifetime performance data 3210 and a reference dataset 3211 to calculate the appropriate duty cycle for each group of emitters. In this embodiment, the temperature references 3207 comprise at least one temperature measurement at or near the emitters within the lighting device or at least one ambient temperature measurement taken externally from the lighting device or near the external case or enclosure of the lighting device. In a further embodiment, an estimate of the composite spectral power distribution and intensity of the lighting device can be computed by comparing real time temperature references 3207 and control signals 3203 to lifetime performance data 3210 and a reference dataset 3211. In a yet further embodiment, the estimate 3204 can be further computed based on initial measurements related to the lighting device.

In various embodiments of the invention, an estimate 3204 of the real time spectral power distribution and intensity can be calculated based on lifetime performance data 3210, temperature references 3207, and a reference dataset 3211. In the preferred embodiment of the invention, the estimate 3204 can be recorded to a central database with a corresponding globally unique device identifier indicating the spectrum and intensity of light delivered to plants by lighting devices. In this embodiment, lifetime performance data 3210 comprises operational hours, and may further comprise a statistically computed summary of operating conditions. In this embodiment, the estimate 3204 can be computed within the lighting device 3202; in another embodiment, the estimate can be computed by a central controller 31.

In certain plant growth environments, dedicated growth areas are utilized for plants undergoing vegetative growth and flowering growth due to the necessity to control the photoperiod (length of day) and spectrum of light at each stage. During vegetative growth, blue rich or neutral spectrum substantially white light can be generally preferred to regulate plant growth, while red rich spectrum distributions are generally preferred to regulate flowering. Aspects of the embodiments involve quantifying the lifetime performance data associated with certain groups of emitters as to determine the level of degradation certain groups of emitters have experienced due to operating at one spectrum directive for many thousands of hours. This can be generally useful within the plant growth environments to re-purpose a lighting device from a dedicated flowering growth area to a dedicated vegetative growth area, and vice versa, since a significant shift in the spectrum directives will result in illumination of groups of emitters which have experienced significantly less degradation. In this way, growers can extend the operating lifetime of the lighting devices.

In an embodiment of the invention, a lighting device 3202 generates lifetime performance data 3210 related to at least two groups of emitters, wherein the lifetime performance 3210 data can be analyzed to determine a relative level of degradation 3208 associated with each group of emitters. In this embodiment, the relative level of degradation 3208 may be expressed as the calculated efficiency of each of the groups of emitters. In this embodiment, each of the relative levels of degradation 3208 associated with each group of emitters can be compared to a group of at least one light formula 3212 consisting of spectrum and intensity directives, wherein the aggregate efficiency associated with each of the light formulas 3212 can be calculated for each lighting device 3202. In this embodiment, the aggregate efficiency and the relative levels of degradation 3208 associated with lighting devices can be stored on a database for later retrieval by operators or computation by control algorithms. In an embodiment, a lighting device 3202 comprising at least one group of emitters can be controlled as to maintain a consistent irradiance and spectral power distribution across many growth cycles, irrespective of the level of degradation 3208 which has occurred within each of the emitters. In this embodiment, the consistent irradiance and spectral power distribution can be maintained for 50,000-90,000 or more operational hours. In this embodiment, the initial output of the lighting device can be limited by a pre-determined amount, for example, dimmed to 70-90% of the maximum intensity, which can be a common practice within the lighting field. In this embodiment, wavelength and intensity calibration coefficients 3209 for each group of emitters can be transmitted to each lighting device. The calibration coefficients 3209 consist of a calculated performance factor, and are used together with intensity and spectrum setpoints to compute control signals for each group of emitters. In the preferred embodiment, calibration coefficients 3209 are transmitted to and stored in lighting devices 3202 occasionally, for example every day or week, allowing for a single set of spectrum or intensity setpoints to be transmitted to many lighting devices wherein each lighting device has a unique set of calibration coefficients. In the preferred embodiment of the invention, calibration coefficients 3209 are computed by a central controller 31 based on initial measurements, a reference dataset 3211, and lifetime performance data 3210.

In other embodiments, calibration coefficients 3209 are calculated by a processor 12 within the lighting device 3202, wherein initial measurements, lifetime performance data 3210, and a function representing a reference dataset 3211 can be stored in the lighting device; in this embodiment, the function representing a reference dataset 3211 may be updated remotely on occasion. In other embodiments, calibration coefficients 3209 are calculated for each lighting device by a central controller 31, and a unique set of spectrum and intensity setpoints can be computed for each lighting device; this embodiment can be less efficient at minimizing communication network traffic, since unique setpoints must be transmitted to each lighting device, however this embodiment does represent an alternative implementation of the invention.

Light Formulas

In a previous section, we discussed methods whereby a setpoint can be communicated to a lighting device, and control signals are generated in the lighting device in accordance with the setpoint. These methods would be considered real time control, in that the lighting device only receives one setpoint and no specified time to maintain the setpoint. Within the field of controlled environment agriculture, it can be advantageous to transmit scheduled setpoints to lighting devices. Transmitting a schedule of setpoints allows for more resilient control compared to real time control techniques, which require near constant or real time communication, and are therefore susceptible to communication and power failures. The following sections discuss methods by which scheduled setpoints comprising a light formula are communicated among lighting devices.

Figure 33:
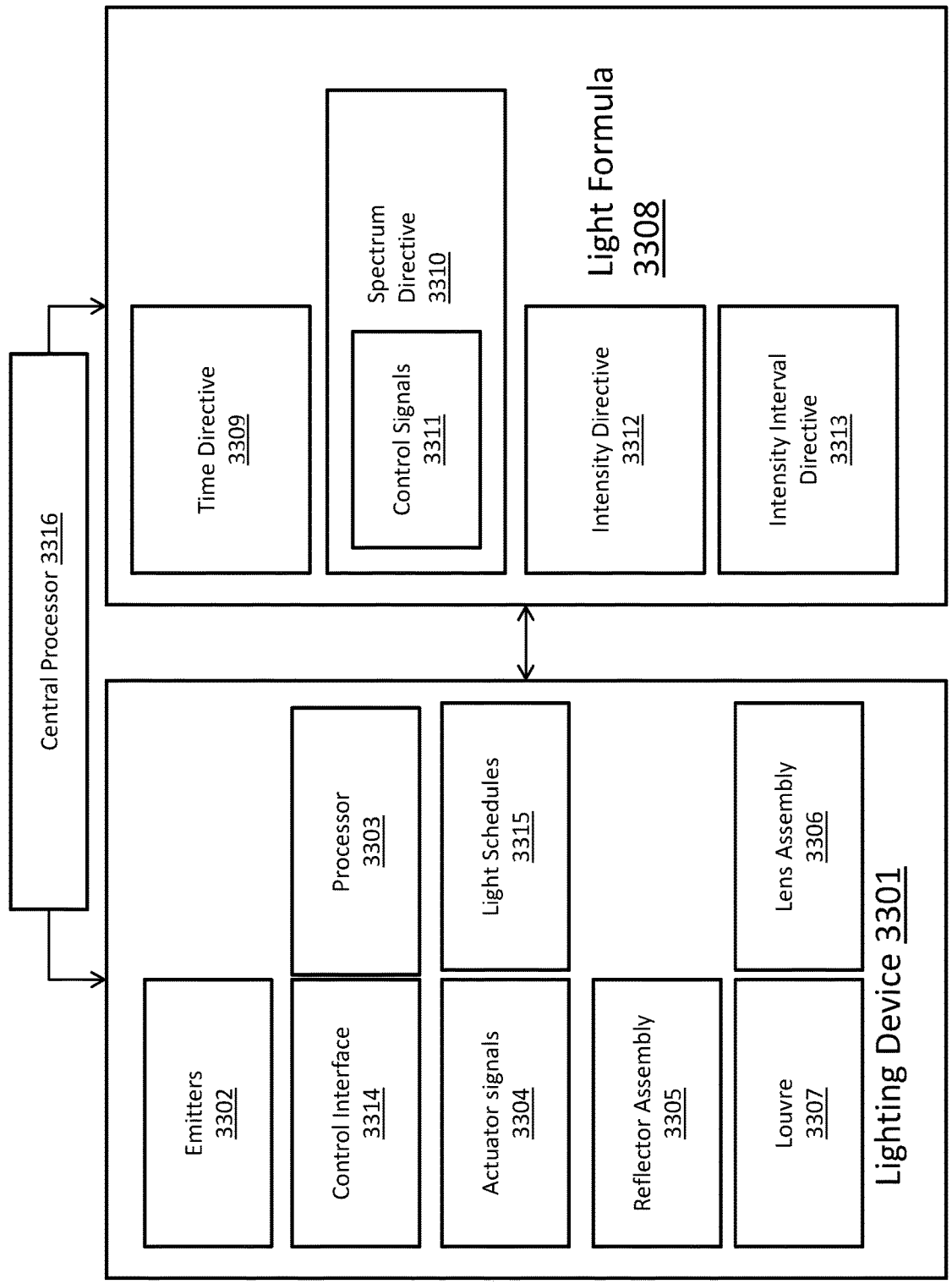
FIG. 33 illustrates a block diagram depicting a system for lighting, according to embodiments discussed herein.

As shown in FIG. 33, in an embodiment, lighting devices 3301 comprising a plurality of emitters 3302 and a control interface 3314 can be directed to emit irradiance having a specific spectral power distribution and intensity according to a schedule, herein referred to as a light formula 3308. In this embodiment, the light formula 3308 comprises at least one time directive 3309 and a corresponding at least one spectrum directive 3310, wherein the spectrum directive 3310 may further comprise control signals 3311 for the plurality of emitters 3302 contained inside the lighting device 3301. In a further embodiment, the light formula 3308 may additionally comprise an intensity directive 3312 describing the required intensity per unit area of plant canopy. In another embodiment of the invention, the light formula 3308 may comprise an intensity interval directive 3313 associated with a spectrum directive 3310, wherein the intensity interval directive 3313 can be a cumulative total of moles of photons delivered per unit area by lighting devices over time. By way of example, a light formula 3308 for a crop grown indoors from seedling to flowering or fruiting maturity would include daily time directives 3309 and corresponding spectrum directives 3310 and intensity directives 3312, wherein each directive may vary throughout the growth cycle.

In the preferred embodiment of the invention, an operator specifies a light formula 3308 through a central controller 31. The central controller 31 processes spectrum directives 3310 and intensity directives 3312 in relation to the spectral power distribution of emitter groups installed in lighting devices 3301 as well as lighting device height in relation to the plant canopy to generate a light schedule composed of spectrum and intensity setpoints. In this embodiment, the lighting device height can be specified through a user interface on the central controller 31, while in other embodiments, the installed height can be determined via depth sensing techniques.

In an embodiment, the lighting device contains a processor 3303 which can interpret light formulas 3308, generates light schedules 3315, and generates corresponding control signals 3311; in an embodiment, fixture height data can be provided to the processor 3303 within the fixture to generate the appropriate control signals 3311. In an embodiment of the invention, a central processor 3316 interprets light formulas 3308 and generates light schedules 3315 for a plurality of lighting devices, wherein each lighting device 3315 contains a processor 3303 which then generates control signals 3311. In a yet further embodiment, a central processor 3316 interprets light formulas 3308 and generates light schedules 3315 as well as control signals 3311 for a plurality of lighting devices 3301. In these embodiments, the light formula 3308 describes crop light requirements absent of fixture capabilities and site specific installation limitations (installed height of fixture and the like), while light schedules 3315 are calculated to take into account several key pieces of information related to limitations associated with lighting devices, such as installed capabilities specific to devices present at a particular facility, lighting device height, lighting device angular irradiance distribution, and the like.

In an embodiment, the intensity directive 3312 comprises irradiance levels per unit area of plant canopy, and the processor 3303 interprets the intensity directive 3312 and the spectrum directive 3310 and generates corresponding emitter control signals 3311 to modulate the composite irradiance of the lighting device 3301 as to match the directive.

In a further embodiment, canopy height data can be provided to the lighting device, and the lighting device interprets intensity directives, spectrum directives, and the canopy height data to generate corresponding emitter control signals and actuator control signals 3304 to modulate the composite irradiance of the lighting device as to match the directives at the current plant canopy height. In this embodiment, the actuator signals 3304 may adjust the height of the lighting device to change the irradiance footprint and corresponding irradiance density; in another embodiment, the actuator signals 3304 adjust the position of at least one reflector assembly 3305, lens assembly 3306, or louvre 3307 as to change the irradiance footprint and corresponding irradiance density.

In an embodiment, the light formula 3308 may comprise limits on irradiance levels at specific times of growth cycle. In this embodiment, control signals 3311 are provided to at least one lighting device 3301 as well at least one daylight control device. By way of example, such control arrangements are useful in greenhouses where the daily dark period of a crop must be controlled to regulate photo period, flowering, and other plant functions.

Quality Control and Reporting Method

Production environments utilizing controlled environment agriculture techniques typically employ hand held light sensors and scheduled bulb changes to maintain consistent light levels among horticultural lighting devices, since conventional horticultural lighting devices exhibit a significant decline in intensity and shift in spectrum throughout the operating lifetime.

Increasingly, quality control practices are being implemented in production environments utilizing controlled environment agriculture techniques to comply with regulations as well as maintain product consistency and operations efficiency; such can be the case for plant made pharmaceuticals such as novel vaccines and protein therapies which are produced in cGMP (Current Good Manufacturing Practices) managed facilities. Within such environments, validation data indicating delivered and measured growth conditions can be a valuable resource to ensure compliance with production protocols; further, this validation data must often be furnished to regulatory bodies to ensure batch to batch consistency and compliance with various protocols. Conventionally, in the context of production environments utilizing controlled environment agriculture techniques, this validation data can be gathered manually, with measurements recorded by operators, leading to potential errors in reporting. Embodiments facilitate the creation of validation data within the context of such cGMP managed facilities; validation data in this context can be often referred to as a Master Batch Record, and can be described within.

Figure 34:
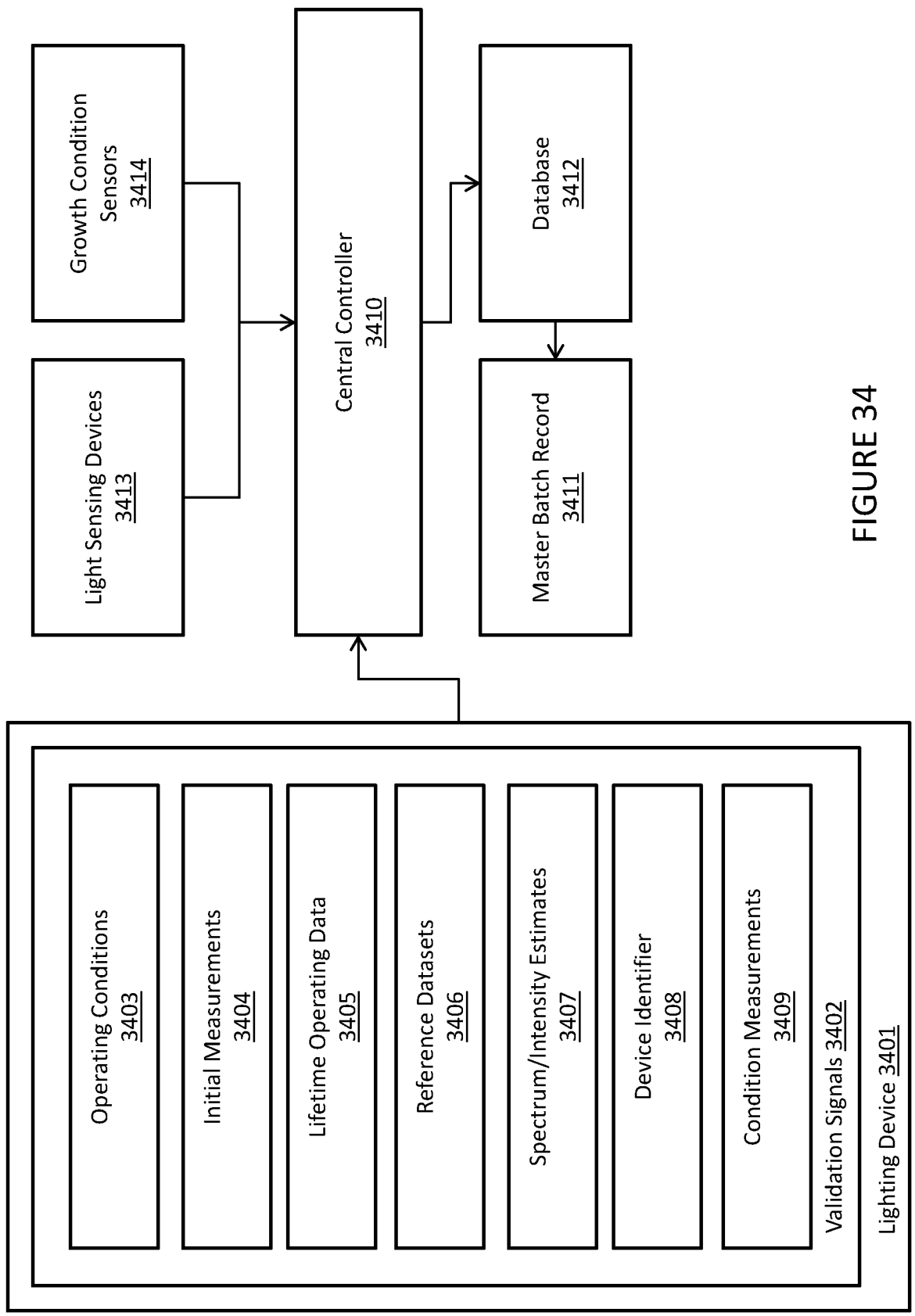
FIG. 34 illustrates a block diagram depicting a method for quality control and reporting, according to embodiments discussed herein.

As shown in FIG. 34, in an embodiment, a lighting device 3401 can transmit validation signals 3402 and a device identifier 3408 to a central controller 3410, and the central controller 3410 records the signals and identifier within a database 3412. In this embodiment, light sensing devices 3413 or growth conditions sensors 3414 may send further conditions measurements and device identifiers to the central controller 3410, which are also recorded to the database 3412. In an embodiment, validation signals 3402 comprising operating conditions 3403 from the lighting devices are computed along with initial measurements 3404, lifetime operating data 3405, a reference dataset 3406 to generate validation data, or spectrum and intensity estimates 3407, which can then be stored to a database 3412 in a central controller 3410. In this embodiment, the conditions measurements 3409 may comprise light measurements, temperature measurements, humidity measurements, moisture measurements, nutrient chemistry measurements, and the like. In various embodiments of the invention, a master batch record 3411 can be generated from data stored in the database 3412. In a further embodiment, a central controller 3410 alerts operators in the event that the validation signals 3402 indicates that growth conditions fall outside of an acceptable range indicated by a light formula.

By way of example, the validation and reporting method and system disclosed within may be useful to comply with regulatory requirements designed to prevent the spread of foodborne illness. In the context of such regulations, producers are required to implement and document pathogen mitigation strategies, where certain strategies may involve the delivery of minimum levels of irradiance in the UV, violet, or blue spectrum range of 240-470 nm to crops as well as to food contact surfaces and irrigation systems. Embodiments disclosed herein enable validation techniques which indicate that requisite levels of irradiance in select regions of the relevant spectrum have been delivered by lighting devices or by natural lighting methods; such validation techniques are further supplemented by ambient and surface temperature sensor measurements of the areas sensitive to pathogen growth, as well as the status of safety interlock sensors such as motion sensors or PIR sensors designed to prevent uv exposure to human operators. Such validation techniques which inhibit pathogen growth by exposure to irradiance in the 240 nm-470 nm range are further applicable to various forms of food preparation, packaging, and manufacturing as well as drug manufacturing and packaging, and ventilation in commercial and residential buildings.

Figure 23:
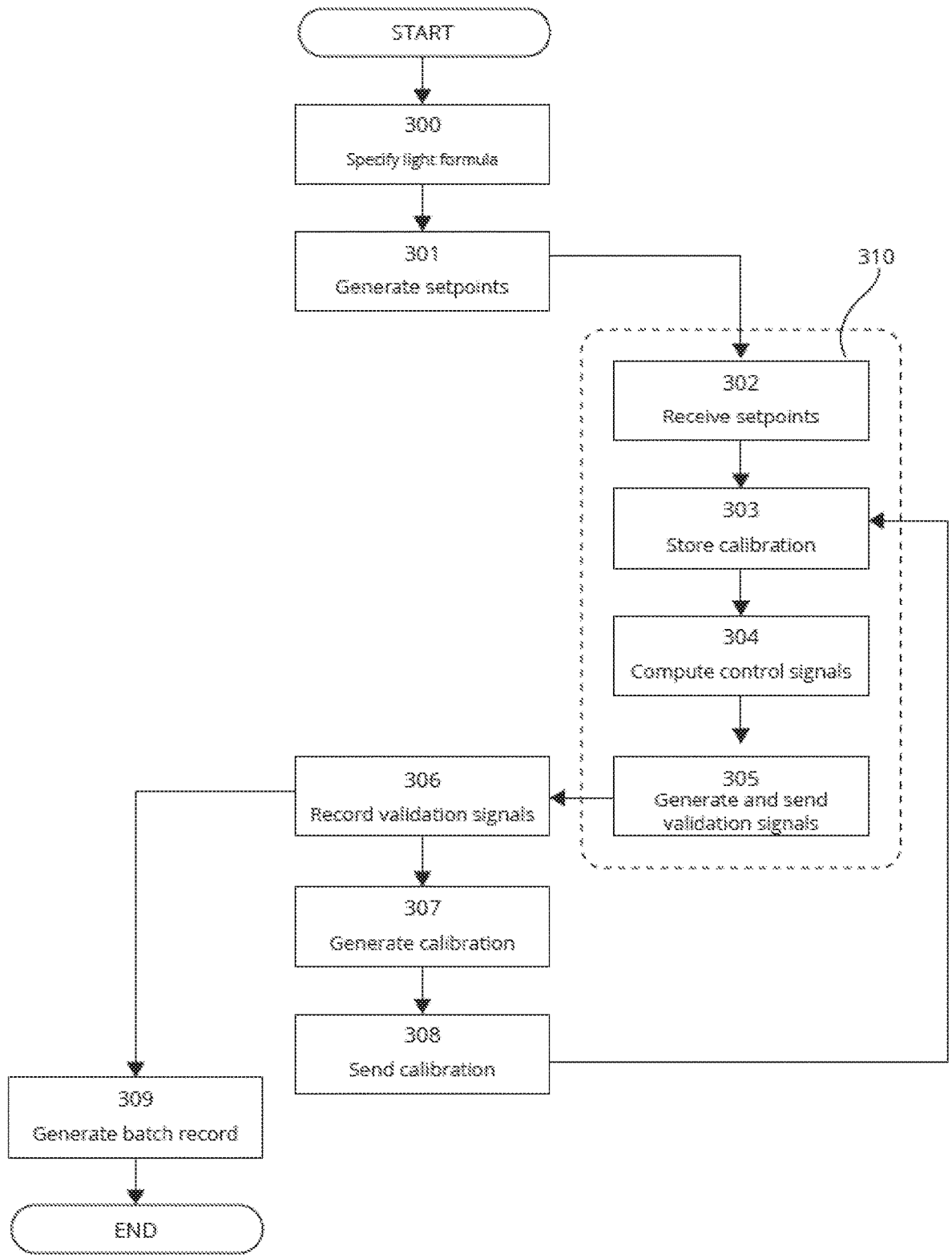
FIG. 23 shows a process diagram depicting a validation method.

FIG. 23 is a process diagram depicting an embodiment of the invention, in which lighting devices are operated in accordance with a light formula. First, a light formula can be specified through a central controller 300. This light formula can consist of spectrum and intensity directives for at least one point within a schedule, and also can be supplemented with data pertaining to the lighting devices, such as the lighting device height relative to the plant canopy. The central controller can generate setpoints 301 based on the spectrum and intensity directives defined within the light formula, and can send these setpoints 302 to a plurality of lighting devices 310. A processor within each lighting device can utilize a stored calibration coefficient 303 and the setpoints to compute control signals 304 which can correspond to the lighting requirements pertaining to the directives defined within the light formula. While the lighting devices are under operation, validation signals can be generated 305 within each lighting device and can be sent to a central controller from time to time; in the preferred embodiment of the invention, these validation signals can be generated and sent at an interval of 60 to 300 seconds; in other embodiments, these validation signals can be sent when the computed difference from a previously recorded validation signal exceeds a certain threshold. The central controller can then record the validation signals 306 along with a unique identifier for each lighting device. A calibration coefficient can be computed by the central controller 307 based on lifetime performance data comprised of the validation signals, initial measurements, and a reference dataset; these calibration coefficients can be sent 308 to each lighting device, and can be stored within 303 each lighting device to be recalled by the processor within the lighting device to compute control signals 304.

In various embodiments of the invention, the calibration coefficients can be unique to each fixture, while setpoints broadcast to a plurality of fixtures can pertain to many fixtures operated within a group. In the preferred embodiment of the invention, the central controller can generate calibration coefficients 307 at an interval, by way of example, every 100 hours of operation. In the preferred embodiment of the invention, the steps of receiving setpoints 302, storing calibration coefficients 303, computing control signals 304, and sending validation signals 305 can be performed within lighting devices 310, however in other embodiments certain steps may be performed by a central controller. Finally, in the preferred embodiment of the invention, a central controller can generates a batch record 309 based on validation signals; this batch record may further comprise generated calibration coefficients 307 and light formula settings 300.

Flux Vectoring

According to an embodiment, a lighting device which generates light of a precise and repeatable spectral power distribution and intensity, wherein the lighting device can be adapted to generate light exhibiting a variable radiation pattern as to maintain a consistent radiant flux density at various vertical heights by means of at least one mechanical actuator and at least one mobile optical element. Varying the radiation pattern emitted by the lighting device can be useful in a variety of horticultural growth situations, particularly when the height of a plant canopy may change throughout the growth cycle, which conventionally requires operators to manually adjust the height of fixtures to maintain consistent light levels (see FIG. 23).

Figure 24:
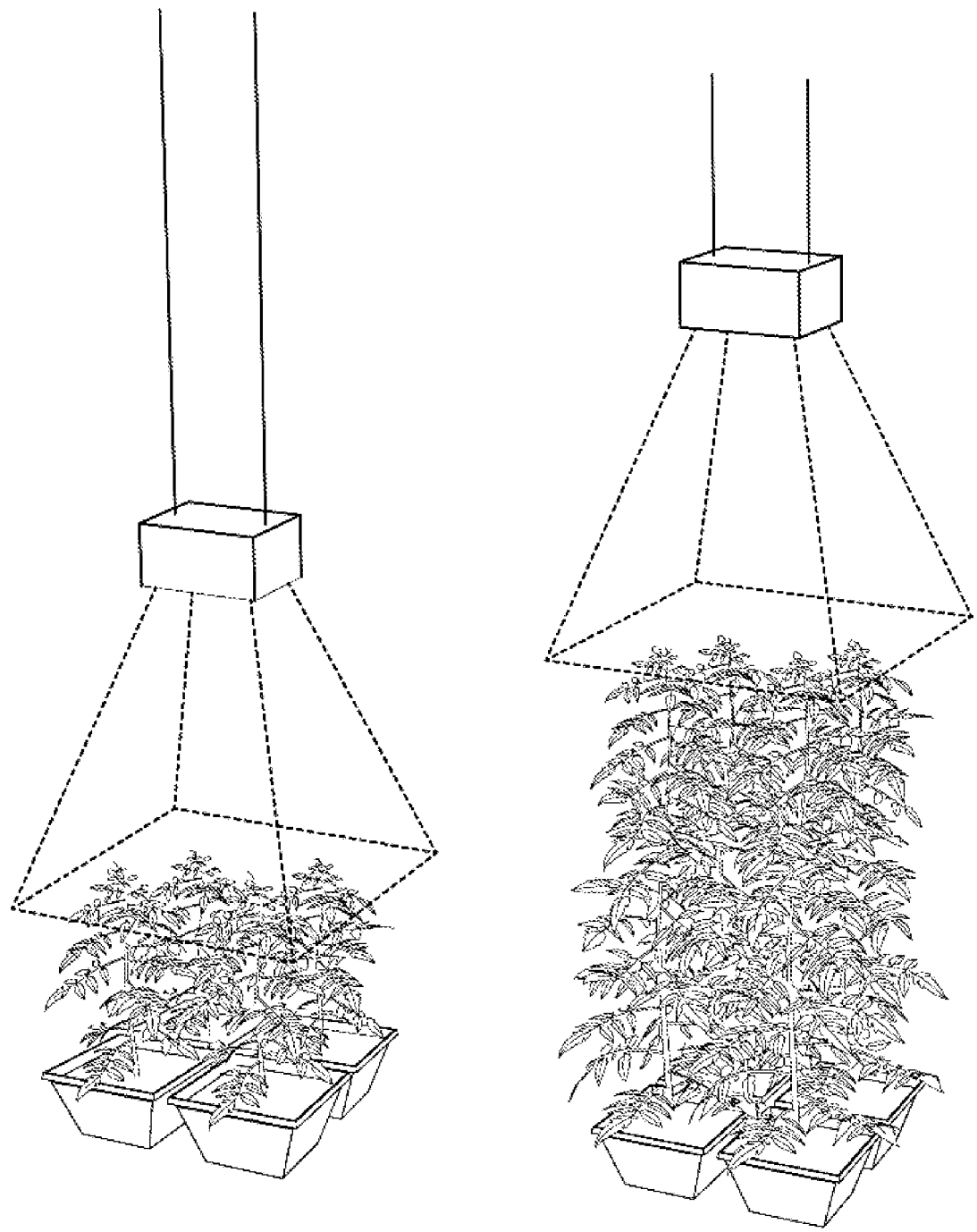
FIG. 24 shows the common practice of raising a horticultural lighting device from a first height to a second height throughout the growth phase to maintain consistent light levels on the plant canopy.
Figure 25:
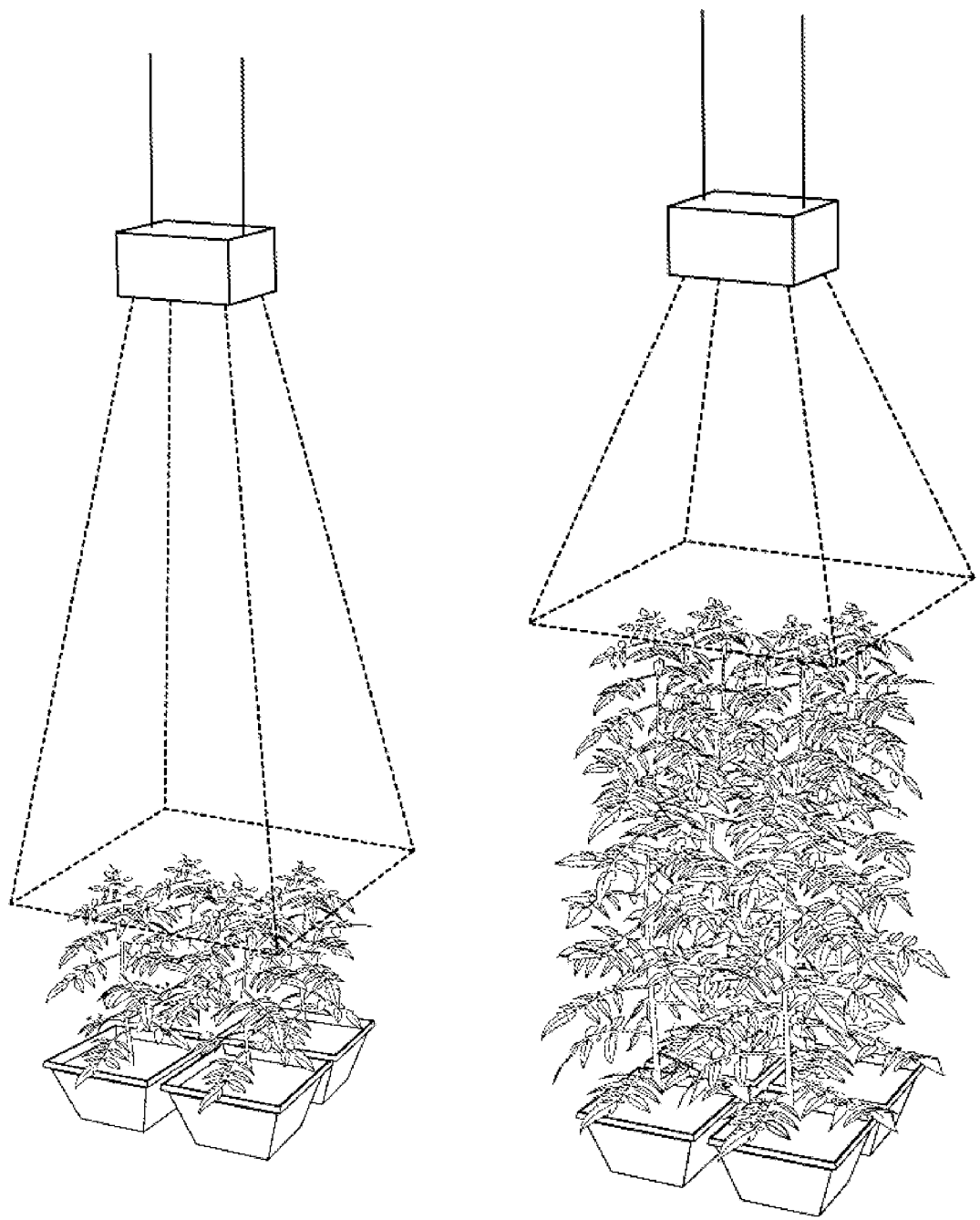
FIG. 25 depicts a horticultural lighting device which incorporates controls and actuators to adjust the size of the projected radiant footprint delivered to the canopy throughout the growth phase.
Figure 26:
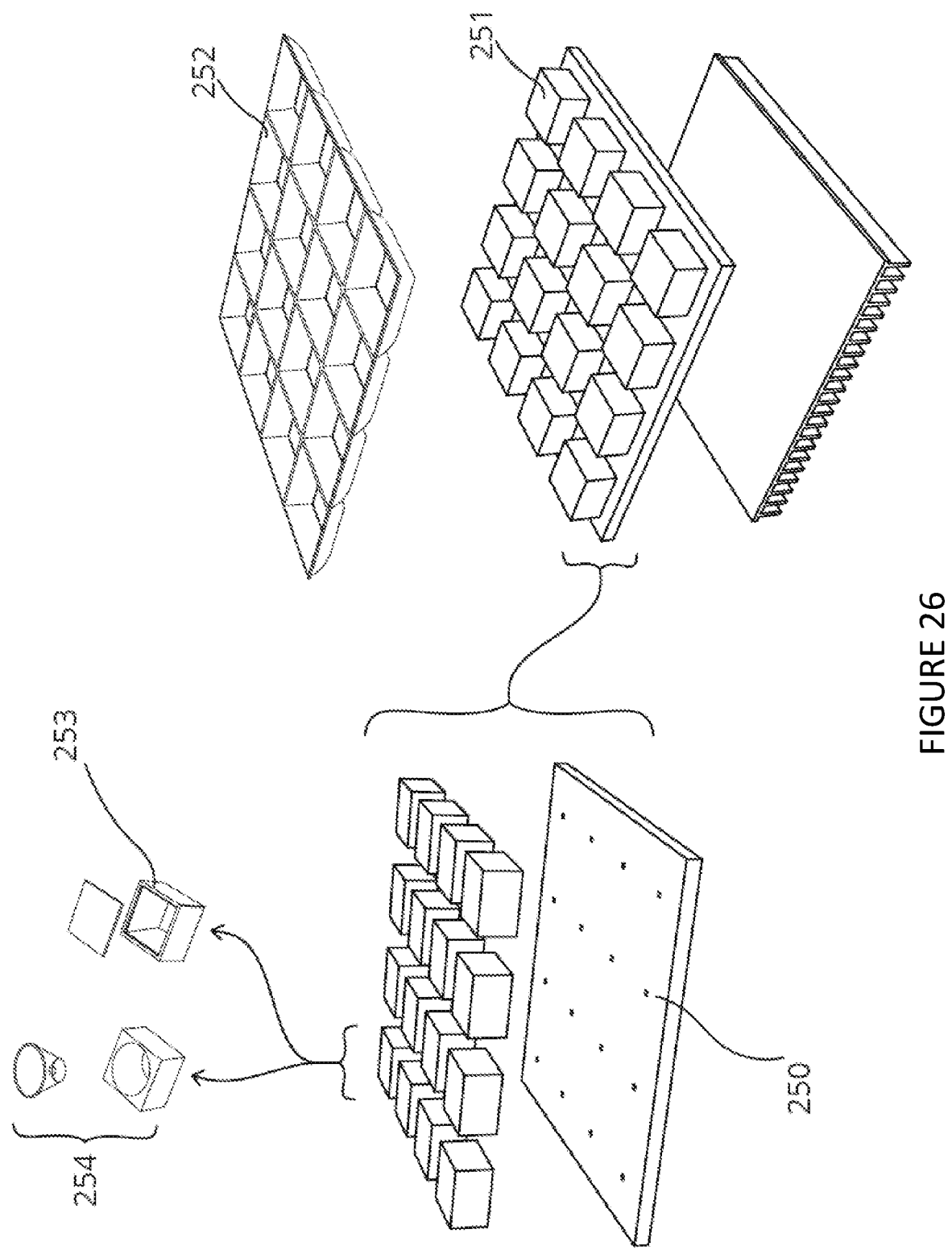
FIG. 26 shows a subassembly composed of an array of optical assemblies applied to an LED emitter array and a second optical assembly coupled to the subassembly wherein the second optical assembly is adapted to move about the axis along the radiant flux path thereby modifying the angular distribution of the radiant flux emitted by the LED emitter array.
Figure 35:
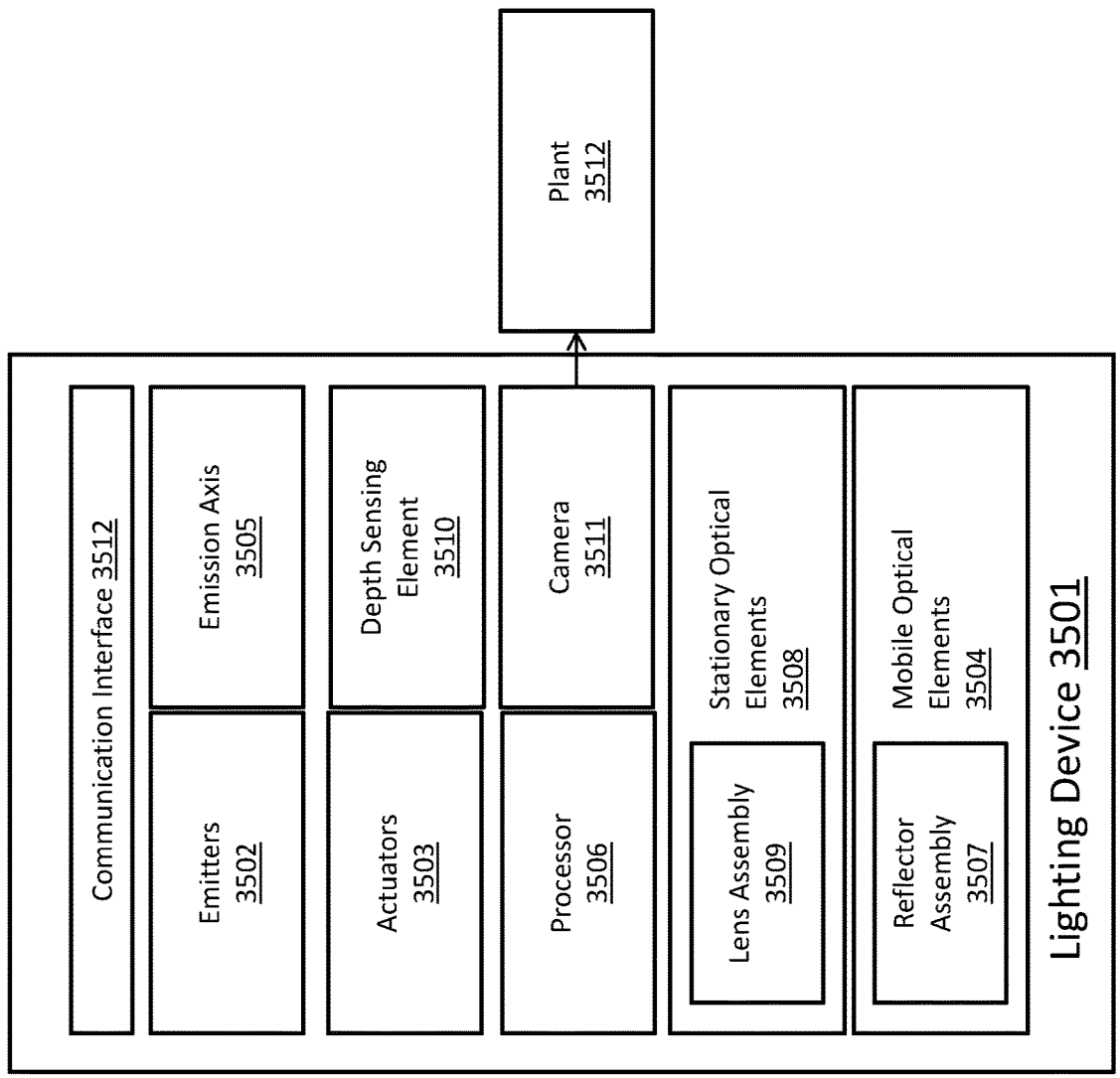
FIG. 35 illustrates a block diagram depicting a flux vectoring light system, according to embodiments discussed herein.

As shown in FIG. 35, in an embodiment, a lighting device 3501 can comprise at least one emitter 3502 having a spectral power distribution within the visible spectrum of 400-700 nm, a communication interface 3512, a processor 3506, at least one actuator 3503, and at least one mobile optical element 3504. In this embodiment, the at least one actuator 3503 can be adapted to move the at least one mobile optical element 3504 parallel to or perpendicular to the emission axis 3505 of the lighting device 3501 as to modulate the irradiance angular distribution of the lighting device 3501. In this embodiment, the processor 3506 generates control signals for at least one actuator 3503 in response to actuator directives received by the communication interface 3512. In this embodiment, modulation of the irradiance angular distribution results in predictable and repeatable irradiance densities at various canopy heights (see FIG. 24). By way of example, the irradiance density can be characterized in the units of radiometric watts per square meter, or alternatively quantity of photons per square meter (mole photons per meter square per second). In a further embodiment, the lighting device 3501 (also shown as 250 in FIGS. 26 and 27) incorporates at least one stationary optical element 3508 (also shown as 251 in FIGS. 26 and 27) as well as at least one mobile optical element 3504 (also shown as 253 in FIGS. 26 and 27). In one embodiment of the invention, the mobile optical element 3504 can comprise a formed reflector assembly 3507. In one embodiment, the at least one stationary optical element 3508 can comprise a reflector assembly 3507 (also shown as 252 in FIGS. 26 and 27); in another embodiment, the at least one stationary optical element 3508 can comprise a lens assembly 3509 (also shown as 254 in FIGS. 26 and 27).

Figure 27:
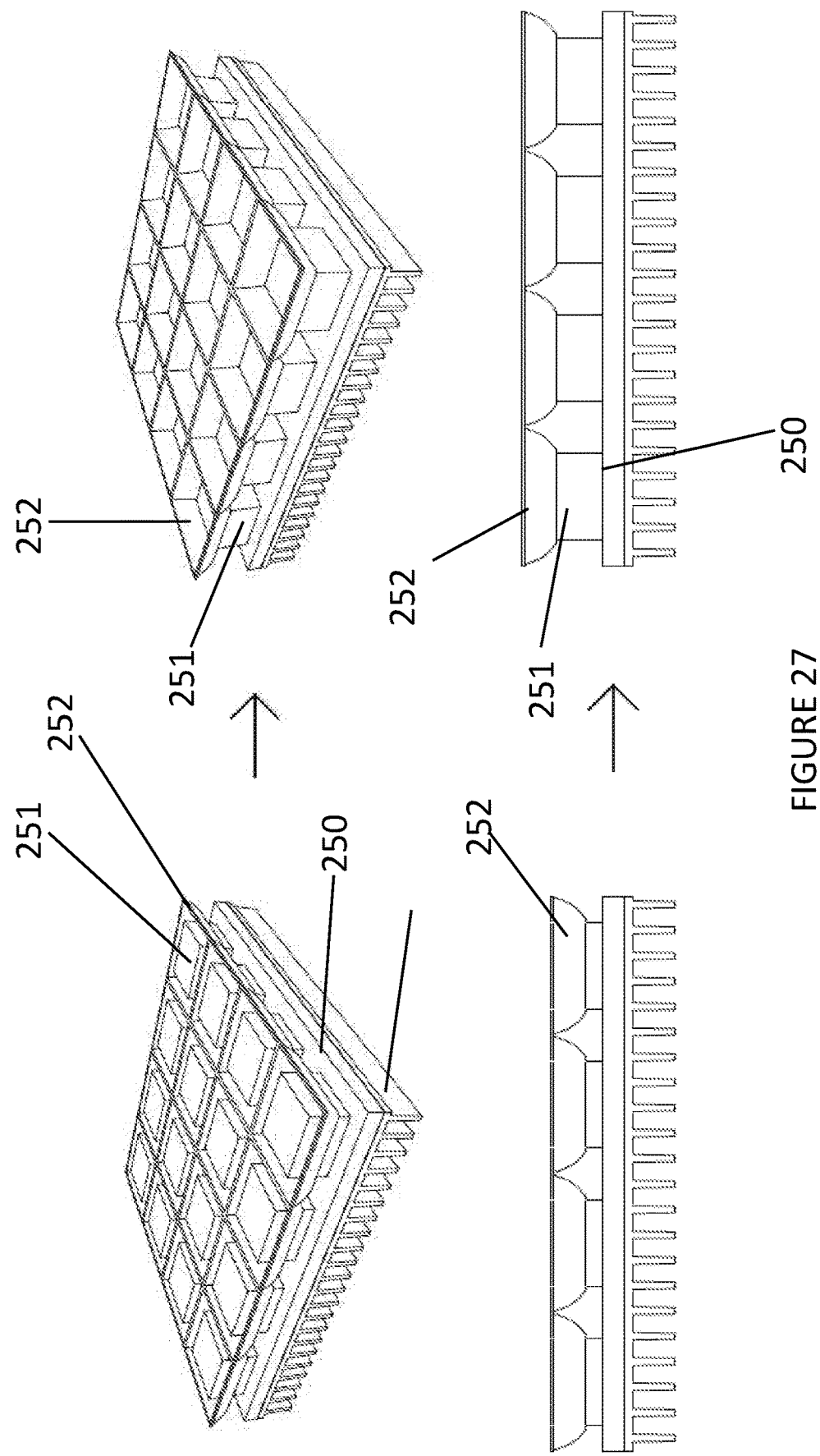
FIG. 27 shows a reflector assembly directed by means of an actuator to two different positions resulting in two different angular distributions of the resulting radiant flux.
Figure 28:
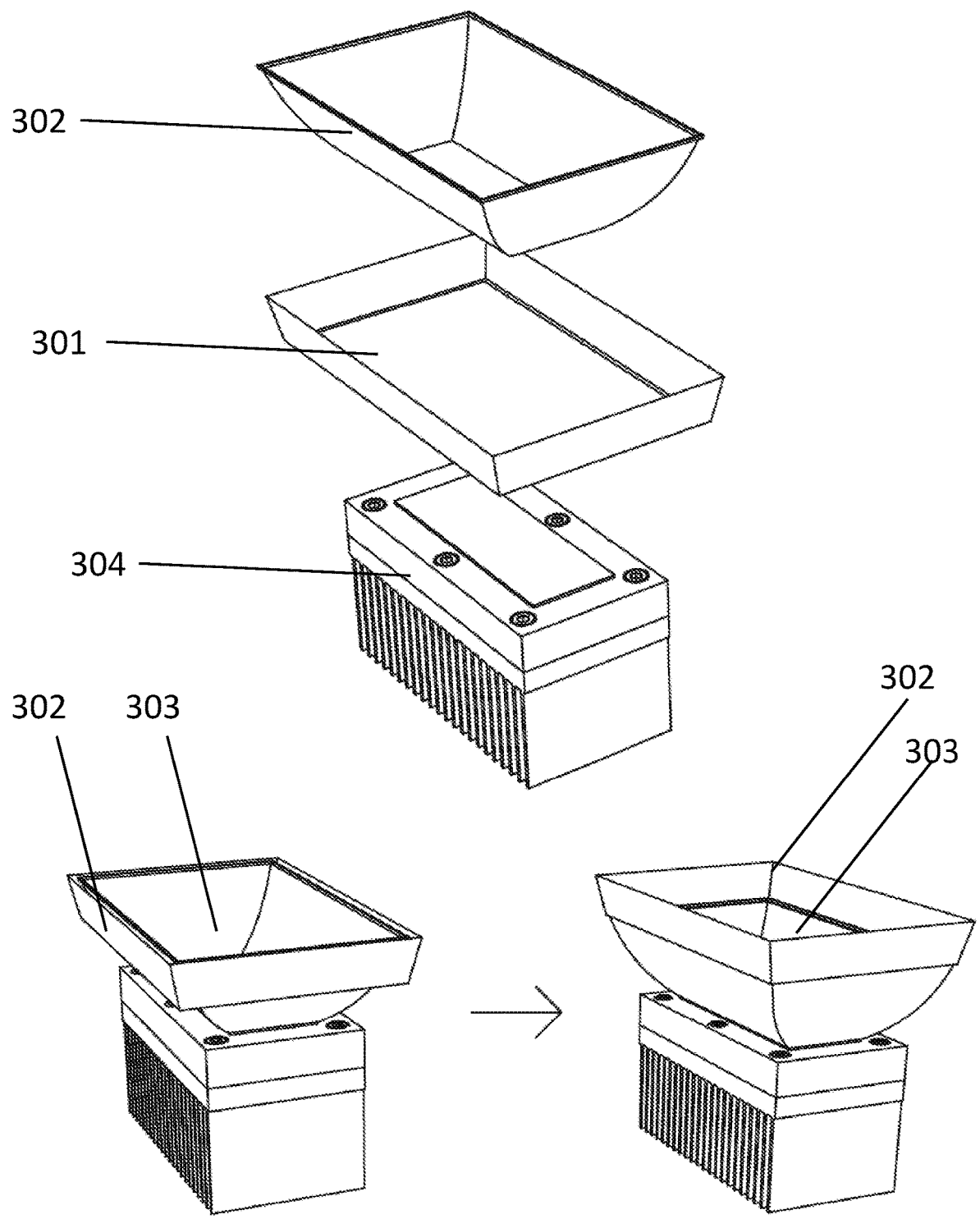
FIG. 28 depicts a horticultural lighting device which incorporates an actuator to extend a first reflector element relative to a fixed emitter assembly and a fixed second reflector element.

FIG. 27 depicts another embodiment of the invention wherein the length of a reflector assembly can be actuated as to modulate the angular distribution of irradiance emitted by a lighting device. In that embodiment, the stationary optical elements 251 can remain in place while the mobile optical elements 253 can be raised. FIG. 28 depicts a horticultural lighting device which incorporates an actuator 301 to extend a first reflector element 302 relative to a fixed emitter assembly 304 and a fixed second reflector element 303.

Returning to FIG. 35, in a further embodiment, the lighting device 3501 additionally incorporates a depth sensing element 3510 directed at detecting the average height of plants relative to the lighting device 3501. In this embodiment, raw signals generated by the depth sensing element 3510 are computed by the processor 3506, wherein a conditioning algorithm determines the average height data related to the plant canopy of the plant 3513. In this embodiment, the average height data can be communicated to a central controller. In this embodiment, the average height data can be stored to a time series database, compared to a reference related to the growth progression of a specific crop, and compared to a light formula indicating requisite PAR density, whereby the lighting device adjusts the angular distribution of irradiance as to match intensity directives.

In another embodiment, at least one camera 3511 can be directed toward at least one plant 3512, wherein the camera 3511 generates an image frame and communicates the image frame to a central controller. In this embodiment, the image frame can be analyzed to generate a canopy height directive. In this embodiment, the canopy height directive can be stored to a time series database, compared to a reference related to the growth progression of a specific crop, compared to a light formula indicating requisite PAR density, and communicated to a lighting device, whereby the lighting device adjusts the angular distribution of irradiance as to match intensity directives.

Computer Vision

Figure 36:
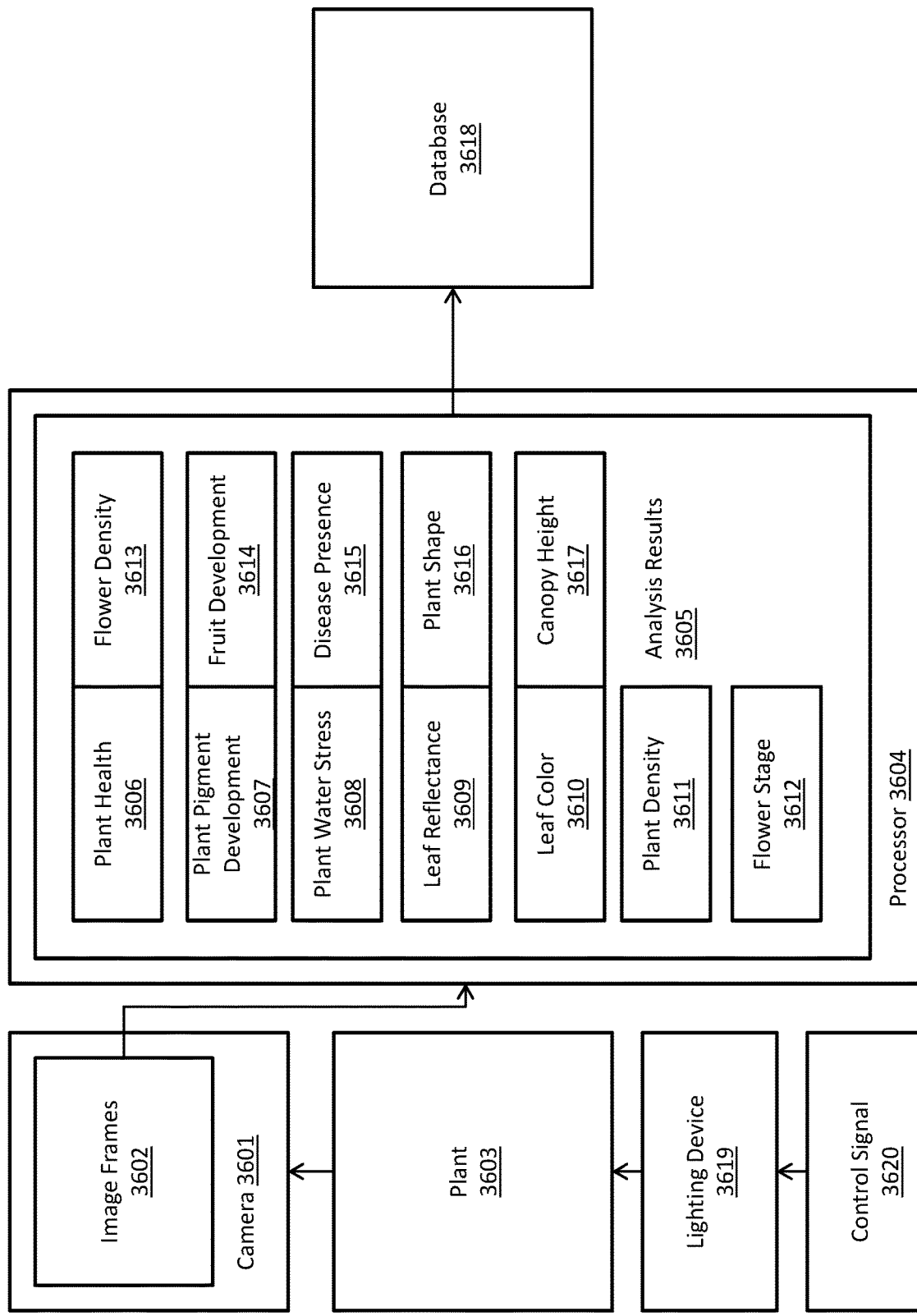
FIG. 36 illustrates a block diagram depicting a method of hyperspectral imaging, according to embodiments discussed herein.

As shown in FIG. 36, in an embodiment, at least one camera 3601 with communication capability can be arranged above the plant canopy 3603. In this embodiment, the camera 3601 can acquire an image frame 3602 of the plant canopy and can transmit the image frame 3602 to a processor 3604 which can generate an analysis result 3605 based on an image processing algorithm and stores the result 3605 and image frame 3602 in a database 3618. In a further embodiment, the camera 3601 can be placed beside the plant; in this embodiment, plant morphology becomes apparent in the image frame and may be identified by image processing algorithms. In various embodiments, image processing algorithms are utilized to process at least one image frame having at least one spectral response channel, producing analysis results 3605 representing plant health 3606, plant pigment development 3607, plant water stress 3608, leaf reflectance 3609, leaf color 3610, plant density 3611, flower stage 3612, flower density 3613, fruit development 3614, disease presence 3615, plant shape 3616, canopy height 3617, and other desirable attributes related to plant conditions from which economic value are derived. By way of example, a commonly used algorithm to identify the condition of a plant canopy can be Neutralized Difference Vegetation Index (NDVI).

In the field of hyperspectral imaging, several image acquisition methods exist, including spectrum scanning techniques, snapshot image acquisition, spatial scanning image acquisition, and spectral-spatial scanning image acquisition. Likewise, in the field of multispectral imaging, many image frames may be acquired at once representing different spectrum bands and exposure times. Regardless of image acquisition technique, both hyperspectral imaging and multi spectra imaging devices produce a substantial amount of what might be considered 'raw' or unprocessed data. In order to make this data relevant in a horticultural or other commercial context, the raw data must be processed to generate an analysis frame, which can then be further analyzed by computer vision algorithms to generate quantifiable data (analysis results); by way of example, several examples exist in the prior art involving NDVI analysis to identify nutrient stress in field grown crops. In this same example, if the user desired a different type of analysis result or analysis frame, the raw data must be re-processed by additional algorithms.

In the preferred embodiment of the invention, raw image data captured by imaging devices can be stored in a database; in this embodiment, analysis frames and analysis results may optionally also be stored in the database. In one embodiment, raw image data can be acquired at various times throughout the growth cycle of a crop, such as on a daily or hourly basis. In a further embodiment, analysis data stored in a database 3618 can be computed to provide a reference describing the trend of the analysis result over time. In this embodiment, the reference can be stored in a database for later comparison to future growth cycles (or production batches). In a further embodiment, a reference generated by imaging devices and further analysis algorithms pertaining to a current growth cycle (or production batch) can be compared to a reference stored from a previous growth cycle (or production batch). In this embodiment, lighting devices are modulated based on the comparison of references. In another embodiment of the invention, the references are generated based on data provided by light sensing devices, disclosed in the embodiments. Finally, other embodiments may store raw image data generated by imaging devices in a database 3618, and query the raw data in accordance with an image processing algorithm to generate a reference.

In an embodiment, the analysis results 3605 are stored as numeric data in a time series database 3618, and optionally with image frame data providing visual context to the analysis results 3605. Alternatively, in other embodiments, only image frame data is stored in a repository or database for later processing. In one embodiment, image frame data is acquired at various times throughout the growth cycle of a crop, such as on a daily or hourly basis. In a further embodiment, analysis data stored in a database is computed to provide a reference describing the trend of the analysis result over time. In this embodiment, the reference is stored in a database for later comparison.

In an embodiment provided herein, the camera can be sensitive to light in the visible spectrum in the range of 400-700 nm with at least one spectral channel. In another embodiment, the camera can be adapted by means of an optical filter to limit or prevent response in the UV, violet, or blue range from 320 nm-500 nm. In another embodiment, the camera includes a hyperspectral or multispectra camera exhibiting at least four channels, each having a unique spectral response. In an embodiment of the invention, the camera exhibits a response of at least one channel in the range of 700-1400 nm or 10-35 um. In other embodiments, the camera can include a hyperspectral camera exhibiting a response of at least eight channels in the range of 500-1100 nm.

In an embodiment, at least one camera 3601 and at least one lighting device 3619 can be arranged above or beside at least one plant 3603. At least one control signal 3620 or schedule directs the lighting device to emit irradiance of a specific spectral power distribution while the camera captures at least one image frame exhibiting at least one spectral response channel. In this embodiment, the spectral power distribution may substantially comprise narrow spectrum blue, UV, or violet light in the 320-470 nm range to facilitate fluorescence imaging, or may comprise broad spectrum light in the 400-750 nm range to facilitate reflected visible light imaging. In another embodiment, a control signal directs the lighting device to emit irradiance of at least two unique spectral distributions in succession while the camera captures at least two image frames each exhibiting at least one spectral response channel.

Green Walls

Indoor horticultural walls, or green walls, are vegetated gardens placed in a vertical orientation inside building interiors for ornamental purposes and functional purposes related to indoor air purification; horizontal gardening systems are also used within buildings for similar purposes. Such horticultural walls often involve the use of artificial lighting. Since ambient reflections and direct glare from artificial lighting introduced into a horticultural wall can be predominantly present in the vertical plane, such ambient reflections and direct glare has a significant impact on visual light exposure to occupants.

In recent years, much attention has been directed to the effect of visible light on the human circadian rhythm. Specifically, the study of intrinsically photosensitive retinal ganglion cells (ipRGCs) and their response to visible light suggests opportunities to regulate the human circadian rhythm by regulating daylight and artificial light inside building. Increasingly, building designers are taking steps to manage and control the amount of visible light exposed to occupants in the vertical plane orientation, since light present on the vertical plane has a significant visual impact on ipRGCs. A metric called the equivalent melanopic lux has been developed which attempts to characterize light in relation to the human circadian response.

Lighting designers use equivalent melanopic lux measurements from the vertical plane to assess the impact of light on occupant productivity and sleep function. Those skilled in the art of lighting design for circadian health are defining schedules which either limit melanopic equivalent lux during certain times or to certain levels (in the case of circadian lighting design practices for sleep function) or require minimal levels of equivalent melanopic lux at certain times or for minimal hours per day (in the case of circadian lighting design practices for productivity). Those skilled in the art of lighting design commonly use lighting controls, dimmers, tunable spectrum lighting, and daylight controls such as shades, blinds, and electrochromic glass coatings to achieve circadian lighting design goals.

Such circadian lighting design goals related to human occupants are described herein as occupant light formulas, and may comprise, by way of example, a daily hourly schedule, maximum equivalent melanopic lux levels per schedule, minimum equivalent melanopic lux levels per schedule, personal occupant equivalent melanopic lux levels related to one or more individuals, personal occupant schedule aspects such as wake time or sleep time, related to one or more individuals, or real time occupancy data.

Those skilled in the art of lighting design for circadian health are faced with significant challenges when required to enforce strict light spectrum and intensity requirements using artificial lighting. By way of example, a light source incorporating LED emitters exhibits a certain level of decay in radiant intensity and shift in spectral power distribution depending on the operating temperature of the light source and age of the light source. In some instances, this level of intensity decay and shift in spectrum can be substantial as to depart from the initial design intent of precisely regulating spectrum and intensity for circadian lighting purposes.

Figure 29:
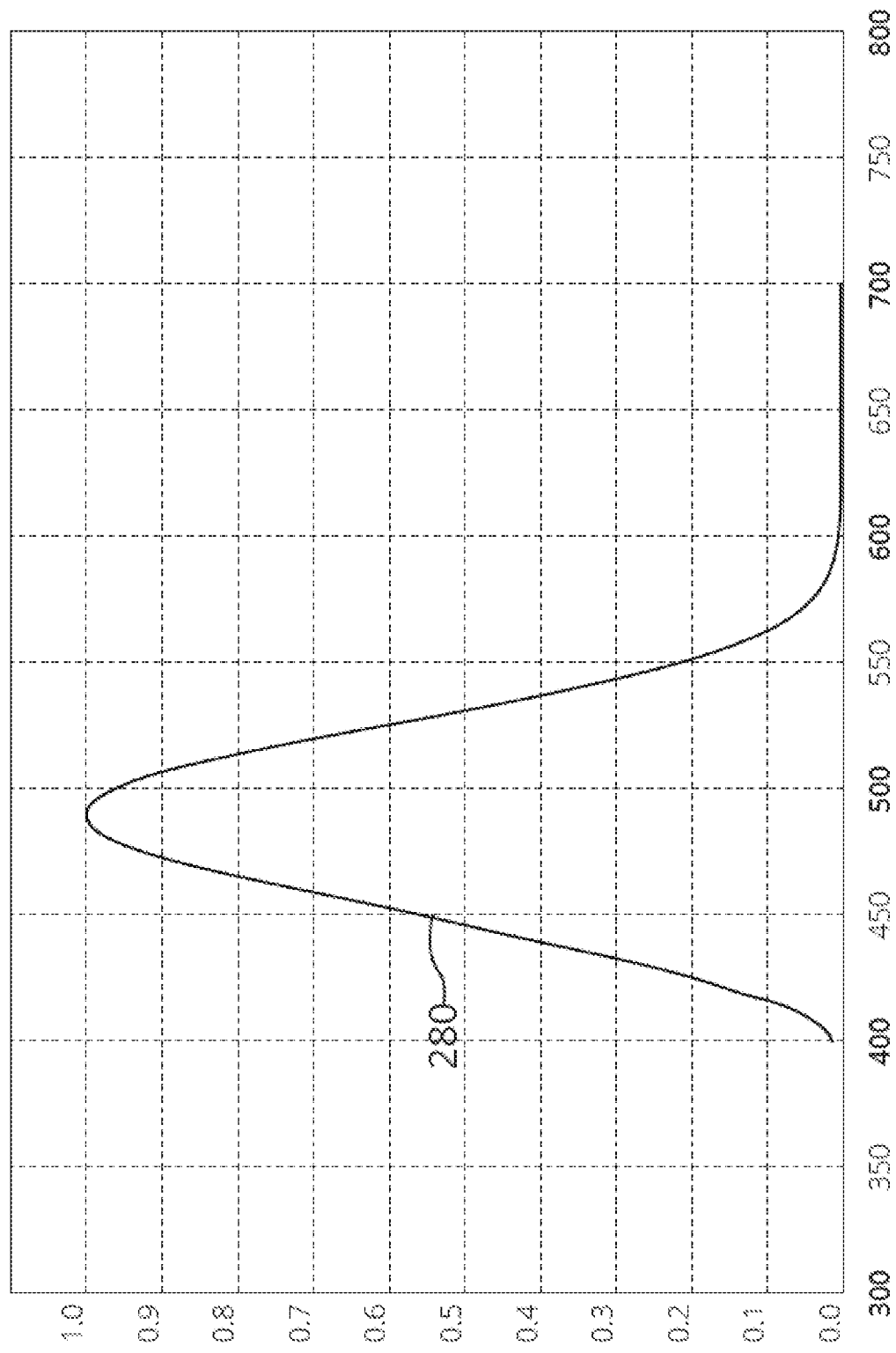
FIG. 29 shows the approximate melanopic response of the human eye which is involved in regulating the human circadian rhythm.
Figure 37:
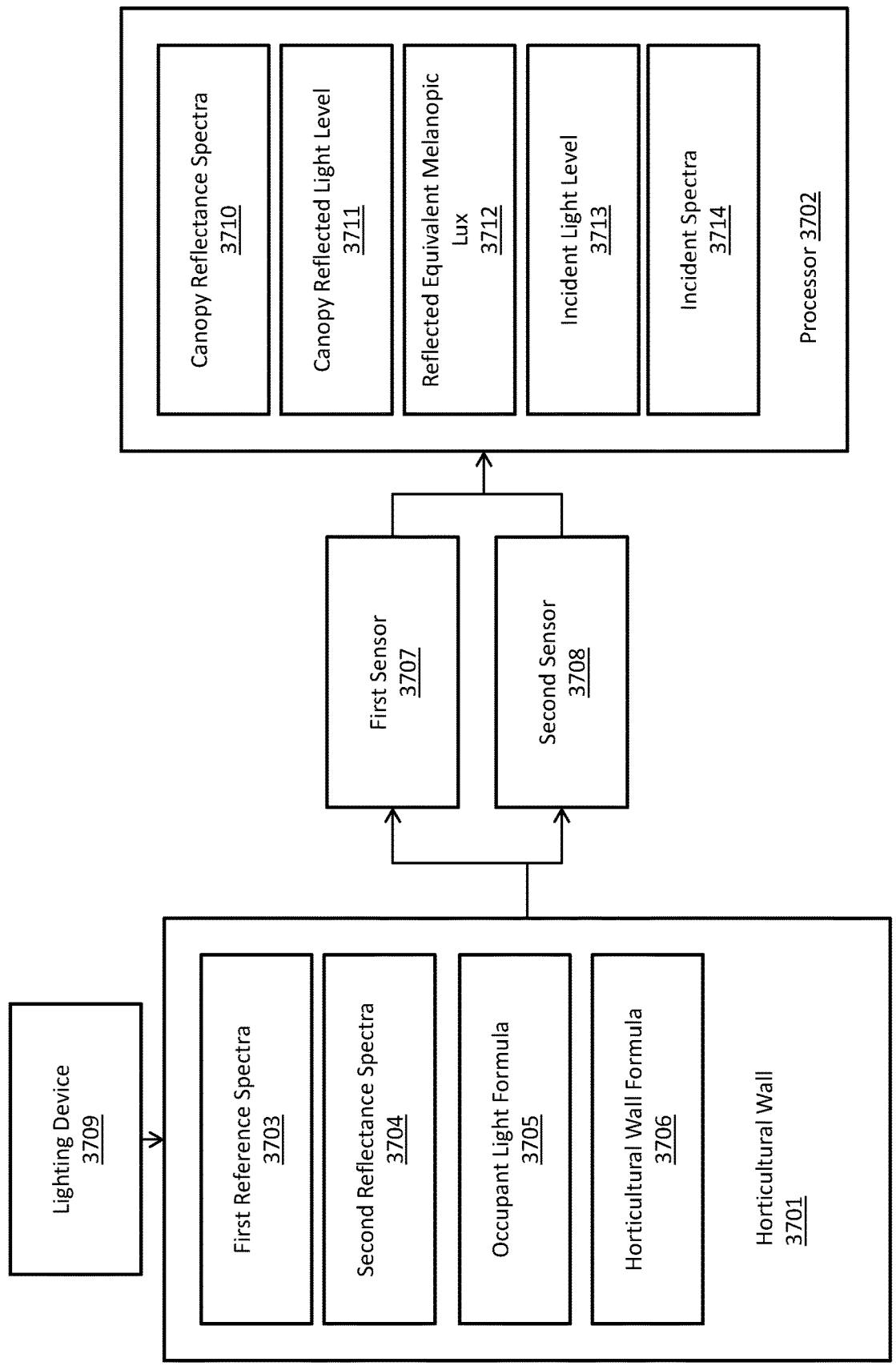
FIG. 37 illustrates a block diagram depicting a horticultural wall system, according to embodiments discussed herein.

As shown in FIG. 37, in an embodiment, an occupant light formula 3705 comprises an hourly schedule and melanopic lux limits, where the melanopic lux limits are weighted to a melanopic response curve 280 (as shown in FIG. 29). In embodiments, the melanopic lux limits are referenced to measurements taken in the vertical plane as to approximate the quantity of light reaching the human eye.

In an embodiment, a horticultural wall 3701 expresses a first unique reflectance spectra 3703 wherein reflected light from the horticultural wall can be detected by at least one sensor 3707. In this embodiment, the same horticultural wall 3701 expresses a second unique reflectance spectra 3704 at a different time of the growth cycle or when fitted with a different plant. In this embodiment, lighting devices 3709 within the horticultural wall and/or lighting devices 3709 directed at the horticultural wall are directed to generate reflected light levels consistent with an occupant light formula 3705 based on real time measurements from at least one sensor 3707 directed at the wall.

In another embodiment, at least one sensor 3707 can be directed at a horticultural wall and at least one sensor 3708 can be placed at or near the vertical plane in proximity to a horticultural wall. In this embodiment, lighting devices 3709 are directed to emit enough light in both quantity and spectra to satisfy the requirements of a horticultural light formula 3706 while also satisfying the requirements of an occupant light formula 3705.

In another embodiment, a reflectance reference can be placed at or near the vertical plane in proximity to a horticultural wall. In this embodiment, at least one imaging sensor and at least one lighting device can be directed at the horticultural wall and at the reflectance reference. In this embodiment, at least one image frame can be generated by the imaging sensor, and at least one of canopy reflectance spectra 3710, canopy reflected light level 3711, reflected equivalent melanopic lux 3712, incident light level 3713, and/or incident spectra 3714 can be computed from the image frame by a processor 3702. In a further embodiment, at least one of the computed canopy reflectance spectra 3710, canopy reflected light level 3711, reflected equivalent melanopic lux 3712, incident light level 3713, and/or incident spectra 3714 can be utilized by an algorithm to direct lighting devices to satisfy the requirements of at least one of an occupant light formula and/or a horticultural light formula. According to one embodiment, the reflectance reference may comprise a highly reflective diffuse white material, such as Spectralon brand material, PTFE, or other reflective material having known and relatively consistent reflectance characteristics at various angles.

In an embodiment, lighting devices are directed to comply with lighting requirements defined by an occupant light formula while also complying with daily light interval (DLI) light requirements defined within a horticultural light formula. In this embodiment, a daily light interval can be defined as a minimum number of daily photons in the photosynthetic active radiation (PAR) range in moles ($6.023 \times 10^{27}$) of photons. In this embodiment, the horticultural light formula may additionally comprise one or more target spectra for which the DLI can be valid.

Although the embodiments have been described with reference to exemplary embodiments, it can be not limited thereto. Those skilled in the art will appreciate that numerous changes and modifications may be made to the preferred embodiments of the invention and that such changes and modifications may be made without departing from the true spirit of the invention. It can be therefore intended that the appended claims be construed to cover all such equivalent variations as fall within the true spirit and scope of the invention.

I claim:

1. A connected system for providing lighting, comprising: one or more lighting devices, one or more light sensing devices; and a central controller, wherein the one or more lighting devices and the central controller are adapted to identify one or more spatial relationships between the one or more lighting devices and the one or more light sensing devices.

2. The system as recited in claim 1, wherein the one or more light sensing devices are located outside of an enclosure of the lighting device.

3. The system as recited in claim 1, wherein the identification of the one or more spatial relationships are determined through modulating at least one emitter in at least one lighting device.

4. The system as recited in claim 3, wherein the at least one emitter is modulated to communicate binary data.

5. The system as recited in claim 4, wherein the at least one emitter is configured to modulate by shifting a frequency of the emitted light in a specific pattern.

6. The system as recited in claim 1, further comprising: at least one camera configured to generate one or more image frames of a plant; wherein the one or more images are communicated by the camera to the central controller and analyzed by the central controller to generate a trend describing horticultural growth.

7. The system of claim 6, wherein the one or more images are analyzed to generate a canopy height directive.

8. The system of claim 6, wherein the trend describing horticultural growth is analyzed to modulate intensity and spectrum setpoints of lighting devices.

9. A method of analyzing horticulture image data, the method comprising:
   acquiring, via one or more cameras, one or more image frames of a plant canopy throughout a growth cycle of the plant canopy;
   transmitting the one or more image frames to a processor;
   generating, via the processor, one or more analysis results representing at least one of plant health, plant pigment development, plant water stress, leaf reflectance, leaf color, plant density, flower stage, flower density, fruit development, disease presence, plant shape, or canopy height;
   storing the one or more analysis results and image frames in a database;
   arranging at least one lighting device in proximity to the plant canopy;
   providing one or more control signals to direct the lighting device to emit irradiance of a specific spectral power distribution; and
   capturing one or more images exhibiting at least one spectral response channel.

10. The method as recited in claim 9, further comprising: acquiring the one or more image frames at predetermined intervals throughout the growth cycle of the plant canopy.

11. The method as recited in claim 9, wherein at least one of the one or more cameras is sensitive to light in the visible spectrum.

12. The method as recited in claim 9, wherein at least one of the one or more cameras is sensitive to light in multiple spectra.

13. The method as recited in claim 9, further comprising:
    providing one or more additional control signals to direct the lighting device to emit irradiance of one or more additional specific spectral power distributions in succession; and
    capturing one or more images exhibiting at least one spectral response channel.

14. The method as recited in claim 9, further comprising:
    calculating canopy reflectance spectra from at least one image comprising the plant canopy and a reflectance reference present in the image frame.

15. The method of claim 14, wherein said reflectance reference comprises a highly reflective diffuse white material having known reflectance characteristics at various angles.

16. The method of claim 9, further comprising:
    analyzing canopy reflectance spectra by comparing relative levels of reflectance in at least two image frames, wherein each image frame substantially comprises reflectance data associated with a separate spectrum range.

17. The method of claim 16, further comprising:
    generating a trend describing relative levels of reflectance of at least two separate reflectance spectra computed from image frames, wherein the trend describes at least one of plant health, plant pigment development, plant water stress, leaf reflectance, leaf color, plant density, flower stage, flower density, fruit development, disease presence.

18. The method of claim 17, wherein said trend is computed to modulate at least one spectrum setpoint or intensity setpoint.

* * * * *